US010739668B2

(12) United States Patent
Nakayama et al.

(10) Patent No.: US 10,739,668 B2
(45) Date of Patent: Aug. 11, 2020

(54) PROJECTOR HAVING ENCLOSURE HUNG VIA SUPPORT MEMBER

(71) Applicant: SEIKO EPSON CORPORATION, Tokyo (JP)

(72) Inventors: Tetsu Nakayama, Matsumoto (JP); Yoshitsugu Akutagawa, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/366,110

(22) Filed: Mar. 27, 2019

(65) Prior Publication Data

US 2019/0302595 A1   Oct. 3, 2019

(30) Foreign Application Priority Data

Mar. 28, 2018  (JP) .................. 2018-061416

(51) Int. Cl.
| G03B 21/14 | (2006.01) |
| G03B 21/20 | (2006.01) |
| G02B 5/02 | (2006.01) |

(52) U.S. Cl.
CPC ....... *G03B 21/2006* (2013.01); *G02B 5/0278* (2013.01); *G03B 21/145* (2013.01)

(58) Field of Classification Search
CPC .. G03B 21/20; G03B 21/145; G03B 21/2013; G03B 21/2033; G03B 21/2053; G02B 5/02; G02B 5/021; G02B 5/0242; G02B 5/0278; G02B 5/1876
See application file for complete search history.

(56) References Cited

U.S. PATENT DOCUMENTS

| 8,540,378 | B2* | 9/2013 | Maruyama | G03B 21/142 |
| | | | | 348/745 |
| 10,520,799 | B2* | 12/2019 | Takamatsu | H04N 9/315 |
| 2010/0128228 | A1 | 5/2010 | Matsuo et al. | |
| 2011/0267588 | A1* | 11/2011 | Dai | G03B 21/28 |
| | | | | 353/98 |
| 2012/0236217 | A1* | 9/2012 | Kitai | G02F 1/133603 |
| | | | | 349/5 |
| 2013/0249959 | A1* | 9/2013 | Umehara | G03B 15/06 |
| | | | | 345/690 |
| 2013/0264434 | A1 | 10/2013 | Unno | |
| 2015/0022785 | A1 | 1/2015 | Kinebuchi et al. | |
| 2015/0168821 | A1* | 6/2015 | Negretti | G03B 21/206 |
| | | | | 353/85 |
| 2016/0337626 | A1 | 11/2016 | Mima | |
| 2018/0156401 | A1* | 6/2018 | Ono | F21S 8/04 |

FOREIGN PATENT DOCUMENTS

| JP | 2010-164685 A | 7/2010 |
| JP | 2010-164942 A | 7/2010 |
| JP | 2013-218047 A | 10/2013 |
| JP | 2015-022148 A | 2/2015 |
| WO | 2016/103543 A1 | 6/2016 |

* cited by examiner

*Primary Examiner* — Sultan Chowdhury

(74) *Attorney, Agent, or Firm* — Oliff PLC

(57) ABSTRACT

A projector includes a projection section, a light transmissive member, an illuminator, a diffusion member, and an enclosure, and the enclosure is hung via a support member that supports the enclosure in a plurality of directions.

6 Claims, 51 Drawing Sheets

PROJECTOR HAVING ENCLOSURE HUNG VIA SUPPORT MEMBER

BACKGROUND

1. Technical Field

The present invention relates to a projector.

2. Related Art

There has been a known projector that is attached to a ceiling surface, a wall surface, or any other surface and readily allows adjustment of the image projection direction, as described in International Publication No. 16/103543.

The projector described in International Publication No. 16/103543, however, when used in a shop that places importance on the atmosphere of the indoor space, such as a clothing shop, a cosmetics shop, and a restaurant, could undesirably degrade the atmosphere because the main body of the projector is supported with a mounting bracket. To avoid the problem, the projector can be installed without degradation of the atmosphere of the shop by installing the projector in such a way that the projector is hung from the ceiling, for example, by using wires instead of the mounting bracket. In this case, however, when the projector swings due, for example, to wind, the projected image also undesirably swings.

SUMMARY

A projector according to an aspect of the present application includes a projection section that outputs image light, a light transmissive member that transmits the image light outputted from the projection section, an illuminator that outputs illumination light, a diffusion member that diffuses the illumination light outputted from the illuminator, and an enclosure that accommodates the projection section and the illuminator, is provided with the light transmissive member and the diffusion member, and is so formed as to extend in the form of a column, and the enclosure is hung via a support member that supports the enclosure in a plurality of directions.

The light transmissive member of the projector described above is preferably disposed on a lengthwise end surface and/or a widthwise side surface of the enclosure.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
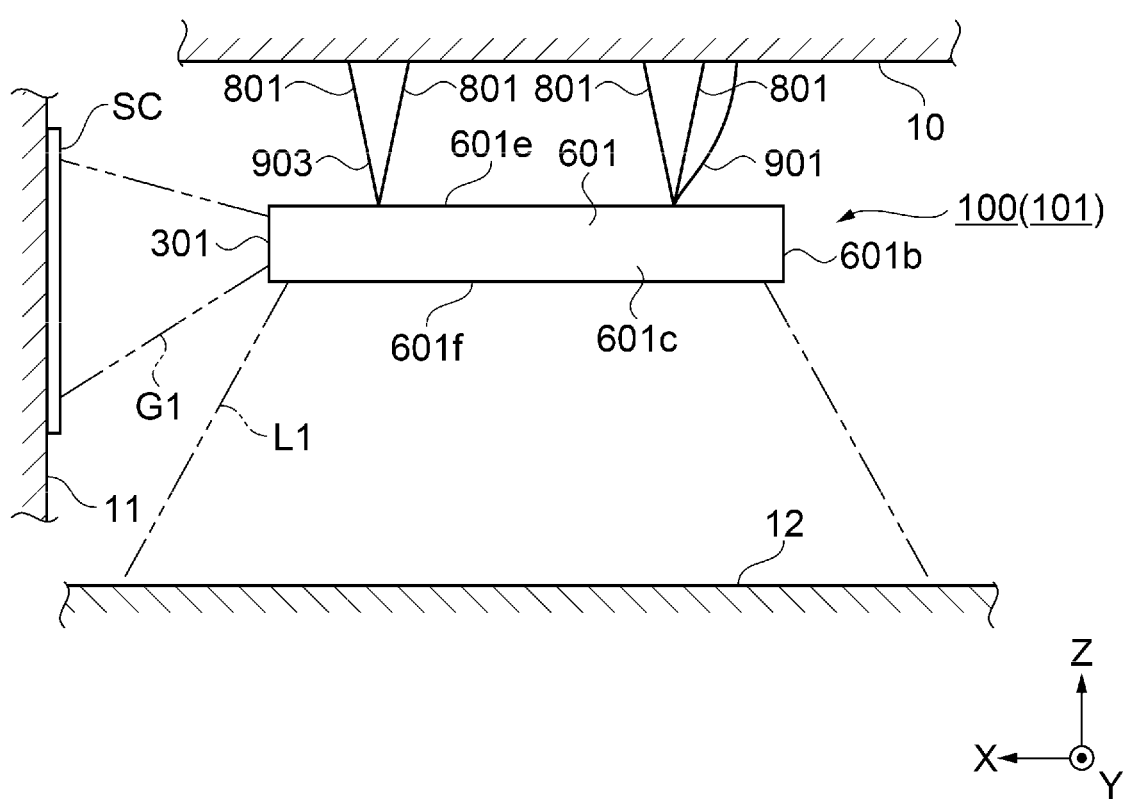
FIG. 1A shows an example of installation of a projector in embodiments.

Embodiments of the invention will be described below with reference to the drawings. Each member in the following drawings is so drawn at scales different from an actual scale as to be large enough to be recognizable in the drawings.

FIG. 1A shows an example of installation of a projector 100 in the following embodiments. FIG. 1A, in which X, Y, and Z axes that are coordinates axes perpendicular to one another are set, shows a state where the projector 100 is installed in a plane XY, which coincides with the horizontal plane. In this case, the axis X coincides with the direction in which an enclosure 601 of the projector 100 extends, and the axis X(+) coincides with the lengthwise direction of the enclosure 601, which is the direction in which image light G1 is projected in Embodiment 1. The axis Y coincides with the widthwise direction of the enclosure 601 of the projector 100, and the axis Y(+) coincides with the direction perpendicular to the axis X and extending rightward when the X(+)-axis-side end surface of the enclosure 601 is viewed as a front surface 601a. The axis Z is perpendicular to the axes X and Y, and the axis Z(+) coincides with the upward direction when the X(+)-axis-side end surface of the enclosure 601 is viewed as the front surface.

First Embodiment

Figure 1B:
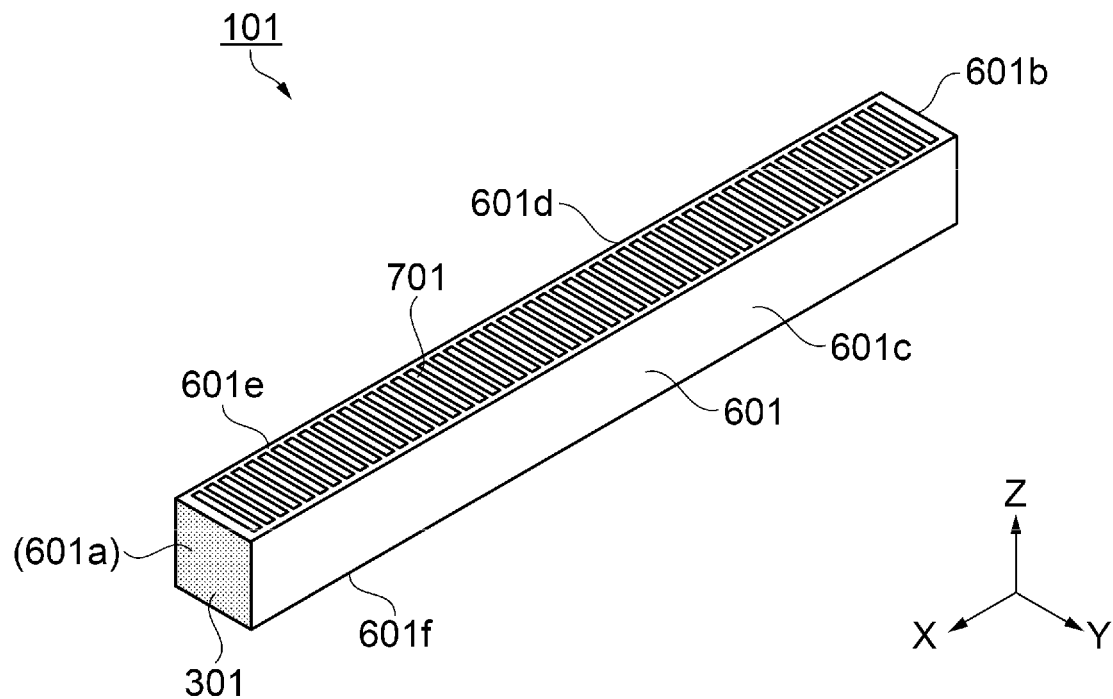
FIG. 1B is a perspective view showing a projector according to Embodiment 1.
Figure 1C:
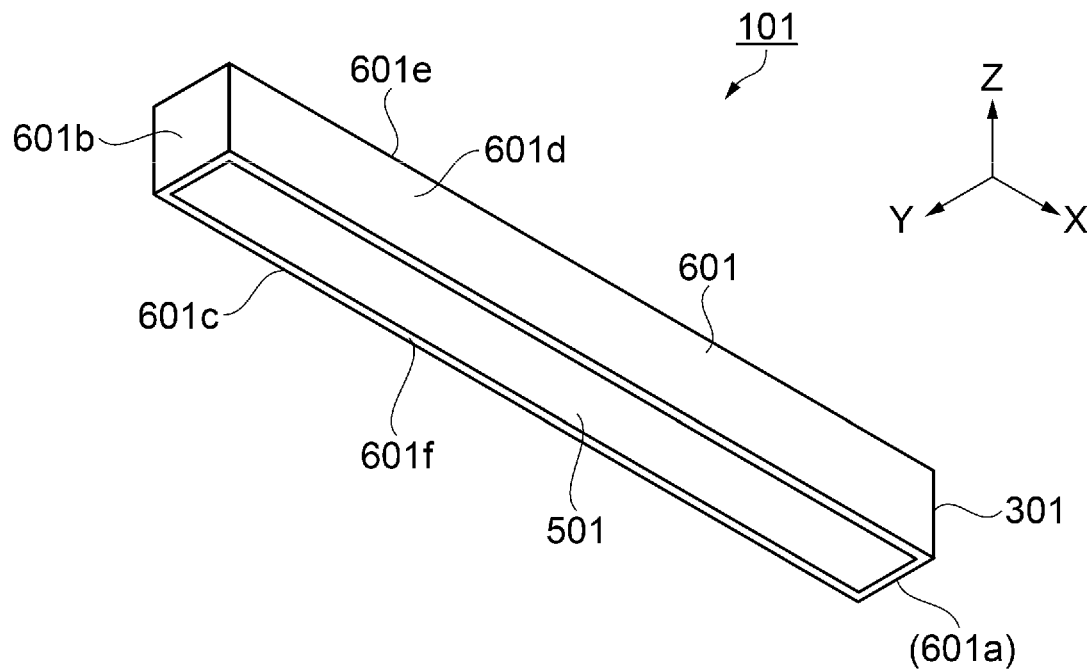
FIG. 1C is a perspective view showing the projector according to Embodiment 1.
Figure 1D:
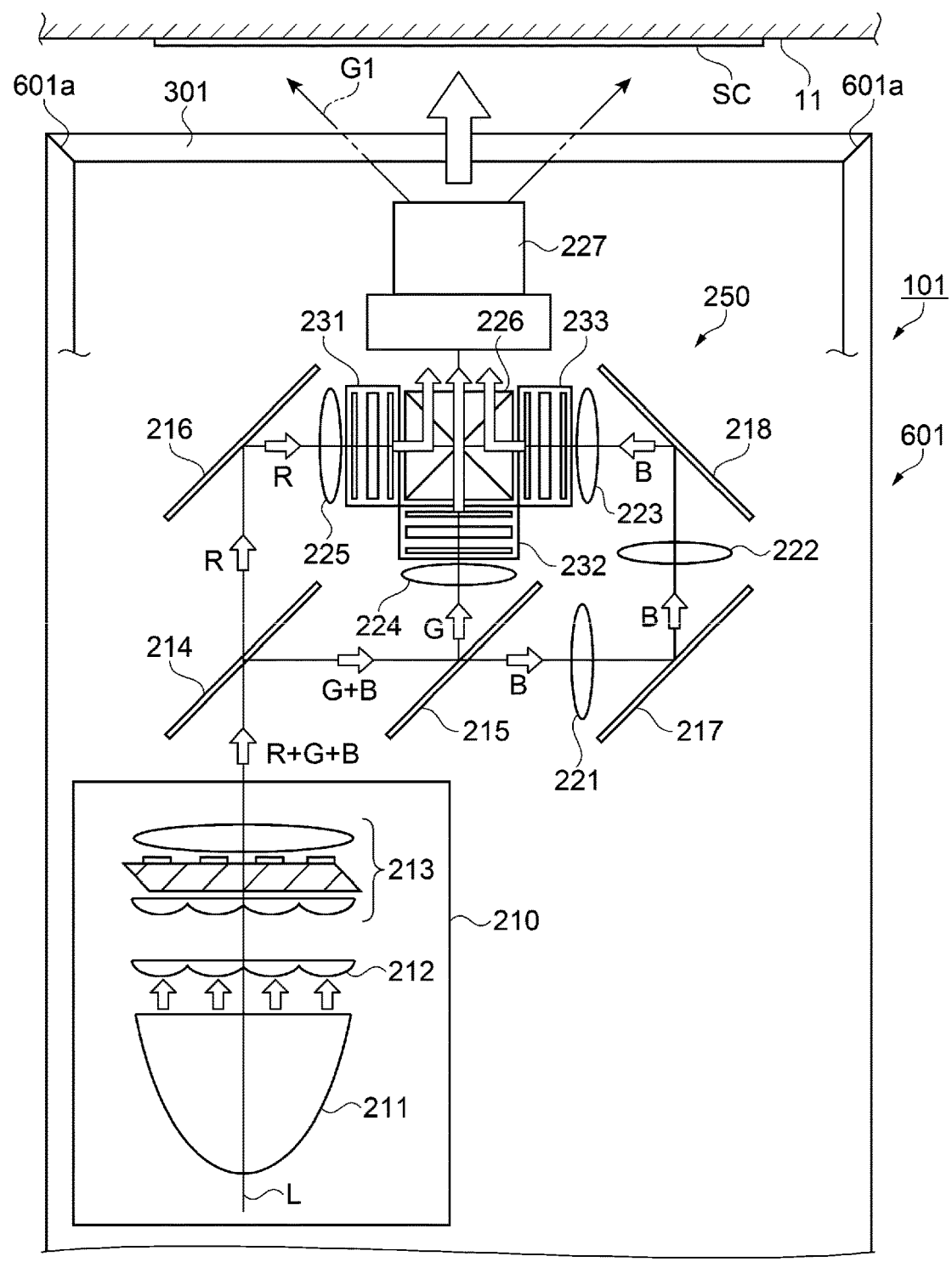
FIG. 1D is a schematic horizontal cross-sectional view showing the configuration of the projector.
Figure 1E:
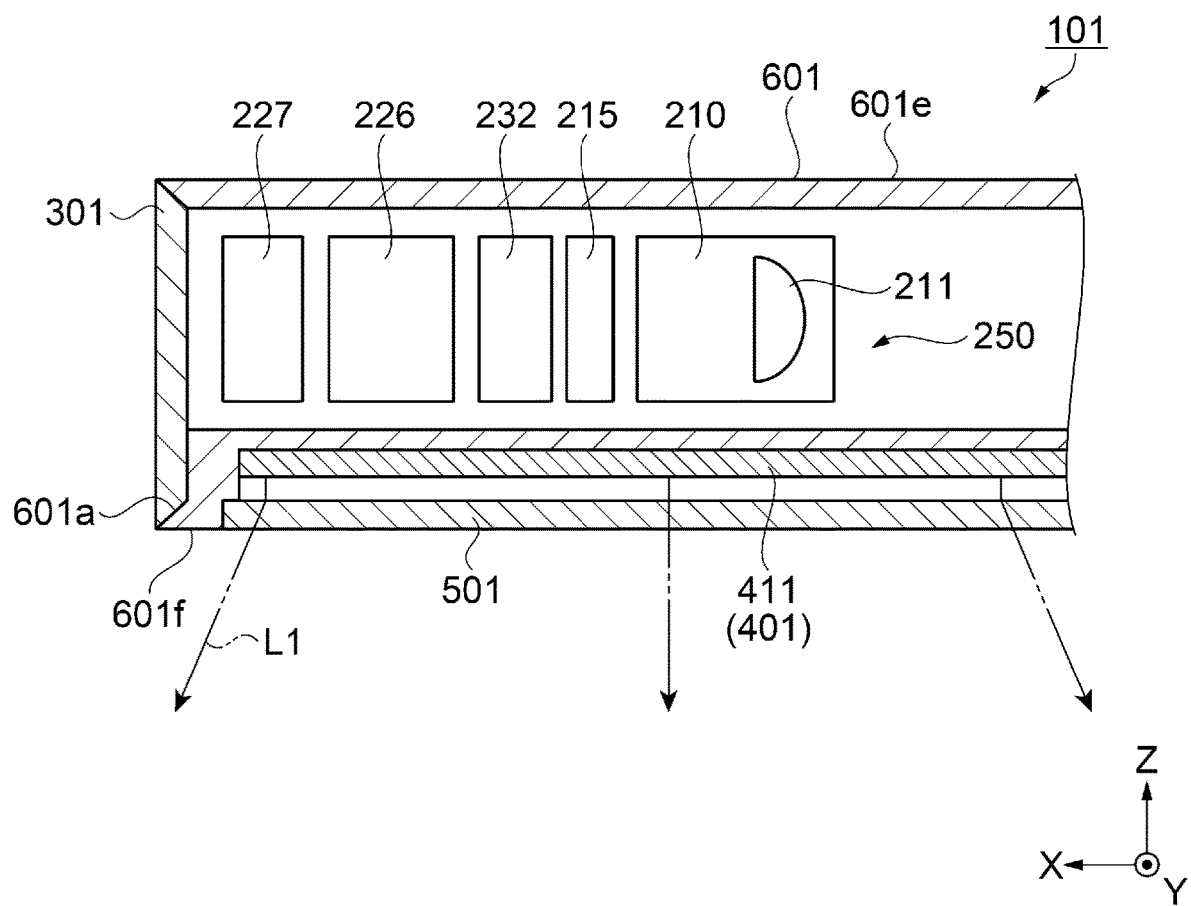
FIG. 1E is a schematic vertical cross-sectional view showing the configuration of the projector.

FIGS. 1B and 1C are perspective views showing a projector 101 according to Embodiment 1. FIG. 1D is a schematic horizontal cross-sectional view showing the configuration of the projector 101. FIG. 1E is a schematic vertical cross-sectional view showing the configuration of the projector 101.

Figure 1F:
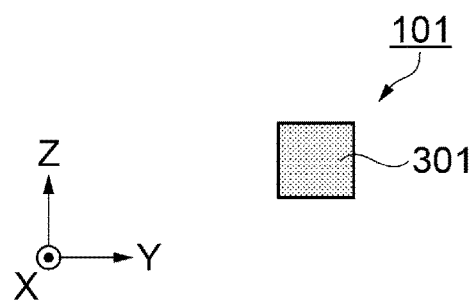
FIG. 1F shows the projector according to Embodiment 1 viewed along an axis.
Figure 1G:
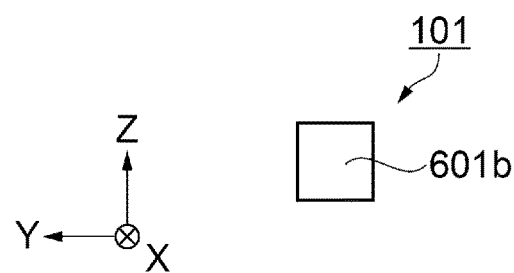
FIG. 1G shows the projector according to Embodiment 1 viewed along another axis.
Figure 1H:
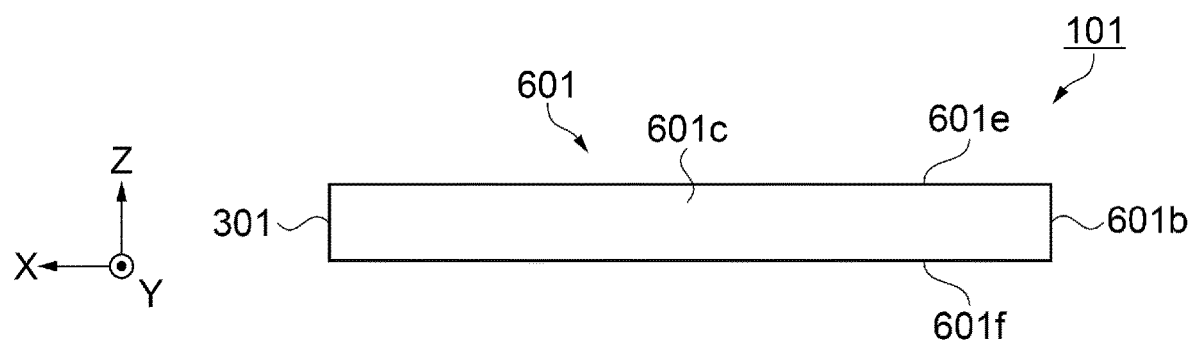
FIG. 1H shows the projector according to Embodiment 1 viewed along another axis.
Figure 1I:
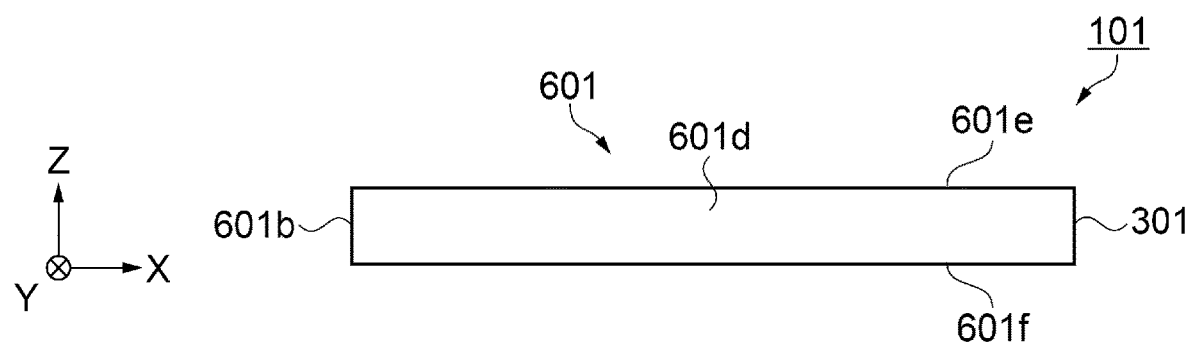
FIG. 1I shows the projector according to Embodiment 1 viewed along another axis.
Figure 1J:
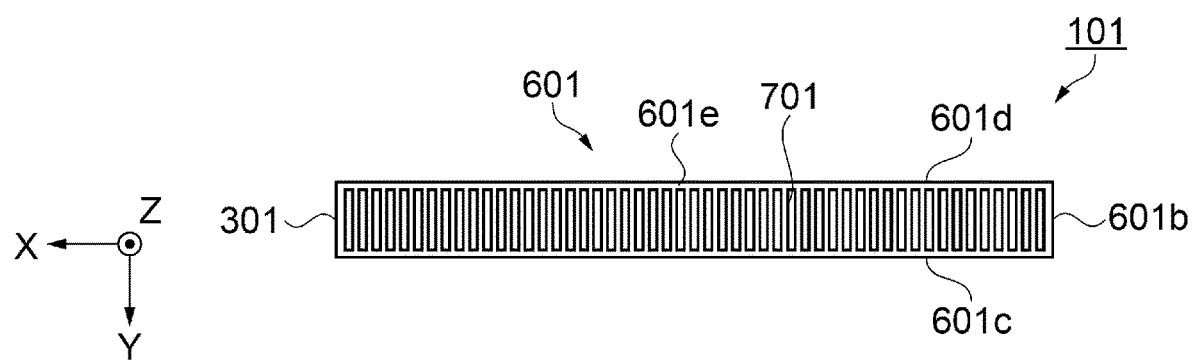
FIG. 1J shows the projector according to Embodiment 1 viewed along another axis.
Figure 1K:
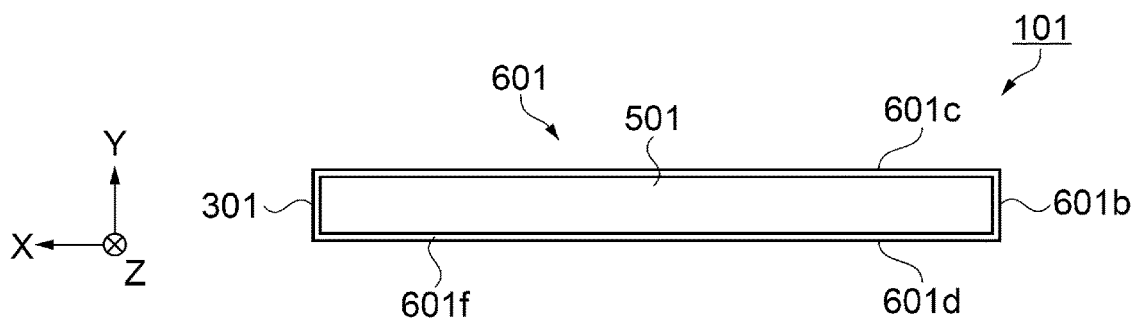
FIG. 1K shows the projector according to Embodiment 1 viewed along another axis.

FIGS. 1F to 1K show the projector 101 according to Embodiment 1 viewed along the three axes described above. In detail, FIG. 1F shows the projector 101 viewed along the axis-X(+) direction (front view). FIG. 1G shows the projector 101 viewed along the axis-X(−) direction (rear view). FIG. 1H shows the projector 101 viewed along the axis-Y(+) direction (right side view). FIG. 1I shows the projector 101 viewed along the axis-Y(−) direction (left side view). FIG. 1J shows the projector 101 viewed along the axis-Z(+) direction (top view). FIG. 1K shows the projector 101 viewed along the axis-Z(−) direction (bottom view).

The following description will be made of the configuration of the projector 101, which is an example according to Embodiment 1, as an example of the projector 100.

Configuration and Action of Projector

The configuration and action of the projector 101 according to Embodiment 1 will be described with reference to FIGS. 1A to 1K.

The projector 101 includes a projection section 250 (FIGS. 1D and 1E), which projects the image light G1, a light transmissive member 301, which transmits the image light G1 projected from the projection section 250, an illuminator 401 (FIG. 1E), which outputs illumination light L1, and a diffusion member 501 (FIGS. 1C and 1E), which diffuses the illumination light L1 outputted from the illuminator 401. The projector 101 includes the enclosure 601, which has a quadrangular cross section taken along a plane YZ and is configured to extend in the form of a column, accommodates the projection section 250 and the illuminator 401, and is provided with the light transmissive member 301 and the diffusion member 501.

The enclosure 601 in Embodiment 1 has end surfaces on opposite sides in the lengthwise direction (X-axis direction), and the two end surfaces are defied as follows: The X(+)-axis-side end surface is a front surface 601a; and the X(−)-axis-side end surface is a rear surface 601b. Further, the enclosure 601 has side surfaces on opposite sides in the widthwise direction (Y-axis direction), and the two side surfaces are defied as follows: The Y(+)-axis-side side surface is a right side surface 601c; and the Y(−)-axis-side side surface is a left side surface 601d. Still further, the enclosure 601 has side surfaces on opposite sides in the Z-axis direction, which is perpendicular to the lengthwise direction (X-axis direction) and the widthwise direction (Y-axis direction), and the two side surfaces are defied as follows: The Z(+)-axis-side side surface is a top surface 601e; and the Z(−)-axis-side side surface is a bottom surface 601f.

In the projector 101 according to Embodiment 1, the light transmissive member 301 is so disposed as to cover the entire front surface 601a, as shown in FIG. 1B. As the structure in which the light transmissive member 301 is so disposed as to cover the entire front surface 601a, in Embodiment 1, for example, the front surface 601a is an inclining surface, and an inclining end surface of the light transmissive member 301 is layered on the inclining front surface 601a, as shown in FIGS. 1E and 1D.

The diffusion member 501, which has a quadrangular shape, is disposed on the bottom surface 601f of the enclosure 601, as shown in FIG. 1C. To dissipate heat generated in the projection section 250, the top surface 601e of the enclosure 601 has openings 701, which function as an intake port through which outside air is taken into the enclosure 601 and a discharge port through which the taken-in outside air heated in the process of the dissipation of the generated heat is discharged out of the enclosure 601.

The projector 101 is installed, for example, in a shop. In detail, the projector 101 is so installed on a ceiling surface 10 of the shop as to be hung from the ceiling surface 10 with support members 801, such as wires, as shown in FIG. 1A. The projector 101 is hung and supported with wires extending from two locations on the top surface 601e and each forming a V-letter shape corresponding to two directions (plurality of directions). The projector 101 may instead be hung with wires extending in three directions instead of only the two directions. Electric power is supplied to the projector 101 via a power supply cable 901 extending from the ceiling surface 10. Further, to supply a video signal from an external apparatus, the signal is supplied to the projector 101 via a signal cable 903 from the ceiling surface 10.

The projector 101 hung from the ceiling surface 10 projects as an image the image light G1 having been projected from the projection section 250 and having passed through the light transmissive member 301 on a screen SC installed on a wall surface 11 located in a position away in the X(+)-axis direction. The projector 101 hung from the ceiling surface 10 further radiates the illumination light L1 outputted from the illuminator 401 and diffused by the diffusion member 501 onto a floor surface 12, a desktop surface, or any other surface located in a position away in the Z(−)-axis direction.

Configuration and Action of Projection Section

The configuration and action of the projection section 250 according to Embodiment 1 will be described with reference to FIG. 1D.

The projection section 250 of the projector 101 forms the optical system of the projector 101, as shown in FIG. 1D. The projection section 250 modulates light outputted from a light source unit 211 based on an image signal to form the image light G1 and forms a projection image via a projection lens 227 on a projection target surface, such as the screen SC installed on the wall surface 11 in Embodiment 1.

The projection section 250 includes an optical integration system 210, two dichroic mirrors 214 and 215, three reflection mirrors 216, 217, and 218, five relay lenses 221, 222, 223, 224, and 225, three liquid crystal light valves 231, 232, and 233, a cross dichroic prism 226, and the projection lens 227, as shown in FIG. 1D.

The optical integration system 210 includes the light source unit 211, which serves as a light source formed of a white light source, for example, an ultrahigh-pressure mercury lamp, an optical integration lens 212, and a polarization conversion element 213. The light source unit 211, the optical integration lens 212, and the polarization conversion element 213 are arranged along a system optical axis L.

The dichroic mirror 214 receives polarized light having exited out of the optical integration system 210, transmits red light (R), and reflects green light (G) and blue light (B). The other dichroic mirror 215 reflects the green light (G) reflected off the dichroic mirror 214 and transmits the blue light (B) also reflected off the dichroic mirror 214.

The red light (R) having passed through the dichroic mirror 214 is reflected off the reflection mirror 216, then travels via the relay lens 225, and enters the liquid crystal light valve 231. The green light (G) reflected off the dichroic mirror 215 travels via the relay lens 224 and enters the liquid crystal light valve 232. The blue light (B) having passed through the dichroic mirror 215 travels via a light guide system formed of the three relay lenses 221, 222, and 223 and the two reflection mirrors 217 and 218 and enters the liquid crystal light valve 233.

The transmissive liquid crystal light valves 231, 232, and 233, which are each a light modulator, are so disposed as to face the light incident surfaces of the cross dichroic prism 226 that are provided on a color basis. The color light fluxes having entered the liquid crystal light valves 231, 232, and 233 are modulated based on the image signal and outputted toward the cross dichroic prism 226.

The cross dichroic prism 226 is formed of four right-angle prisms bonded to each other, and a dielectric multilayer film that reflects the red light and a dielectric multilayer film that reflects the blue light are formed in the form of a cross on the inner surfaces of the cross dichroic prism 226. The dielectric multilayer films combine the three color light fluxes with one another into light representing a color image. The combined light exits toward the light transmissive member 301 via the projection lens 227, and the image light G1 having passed through the light transmissive member 301 is enlarged and displayed as an image on the screen SC installed on the wall surface 11.

The projection section 250 in Embodiment 1 employs what is called a three-panel scheme using the three liquid crystal light valves 231, 232, and 233 corresponding to the three colors described above, the red light (R), the green light (G), and the blue light (B), and may instead employ what is called a single-panel scheme using a single liquid crystal light valve that handles white light with no color separation.

In the projection section 250 in Embodiment 1, the light source unit 211 is formed of a discharge-type light source unit, but not necessarily, and a light source unit using a solid-state light source may be used. Examples of the solid-state light source may include a laser light source, an LED (light emitting diode) device, an organic EL (electro luminescence) device, a silicon light emitted device, and a variety of other solid-state light emitting devices.

In the projection section 250 in Embodiment 1, the transmissive liquid crystal light valves 231, 232, and 233 are each used as a light modulator, but not necessarily, and reflective liquid crystal light valves may be used.

In the projection section 250 in Embodiment 1, transmissive light modulators are used as the light modulators, but not necessarily, and micromirror-type light modulators or light modulators based on any other scheme can be used. DMDs (digital micromirror devices) can, for example, be used as the micromirror-type light modulators.

Configuration and Action of Illuminator

The configuration and action of the illuminator 401 according to Embodiment 1 will be described with reference to FIG. 1E.

The illuminator 401 of the projector 101 is formed of an LED board 411, which has a lower surface on which a plurality of LED devices (not shown) are arranged and mounted, as shown in FIG. 1E. The diffusion member 501 is disposed on the bottom surface 601f of the enclosure 601. The LED board 411 (LED devices) emits light, and the emitted light exits downward from the LED board 411. The light having outputted from the LED board 411 enters the diffusion member 501 located below the LED board 411. The light having entered the diffusion member 501 passes therethrough, and the light diffused by the diffusion member 501 exits out thereof. The floor surface 12 located below the diffusion member 501 is illuminated with the light having been diffused by the diffusion member 501 and having exited out thereof (illumination light L1).

As described above, the projector 101 (100) according to Embodiment 1 can provide the following effects.

In the case where the projector 101 (100) is hung from the ceiling surface 10, the swing preventing support members 801, which support the projector 101 (100) in a plurality of directions, are attached to the projector 101 (100). Therefore, even in the case where the projector 101 (100) swings due, for example, to wind, the amount of swing motion can be suppressed to a small amount, and the period required to stop the swing motion can be shortened. The swing motion of the projected image can therefore be suppressed, whereby a situation in which the image is difficult to look at can be avoided.

Embodiment 2

A projector 102 according to Embodiment 2 will be described with reference to FIGS. 2A to 2H.

Figure 2A:
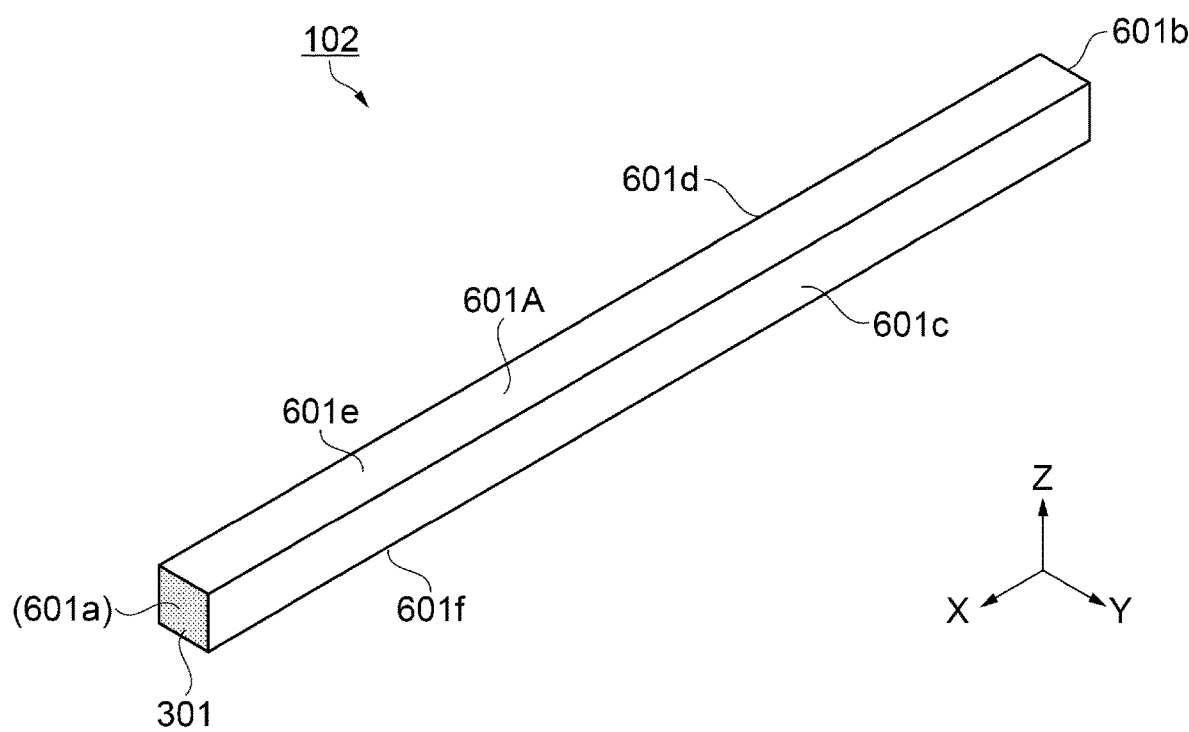
FIG. 2A is a perspective view showing a projector according to Embodiment 2.
Figure 2B:
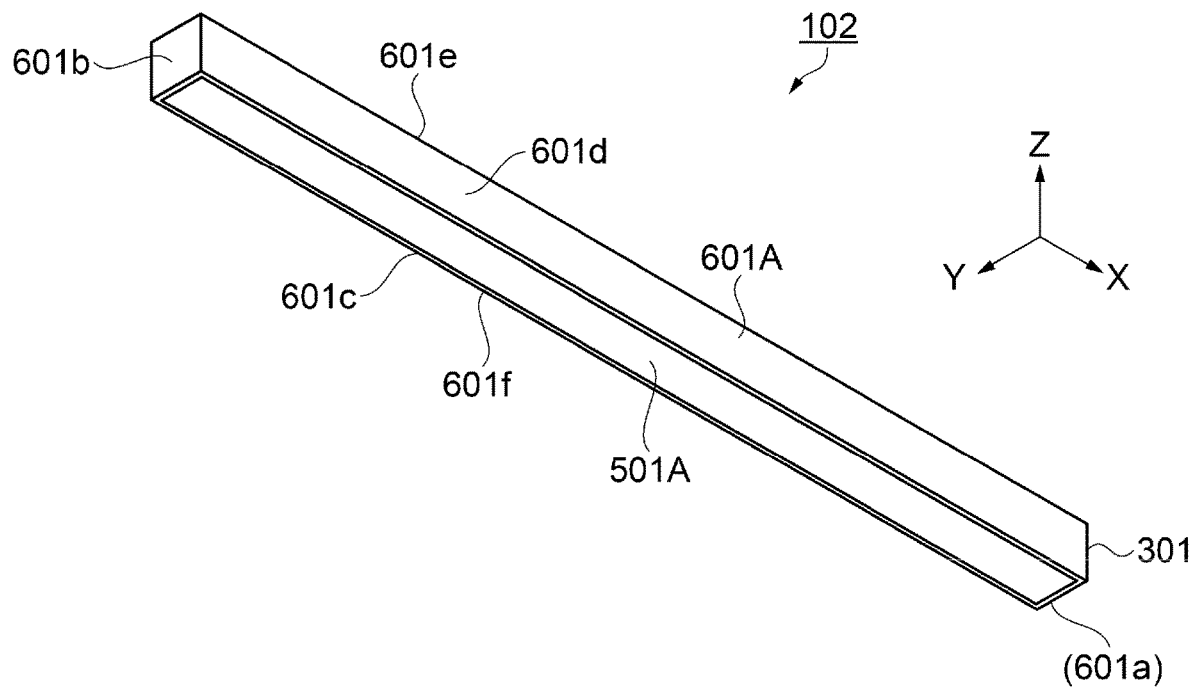
FIG. 2B is a perspective view showing the projector according to Embodiment 2.

FIGS. 2A and 2B are perspective views showing the projector 102 according to Embodiment 2. In detail, FIG. 2A is a perspective view of the projector 102 viewed obliquely downward from a position above, in front of, and on the right of the projector 102. FIG. 2B is a perspective view of the projector 102 viewed obliquely upward from a position below, behind, and on the left of the projector 102.

Figure 2C:
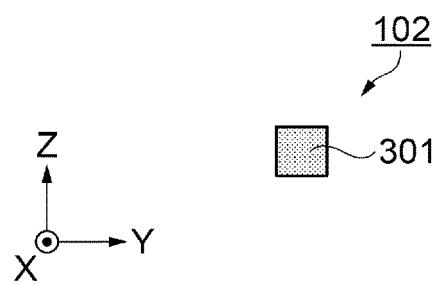
FIG. 2C shows the projector according to Embodiment 2 viewed along an axis.
Figure 2D:
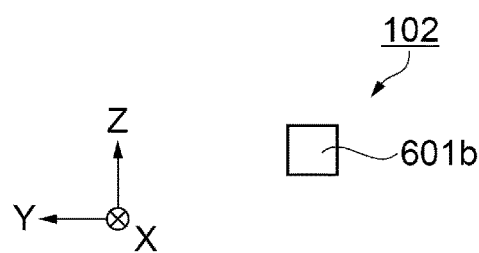
FIG. 2D shows the projector according to Embodiment 2 viewed along another axis.

FIGS. 2C to 2H show the projector 102 according to Embodiment 2 viewed along the three axes described above. In detail, FIG. 2C shows the projector 102 viewed along the axis-X(+) direction (front view). FIG. 2D shows the projector 102 viewed along the axis-X(−) direction (rear view).

Figure 2E:
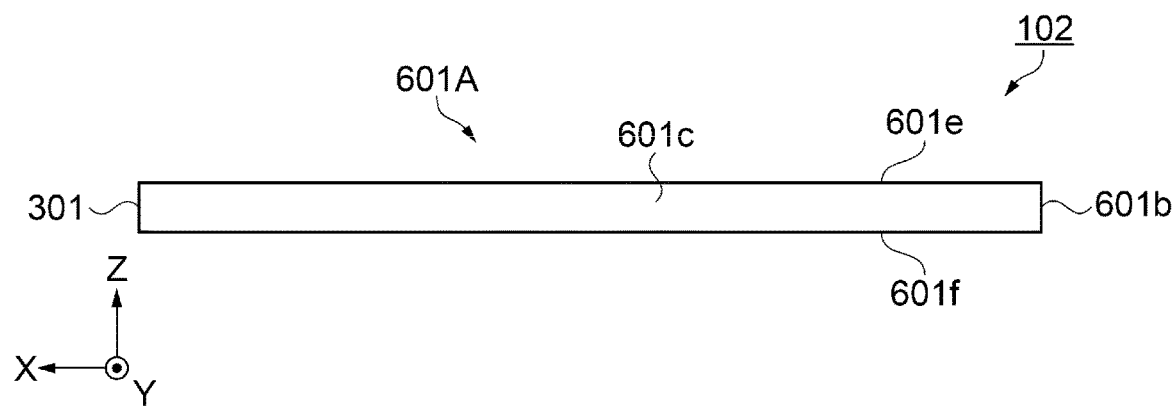
FIG. 2E shows the projector according to Embodiment 2 viewed along another axis.
Figure 2F:
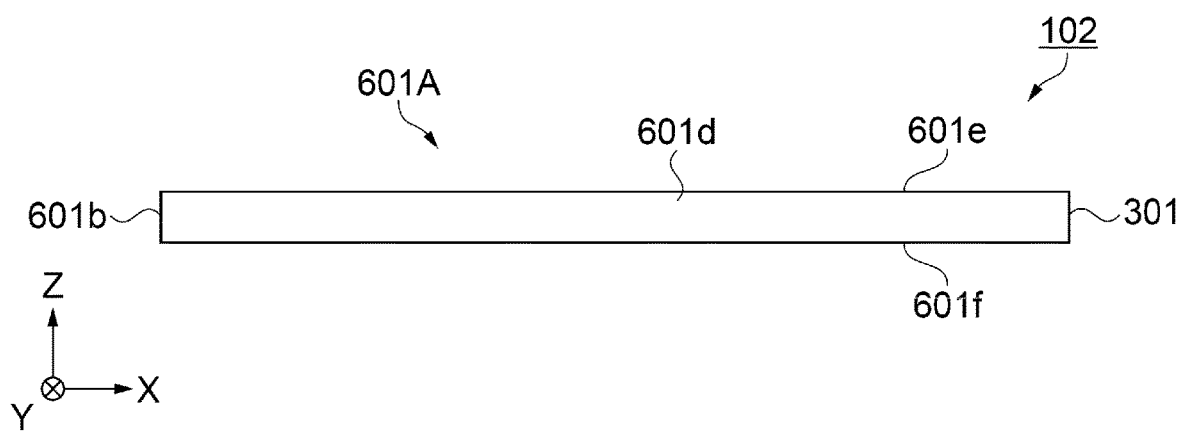
FIG. 2F shows the projector according to Embodiment 2 viewed along another axis.
Figure 2G:
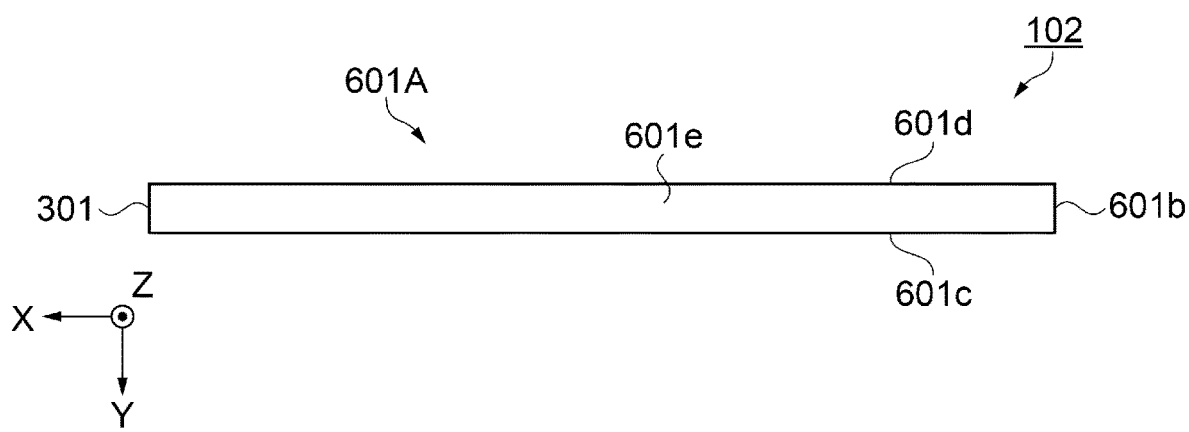
FIG. 2G shows the projector according to Embodiment 2 viewed along another axis.
Figure 2H:
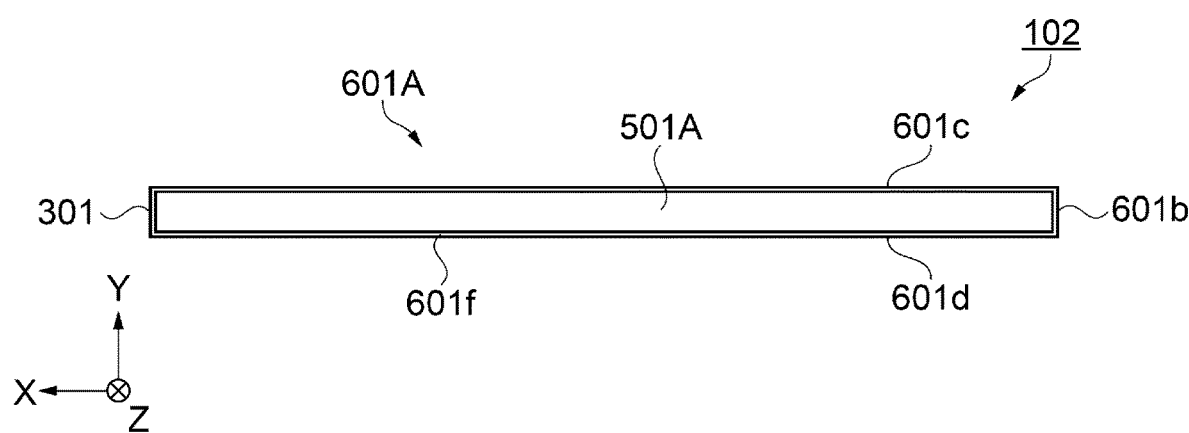
FIG. 2H shows the projector according to Embodiment 2 viewed along another axis.

FIG. 2E shows the projector 102 viewed along the axis-Y(+) direction (right side view). FIG. 2F shows the projector 102 viewed along the axis-Y(−) direction (left side view). FIG. 2G shows the projector 102 viewed along the axis-Z(+) direction (top view). FIG. 2H shows the projector 102 viewed along the axis-Z(−) direction (bottom view).

As for the projector 102 according to Embodiment 2, as compared with the projector 101 according to Embodiment 1, an enclosure 601A, which forms the exterior of the projector 102, is configured to be longer in the X-axis direction than the enclosure 601 in Embodiment 1. A diffusion member 501A is longer in the X-axis direction than the diffusion member 501 in Embodiment 1 accordingly. The other configurations are the same as those of the projector 101 according to Embodiment 1.

The projector 102 and projectors 103 to 122, 124 to 129 described below may or may not have the openings 701, with which the projector 101 according to Embodiment 1 is provided.

Embodiment 3

A projector 103 according to Embodiment 3 will be described with reference to FIGS. 3A and 3B.

Figure 3A:
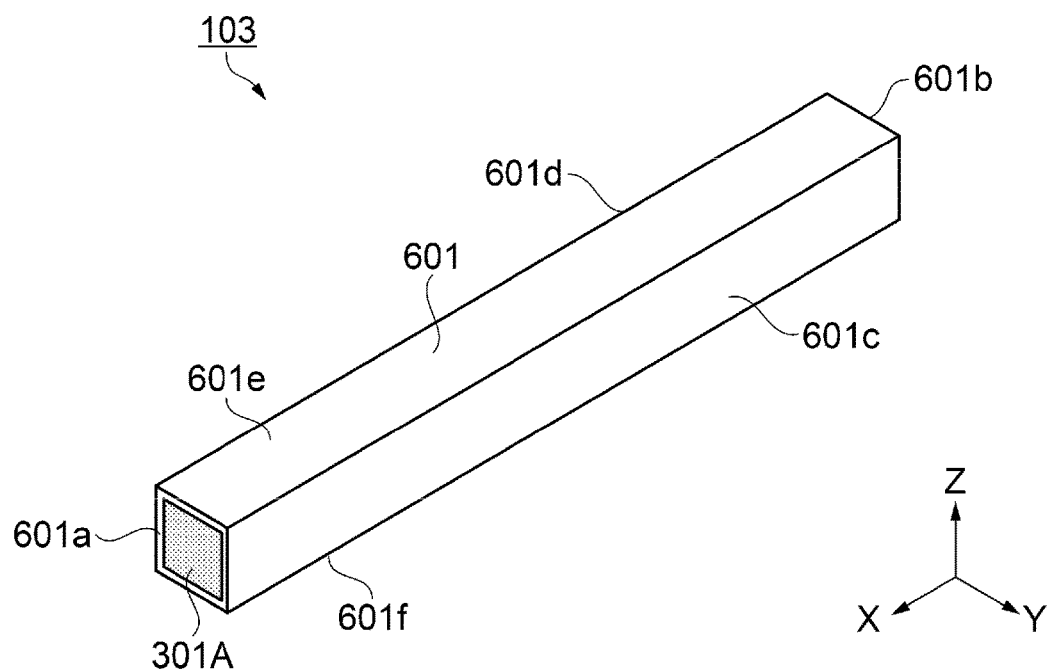
FIG. 3A is a perspective view showing a projector according to Embodiment 3.
Figure 3B:
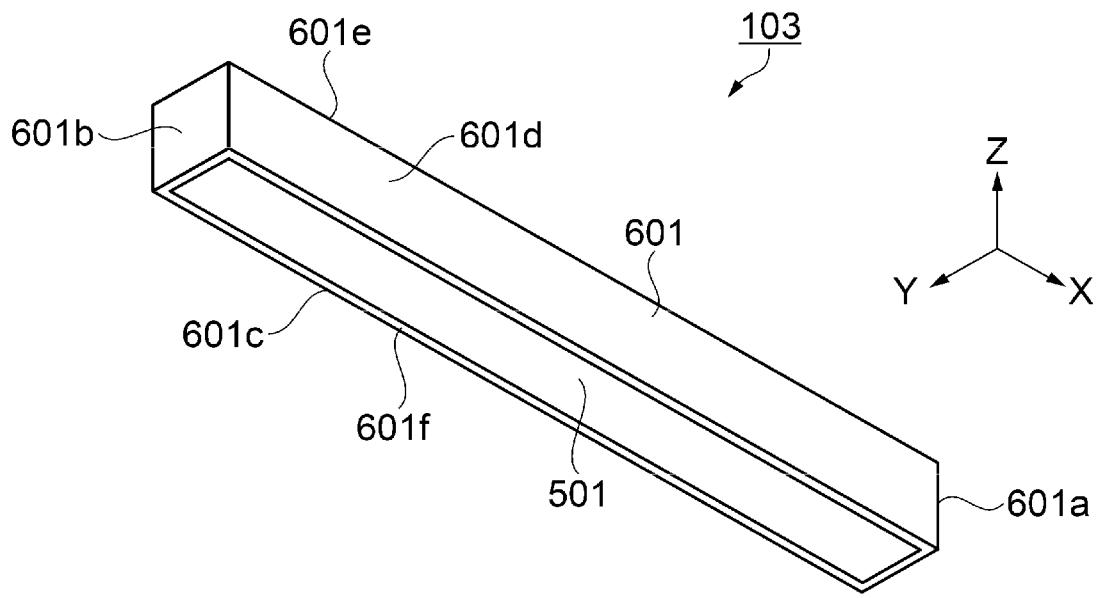
FIG. 3B is a perspective view showing the projector according to Embodiment 3.

FIGS. 3A and 3B are perspective views showing the projector 103 according to Embodiment 3. In detail, FIG. 3A is a perspective view of the projector 103 viewed obliquely downward from a position above, in front of, and on the right of the projector 103. FIG. 3B is a perspective view of the projector 103 viewed obliquely upward from a position below, behind, and on the left of the projector 103.

In the projector 103 according to Embodiment 3, as compared with Embodiment 1, in which the light transmissive member 301 is so disposed as to cover the entire front surface 601a of the enclosure 601, a light transmissive member 301A in Embodiment 3 is so disposed as not to cover an outer edge portion of the front surface 601a. The other configurations are the same as those of the projector 101 according to Embodiment 1.

Embodiment 4

A projector 104 according to Embodiment 4 will be described with reference to FIGS. 4A and 4B.

Figure 4A:
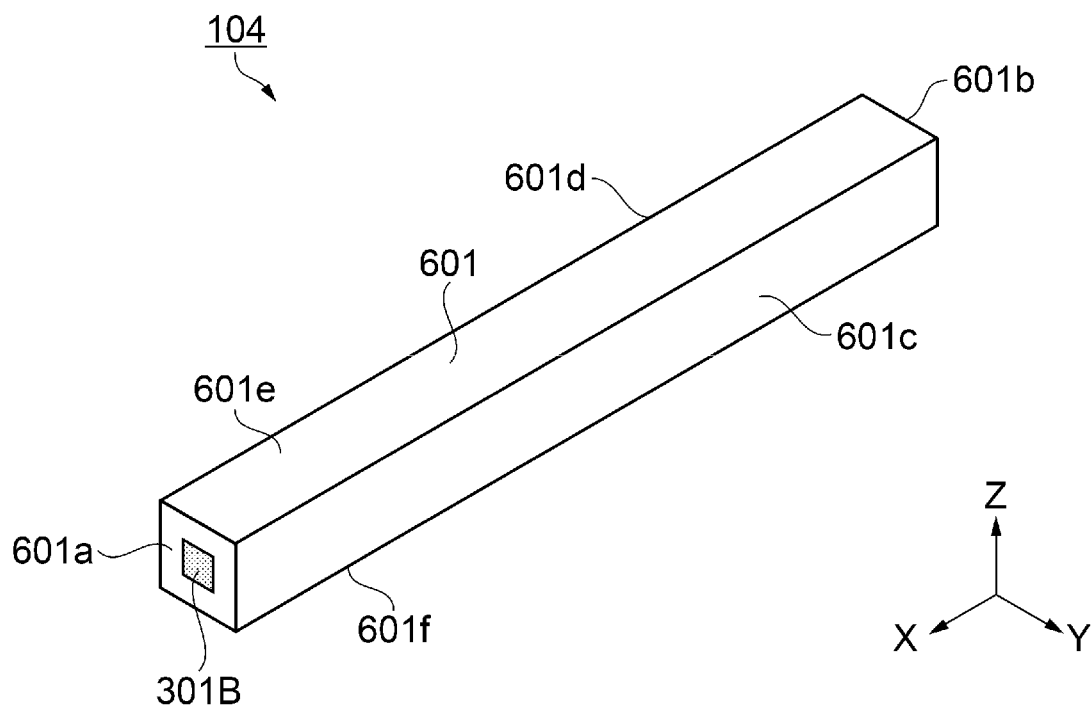
FIG. 4A is a perspective view showing a projector according to Embodiment 4.
Figure 4B:
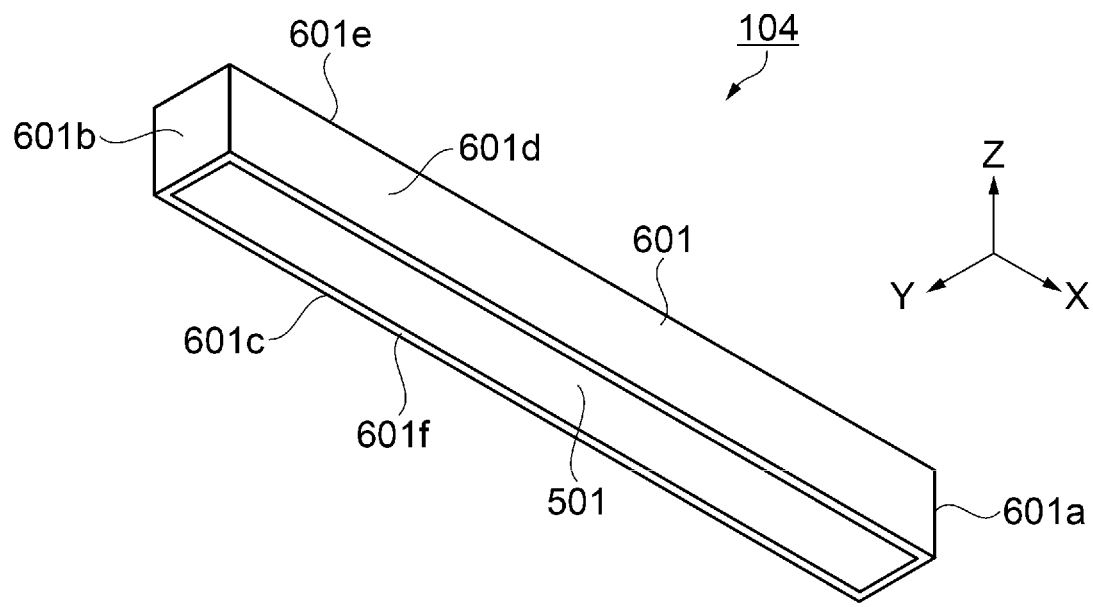
FIG. 4B is a perspective view showing the projector according to Embodiment 4.

FIGS. 4A and 4B are perspective views showing the projector 104 according to Embodiment 4. In detail, FIG. 4A is a perspective view of the projector 104 viewed obliquely downward from a position above, in front of, and on the right of the projector 104. FIG. 4B is a perspective view of the projector 104 viewed obliquely upward from a position below, behind, and on the left of the projector 104.

In the projector 104 according to Embodiment 4, as compared with Embodiment 3, in which the light transmissive member 301A is so disposed as to not to cover the outer edge portion of the front surface 601a, a light transmissive member 301B in Embodiment 4 has a quadrangular shape having an area smaller than that of the light transmissive member 301A and is disposed in a roughly central portion of the front surface 601a. The other configurations are the same as those of the projector 101 according to Embodiment 1.

Embodiment 5

A projector 105 according to Embodiment 5 will be described with reference to FIGS. 5A and 5B.

Figure 5A:
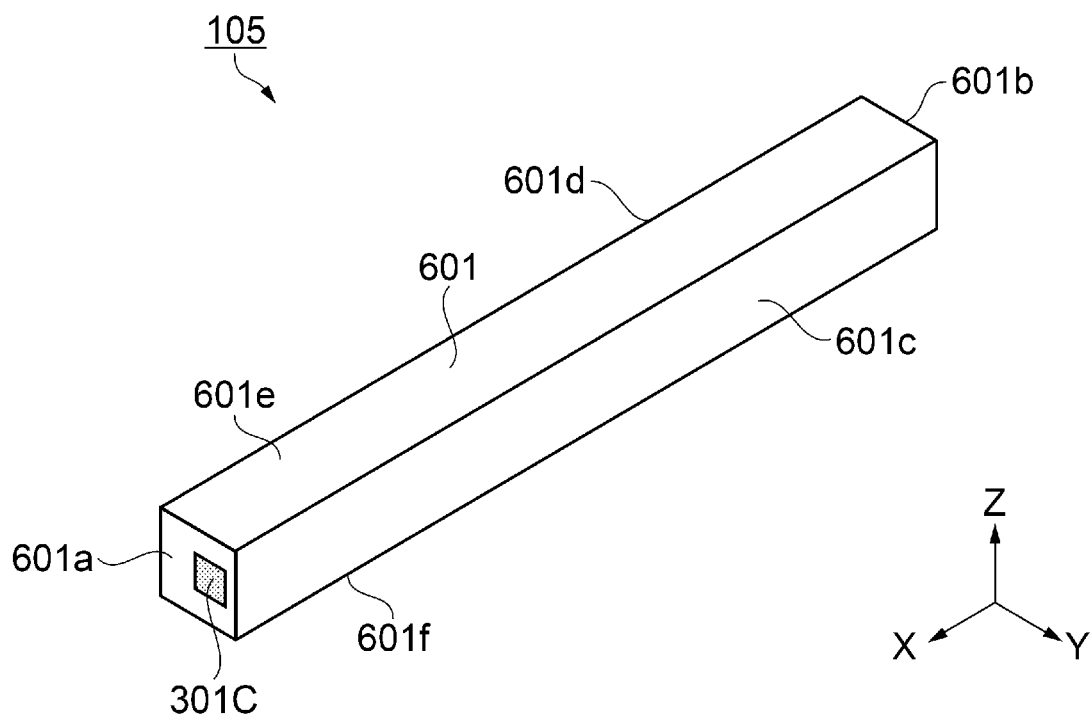
FIG. 5A is a perspective view showing a projector according to Embodiment 5.
Figure 5B:
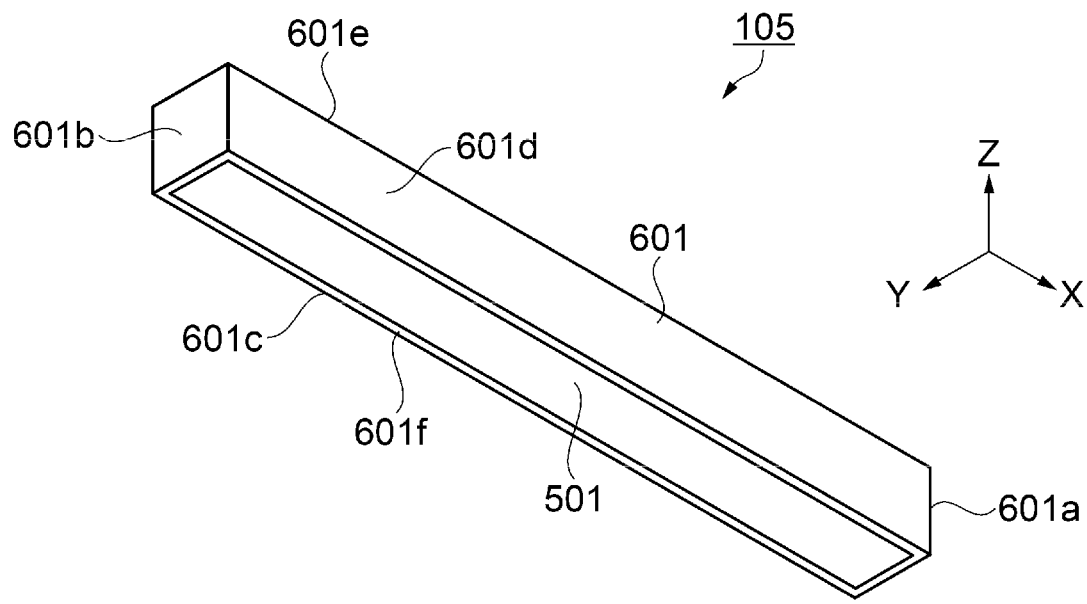
FIG. 5B is a perspective view showing the projector according to Embodiment 5.

FIGS. 5A and 5B are perspective views showing the projector 105 according to Embodiment 5. In detail, FIG. 5A is a perspective view of the projector 105 viewed obliquely downward from a position above, in front of, and on the right of the projector 105. FIG. 5B is a perspective view of the projector 105 viewed obliquely upward from a position below, behind, and on the left of the projector 105.

In the projector 105 according to Embodiment 5, as compared with Embodiment 4, in which the light transmissive member 301B is so disposed in the roughly central portion, a light transmissive member 301C in Embodiment 5 is disposed in a position shifted from the center of the front surface 601a. The other configurations are the same as those of the projector 101 according to Embodiment 1.

Embodiment 6

A projector 106 according to Embodiment 6 will be described with reference to FIGS. 6A, 6B, and 6C.

Figure 6A:
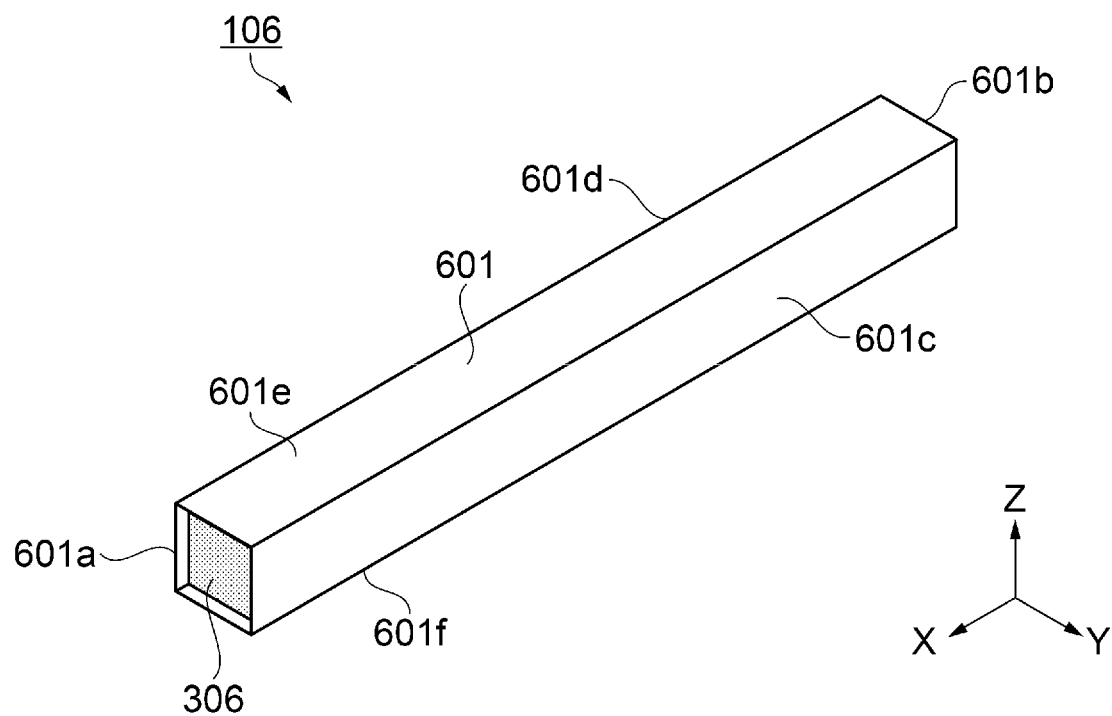
FIG. 6A is a perspective view showing a projector according to Embodiment 6.
Figure 6B:
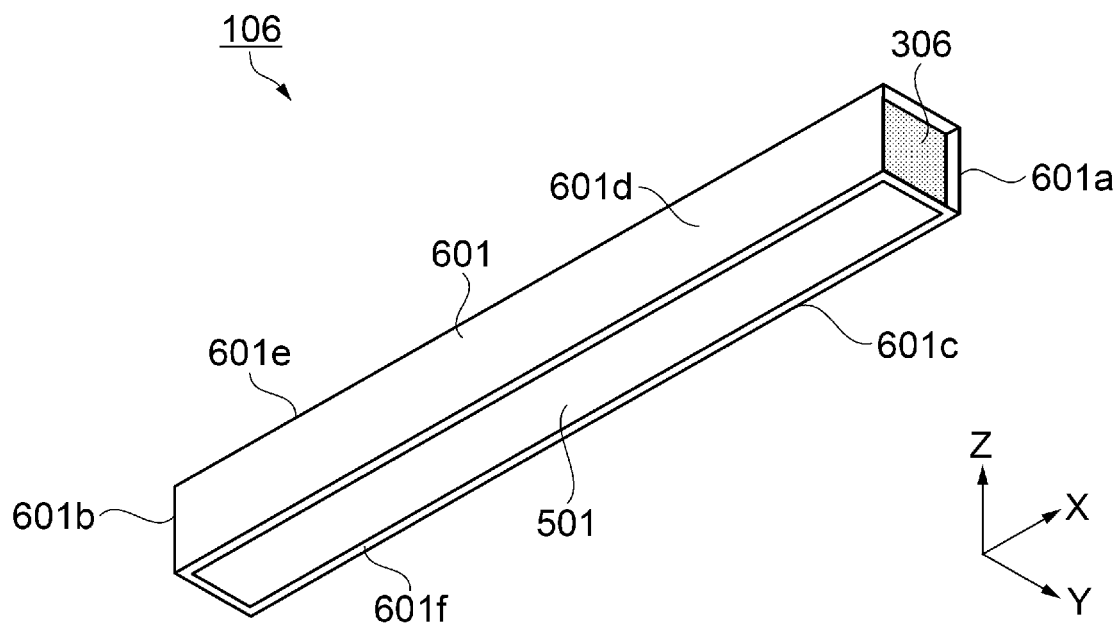
FIG. 6B is a perspective view showing the projector according to Embodiment 6.
Figure 6C:
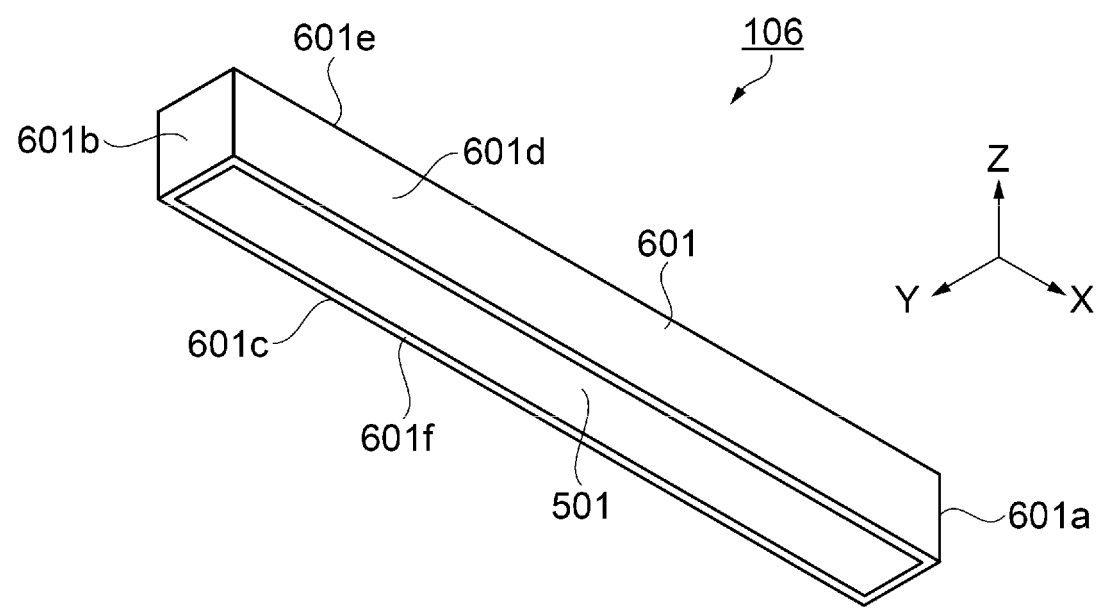
FIG. 6C is a perspective view showing the projector according to Embodiment 6.

FIGS. 6A, 6B, and 6C are perspective views showing the projector 106 according to Embodiment 6. In detail, FIG. 6A is a perspective view of the projector 106 viewed obliquely downward from a position above, in front of, and on the right of the projector 106. FIG. 6B is a perspective view of the projector 106 viewed obliquely upward from a position below, in front of, and on the left of the projector 106. FIG. 6C is a perspective view of the projector 106 viewed obliquely upward from a position below, behind, and on the left of the projector 106.

In the projector 106 according to Embodiment 6, as compared with Embodiment 1, in which the light transmissive member 301 is so disposed as to cover the entire front surface 601a of the enclosure 601, a light transmissive member 306 in Embodiment 6 is disposed inside the front surface 601a. The other configurations are the same as those of the projector 101 according to Embodiment 1.

Embodiment 7

A projector 107 according to Embodiment 7 will be described with reference to FIGS. 7A, 7B, and 7C.

Figure 7A:
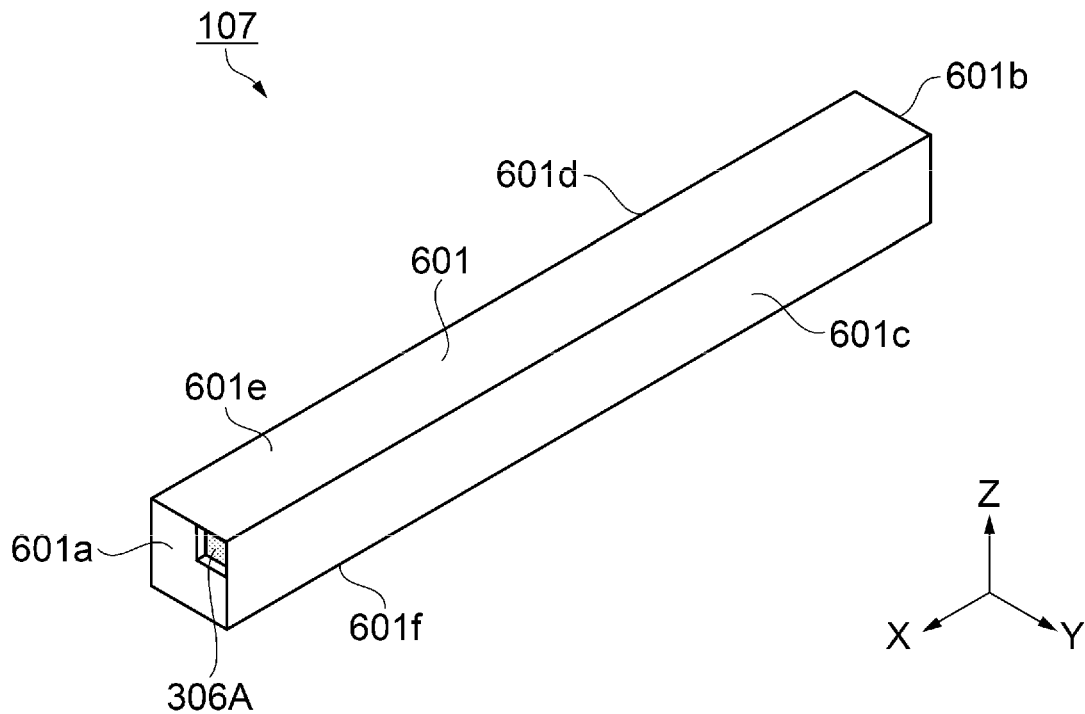
FIG. 7A is a perspective view showing a projector according to Embodiment 7.
Figure 7B:
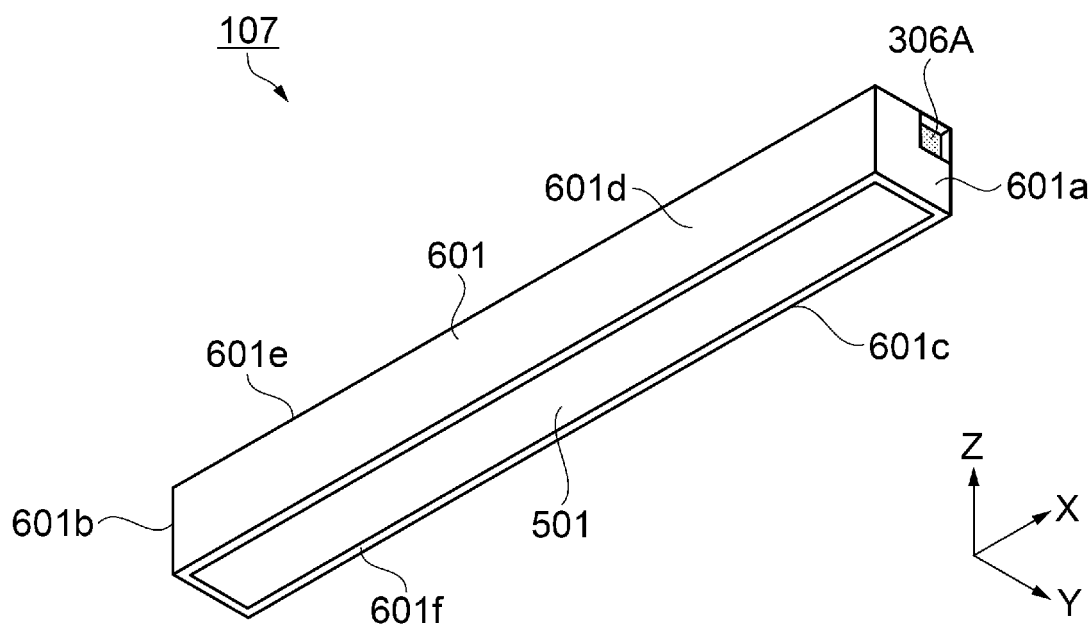
FIG. 7B is a perspective view showing the projector according to Embodiment 7.
Figure 7C:
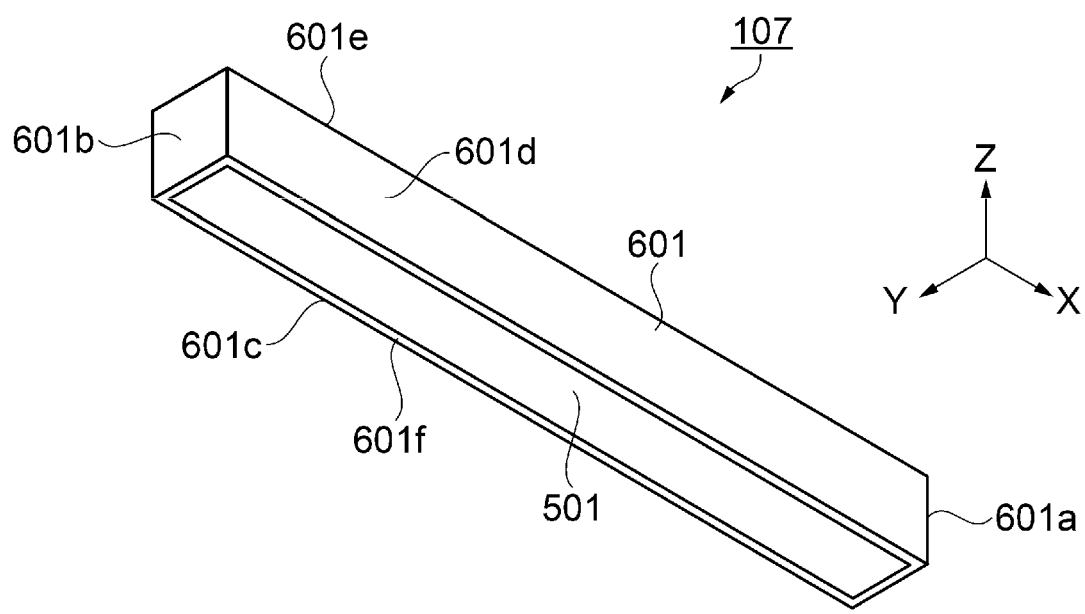
FIG. 7C is a perspective view showing the projector according to Embodiment 7.

FIGS. 7A, 7B, and 7C are perspective views showing the projector 107 according to Embodiment 7. In detail, FIG. 7A is a perspective view of the projector 107 viewed obliquely downward from a position above, in front of, and on the right of the projector 107. FIG. 7B is a perspective view of the projector 107 viewed obliquely upward from a position below, in front of, and on the left of the projector 107. FIG. 7C is a perspective view of the projector 107 viewed obliquely upward from a position below, behind, and on the left of the projector 107.

The projector 107 according to Embodiment 7 as compared with Embodiment 6, in which the light transmissive member 306 is disposed inside the front surface 601a of the enclosure 601, a light transmissive member 306A in Embodiment 7 is disposed in a corner portion of the front surface 601a and inside the front surface 601a. The other configurations are the same as those of the projector 106 according to Embodiment 6.

Embodiment 8

A projector 108 according to Embodiment 8 will be described with reference to FIGS. 8A, 8B, and 8C.

Figure 8A:
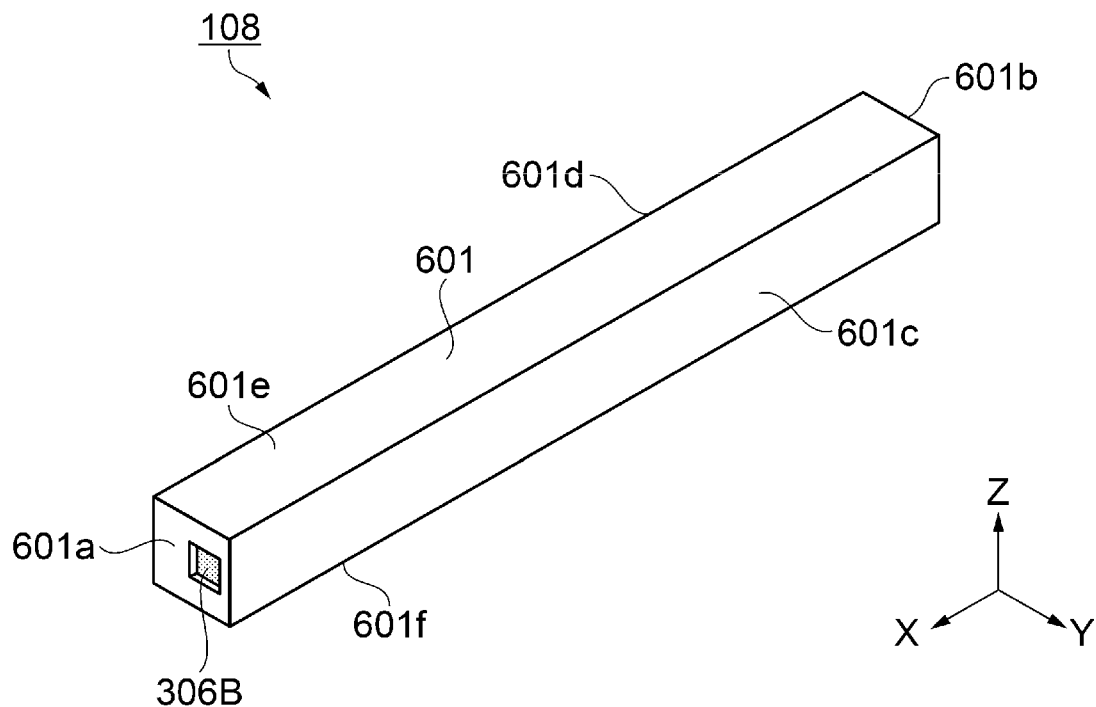
FIG. 8A is a perspective view showing a projector according to Embodiment 8.
Figure 8B:
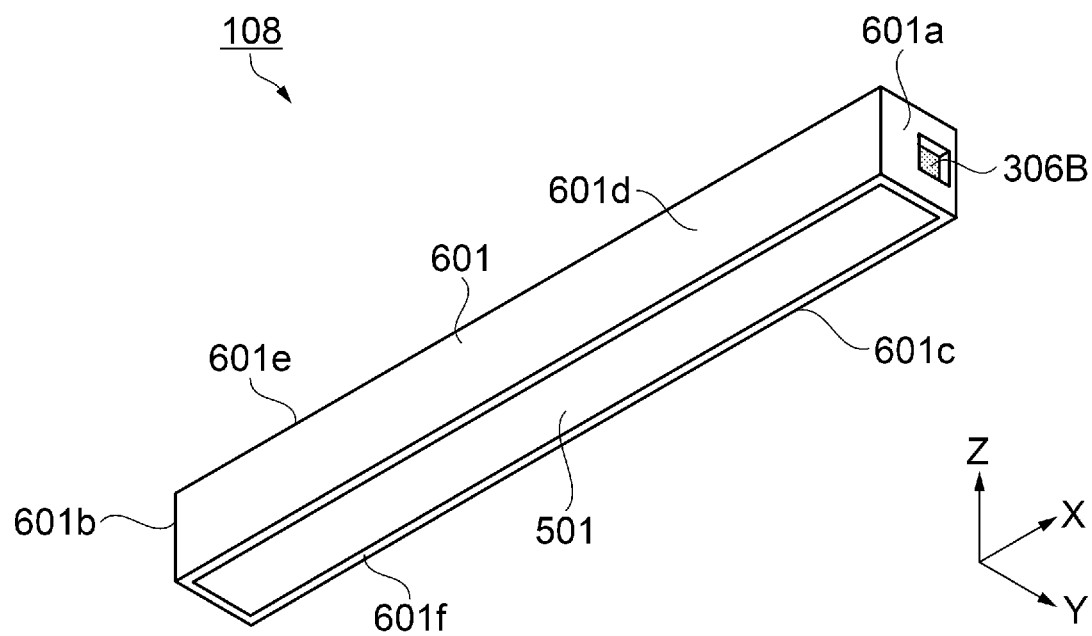
FIG. 8B is a perspective view showing the projector according to Embodiment 8.
Figure 8C:
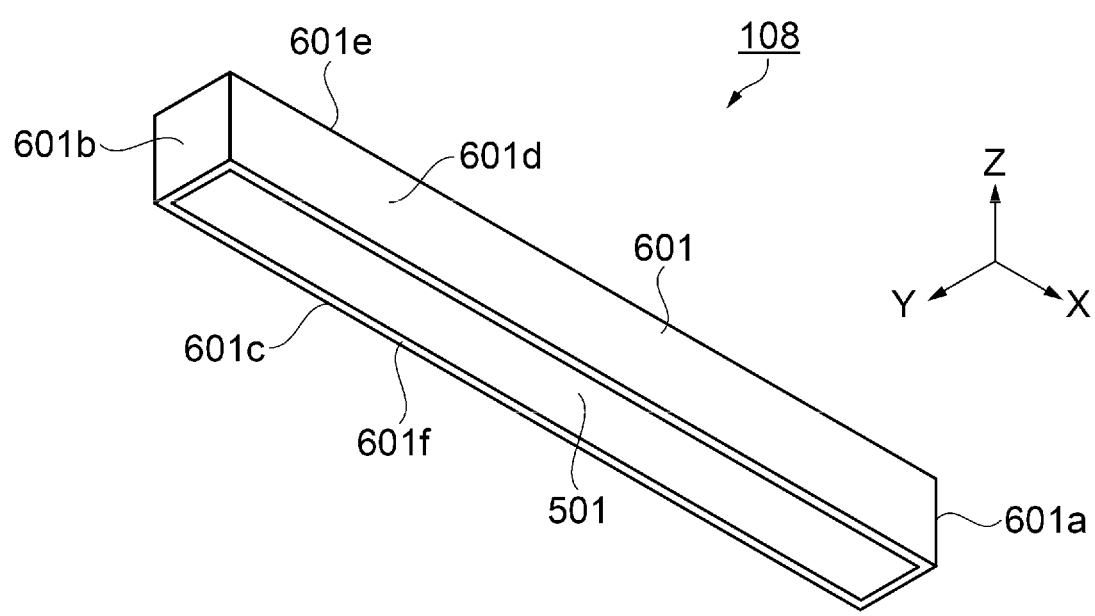
FIG. 8C is a perspective view showing the projector according to Embodiment 8.

FIGS. 8A, 8B, and 8C are perspective views showing the projector 108 according to Embodiment 8. In detail, FIG. 8A is a perspective view of the projector 108 viewed obliquely downward from a position above, in front of, and on the right of the projector 108. FIG. 8B is a perspective view of the projector 108 viewed obliquely upward from a position below, in front of, and on the left of the projector 108. FIG. 8C is a perspective view of the projector 108 viewed obliquely upward from a position below, behind, and on the left of the projector 108.

In the projector 108 according to Embodiment 8, as compared with Embodiment 7, in which the light transmissive member 306A in Embodiment 7 is disposed in the corner portion of the front surface 601a of the enclosure 601 and inside the front surface 601a, a light transmissive member 306B in Embodiment 8 is disposed in a central portion or a peripheral portion of the front surface 601a and inside the front surface 601a. The other configurations are the same as those of the projector 106 according to Embodiment 6.

Embodiment 9

A projector 109 according to Embodiment 9 will be described with reference to FIGS. 9A, 9B, and 9C.

Figure 9A:
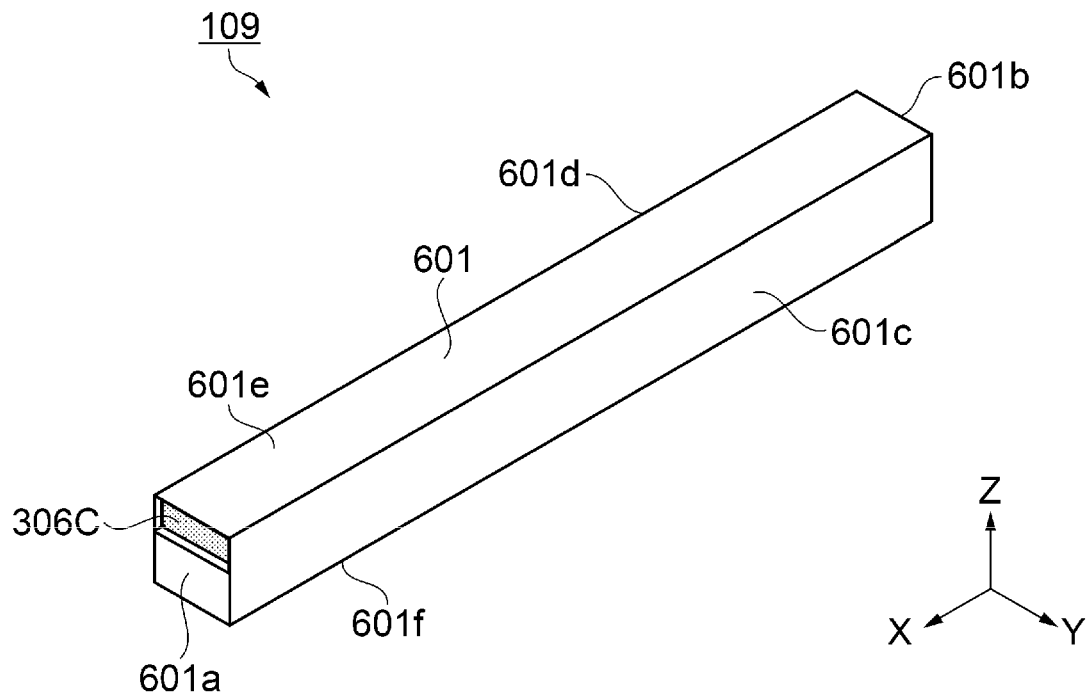
FIG. 9A is a perspective view showing a projector according to Embodiment 9.
Figure 9B:
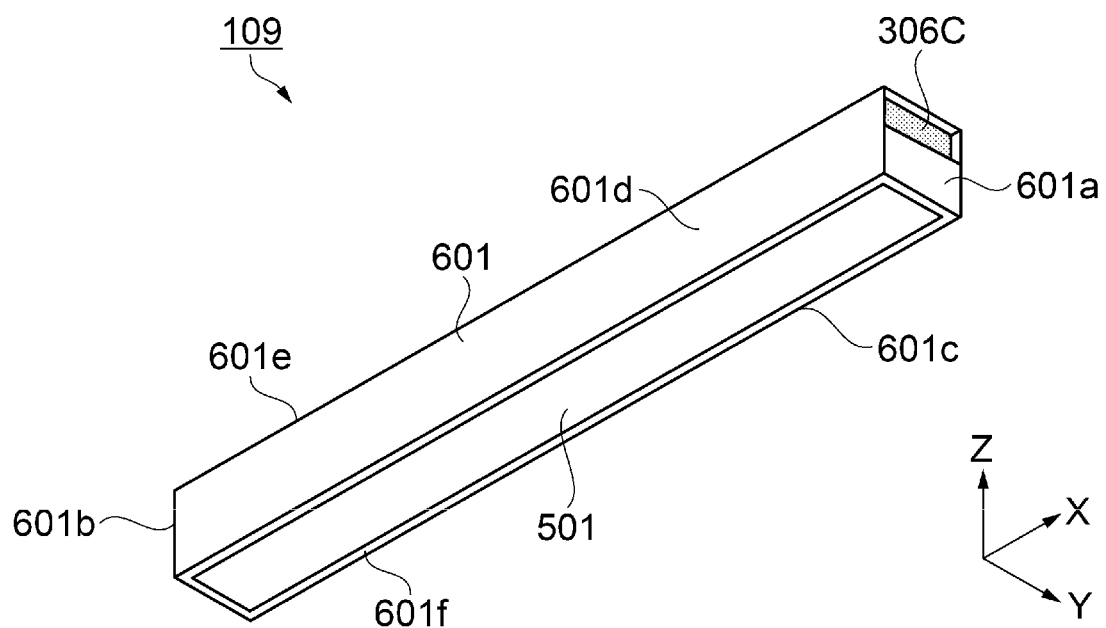
FIG. 9B is a perspective view showing the projector according to Embodiment 9.
Figure 9C:
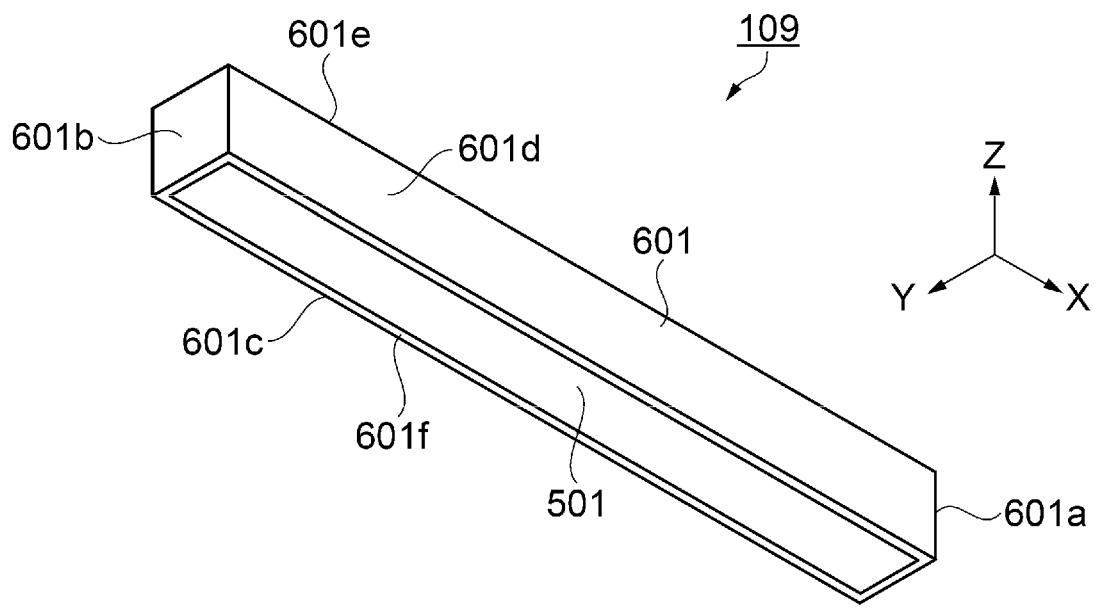
FIG. 9C is a perspective view showing the projector according to Embodiment 9.

FIGS. 9A, 9B, and 9C are perspective views showing the projector 109 according to Embodiment 9. In detail, FIG. 9A is a perspective view of the projector 109 viewed obliquely downward from a position above, in front of, and on the right of the projector 109. FIG. 9B is a perspective view of the projector 109 viewed obliquely upward from a position below, in front of, and on the left of the projector 109. FIG. 9C is a perspective view of the projector 109 viewed obliquely upward from a position below, behind, and on the left of the projector 109.

The projector 109 according to Embodiment 9, as compared with Embodiment 7, in which the light transmissive member 306A is disposed in the corner portion of the front surface 601a of the enclosure 601 and inside the front surface 601a, a light transmissive member 306C in Embodiment 9 is disposed along the periphery of the front surface 601a and inside the front surface 601a. The other configurations are the same as those of the projector 106 according to Embodiment 6.

Embodiment 10

A projector 110 according to Embodiment 10 will be described with reference to FIGS. 10A to 10H.

Figure 10A:
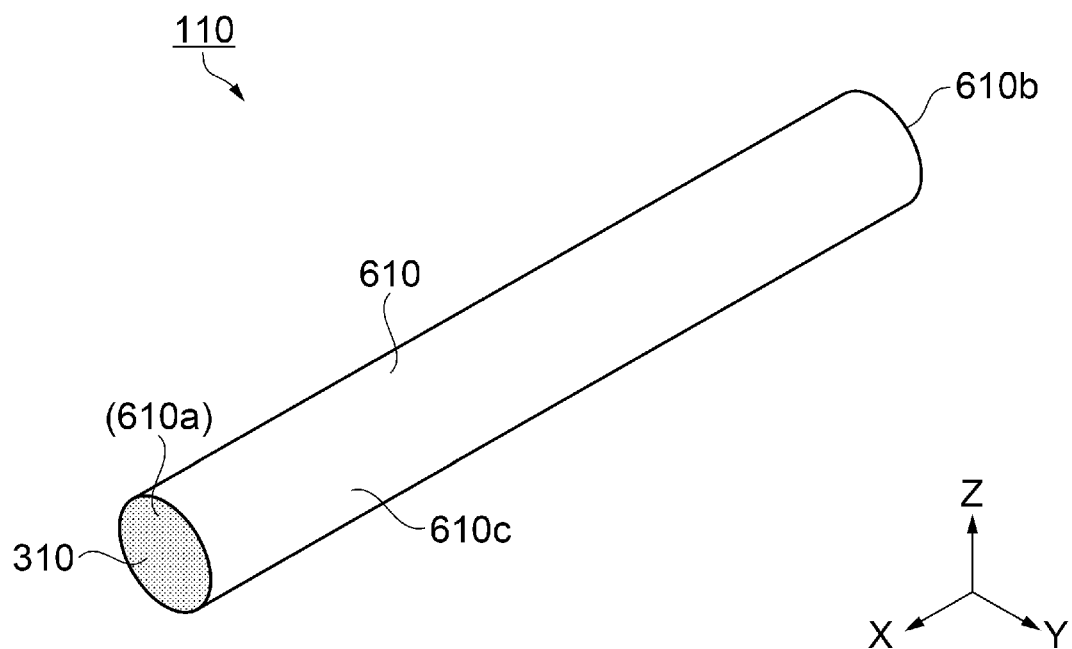
FIG. 10A is a perspective view showing a projector according to Embodiment 10.
Figure 10B:
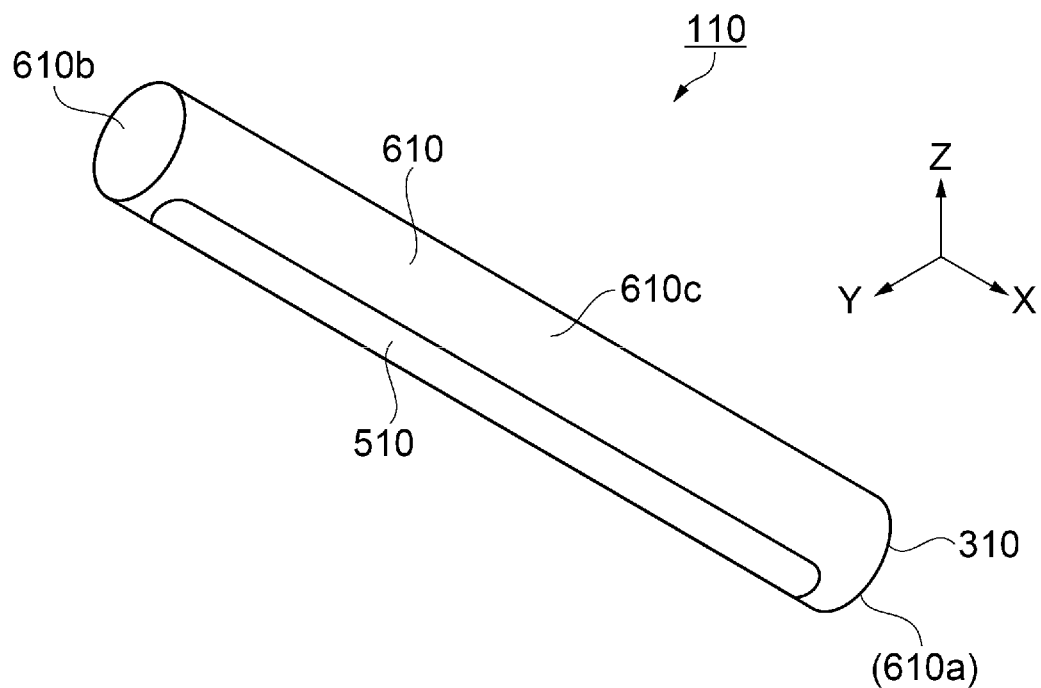
FIG. 10B is a perspective view showing the projector according to Embodiment 10.

FIGS. 10A and 10B are perspective views showing the projector 110 according to Embodiment 10. In detail, FIG. 10A is a perspective view of the projector 110 viewed obliquely downward from a position above, in front of, and on the right of the projector 110. FIG. 10B is a perspective view of the projector 110 viewed obliquely upward from a position below, behind, and on the left of the projector 110.

Figure 10C:
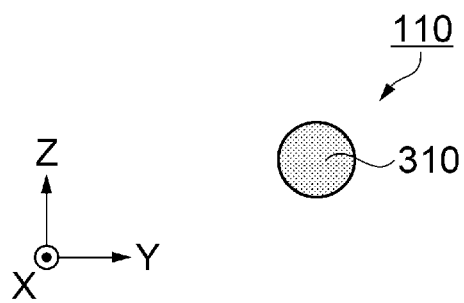
FIG. 10C shows the projector according to Embodiment 10 viewed along an axis.
Figure 10D:
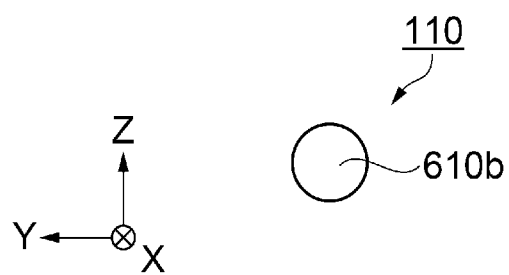
FIG. 10D shows the projector according to Embodiment 10 viewed along another axis.
Figure 10E:
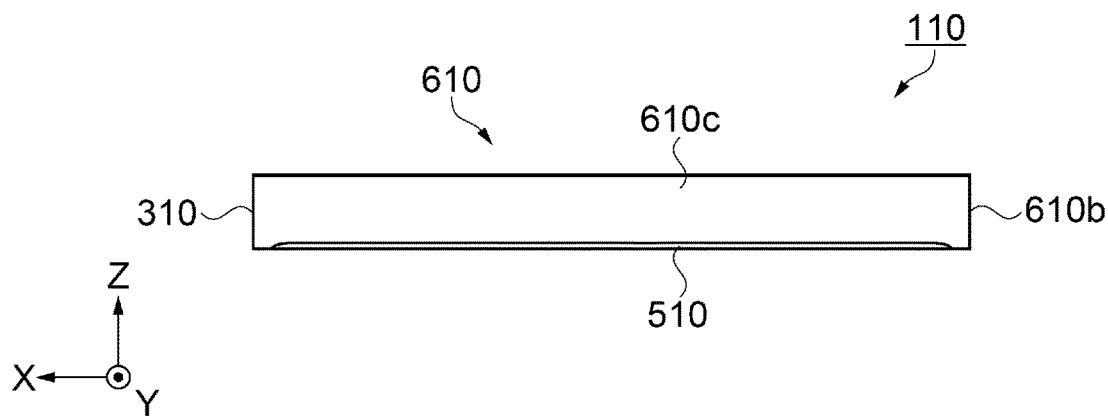
FIG. 10E shows the projector according to Embodiment 10 viewed along another axis.
Figure 10F:
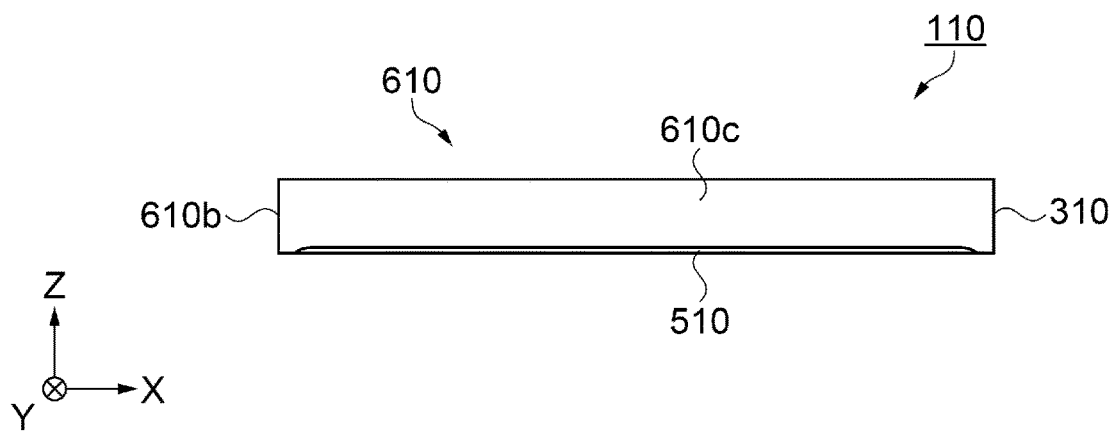
FIG. 10F shows the projector according to Embodiment 10 viewed along another axis.
Figure 10G:
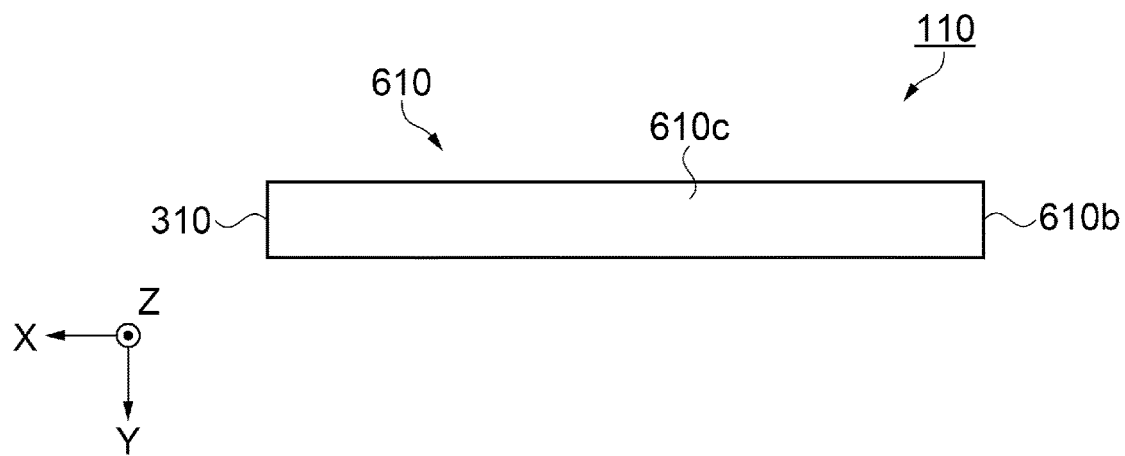
FIG. 10G shows the projector according to Embodiment 10 viewed along another axis.
Figure 10H:
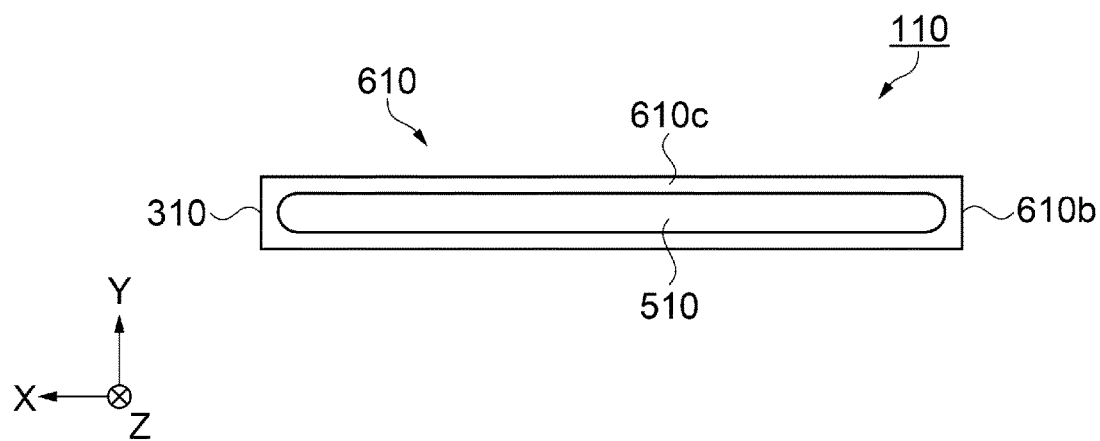
FIG. 10H shows the projector according to Embodiment 10 viewed along another axis.

FIGS. 10C to 10H show the projector 110 according to Embodiment 10 viewed along the three axes described above. In detail, FIG. 10C shows the projector 110 viewed along the axis-X(+) direction (front view). FIG. 10D shows the projector 110 viewed along the axis-X(−) direction (rear view). FIG. 10E shows the projector 110 viewed along the axis-Y(+) direction (right side view). FIG. 10F shows the projector 110 viewed along the axis-Y(−) direction (left side view). FIG. 10G shows the projector 110 viewed along the axis-Z(+) direction (top view). FIG. 10H shows the projector 110 viewed along the axis-Z(−) direction (bottom view).

In the projector 110 according to Embodiment 10, as compared with the projector 101 according to Embodiment 1, in which the enclosure 601 in Embodiment 1 has a quadrangular cross section (cross section taken along plane YZ) and is configured to extend in the form of a column, an enclosure 610 in Embodiment 10 has a circular cross section (cross section taken along plane YZ) and is configured to extend in the form of a column.

The enclosure 610 in Embodiment 10 has end surfaces on opposite sides in the X-axis direction, which is the lengthwise direction in which the enclosure 610 having the circular cross section extends in the form of a column, and the two end surfaces are defied as follows: The X(+)-axis-side end surface is a front surface 610a; and the X(−)-axis-side end surface is a rear surface 610b. The side surface of the columnar shape having the circular cross section is called an outer circumferential surface 610c.

A light transmissive member 310 is formed in a circular shape accordingly. In the projector 110 according to Embodiment 10, the light transmissive member 310 is so disposed as to cover the entire front surface 610a, as shown in FIG. 10A, as is the light transmissive member 301 in Embodiment 1. A diffusion member 510 is disposed in a lower portion of the outer circumferential surface 610c of the enclosure 610, as shown in FIG. 10B. The diffusion member 510 has a roughly track-like plan shape and is formed of a curved surface that follows the outer circumferential surface 610c.

Embodiment 11

A projector 111 according to Embodiment 11 will be described with reference to FIGS. 11A to 11H.

Figure 11A:
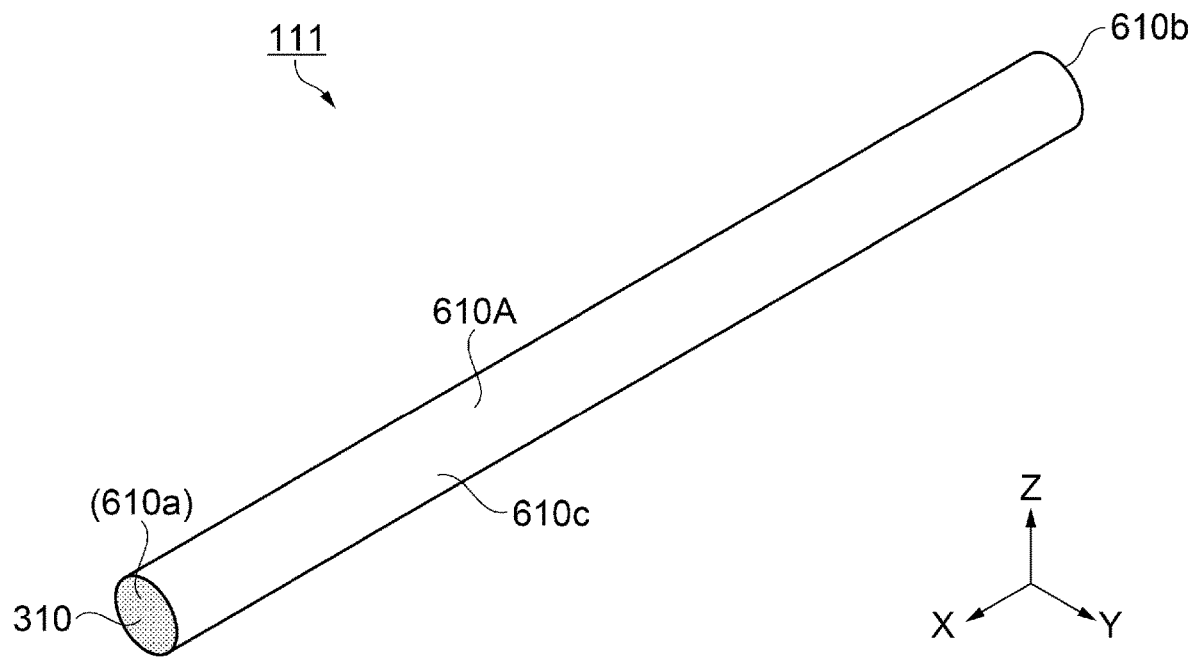
FIG. 11A is a perspective view showing a projector according to Embodiment 11.
Figure 11B:
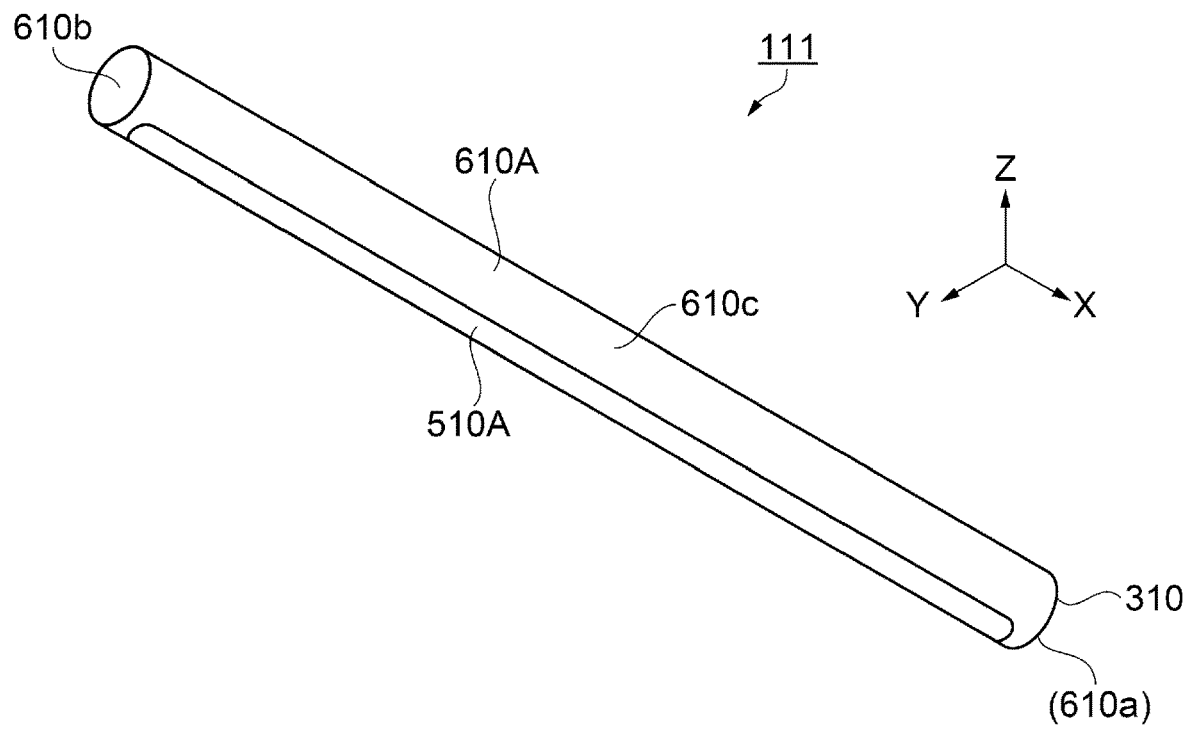
FIG. 11B is a perspective view showing the projector according to Embodiment 11.

FIGS. 11A and 11B are perspective views showing the projector 111 according to Embodiment 11. In detail, FIG. 11A is a perspective view of the projector 111 viewed obliquely downward from a position above, in front of, and on the right of the projector 111. FIG. 11B is a perspective view of the projector 111 viewed obliquely upward from a position below, behind, and on the left of the projector 111.

Figure 11C:
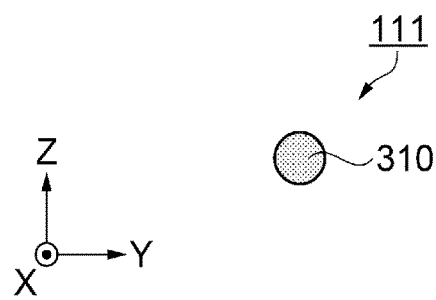
FIG. 11C shows the projector according to Embodiment 11 viewed along an axis.
Figure 11D:
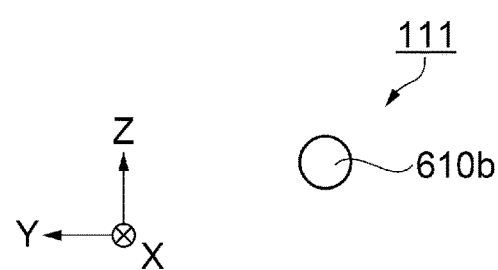
FIG. 11D shows the projector according to Embodiment 11 viewed along another axis.
Figure 11E:
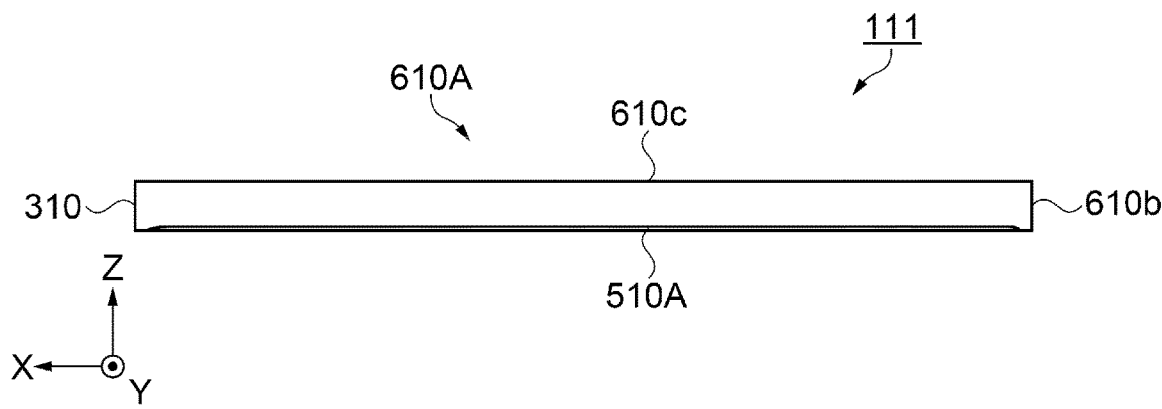
FIG. 11E shows the projector according to Embodiment 11 viewed along another axis.
Figure 11F:
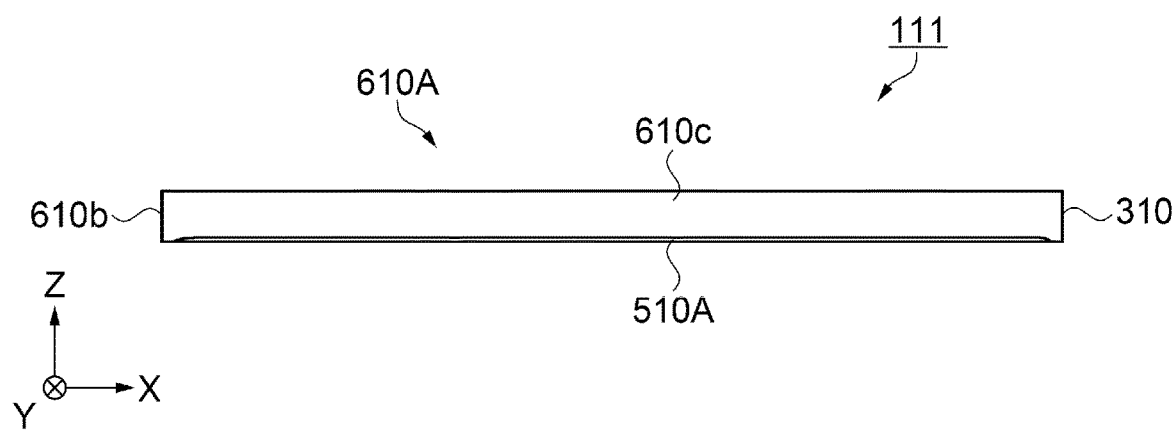
FIG. 11F shows the projector according to Embodiment 11 viewed along another axis.
Figure 11G:
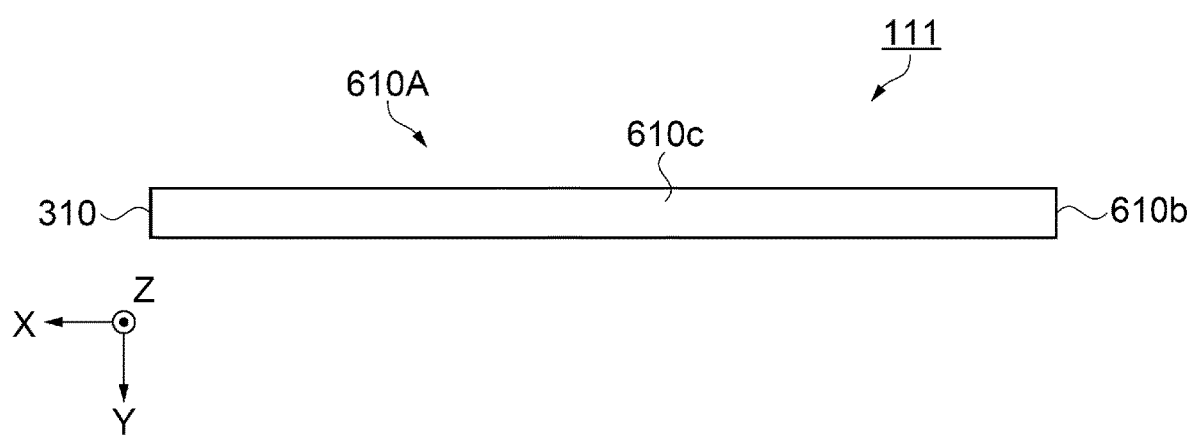
FIG. 11G shows the projector according to Embodiment 11 viewed along another axis.
Figure 11H:
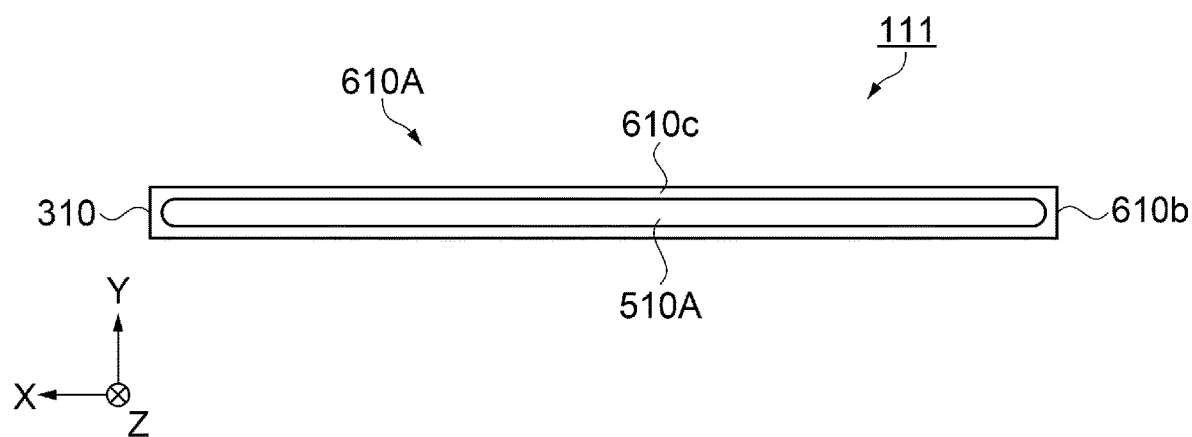
FIG. 11H shows the projector according to Embodiment 11 viewed along another axis.

FIGS. 11C to 11H show the projector 111 according to Embodiment 11 viewed along the three axes described above. In detail, FIG. 11C shows the projector 111 viewed along the axis-X(+) direction (front view). FIG. 11D shows the projector 111 viewed along the axis-X(−) direction (rear view). FIG. 11E shows the projector 111 viewed along the axis-Y(+) direction (right side view). FIG. 11F shows the projector 111 viewed along the axis-Y(−) direction (left side view). FIG. 11G shows the projector 111 viewed along the axis-Z(+) direction (top view). FIG. 11H shows the projector 111 viewed along the axis-Z(−) direction (bottom view).

The projector 111 according to Embodiment 11, as compared with the projector 110 according to Embodiment 10, an enclosure 610A, which forms the exterior of the projector 111, is longer in the X-axis direction than the enclosure 610 in Embodiment 10. A diffusion member 510A is configured accordingly to be longer in the X-axis direction than the diffusion member 510 in Embodiment 10. The other configurations are the same as those of the projector 110 according to Embodiment 10.

Embodiment 12

A projector 112 according to Embodiment 12 will be described with reference to FIGS. 12A and 12B.

Figure 12A:
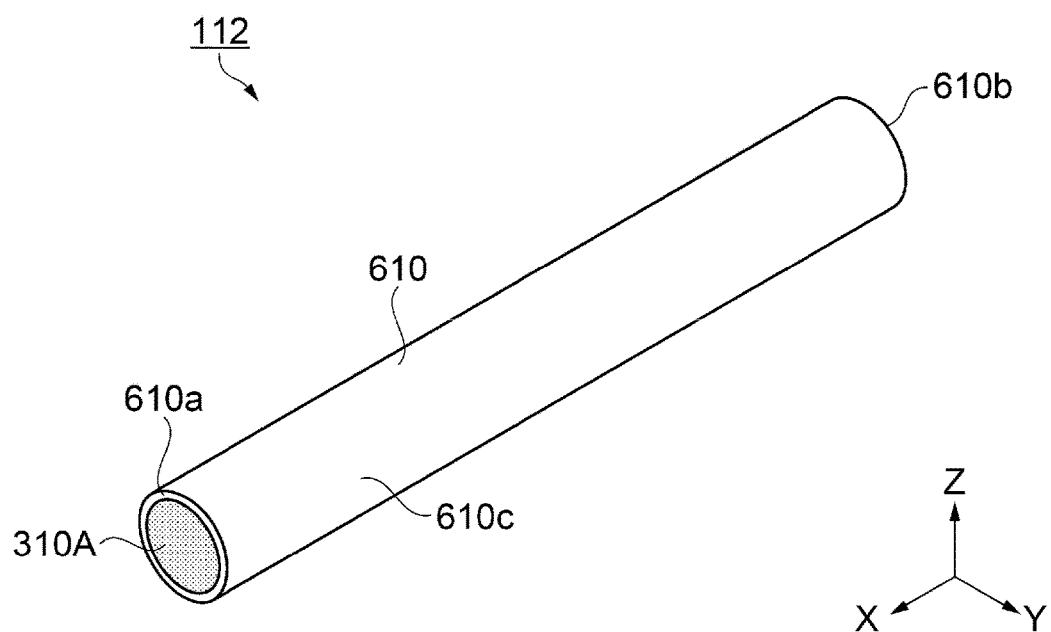
FIG. 12A is a perspective view showing a projector according to Embodiment 12.
Figure 12B:
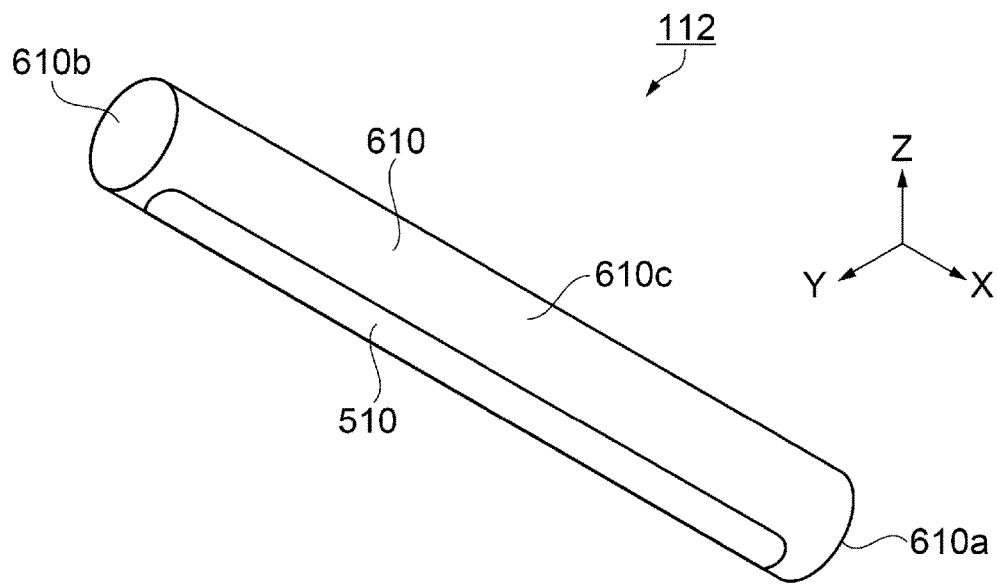
FIG. 12B is a perspective view showing the projector according to Embodiment 12.

FIGS. 12A and 12B are perspective views showing the projector 112 according to Embodiment 12. In detail, FIG. 12A is a perspective view of the projector 112 viewed obliquely downward from a position above, in front of, and on the right of the projector 112. FIG. 12B is a perspective view of the projector 112 viewed obliquely upward from a position below, behind, and on the left of the projector 112.

In the projector 112 according to Embodiment 12, as compared with Embodiment 10, in which the light transmissive member 310 is so disposed as to cover the entire front surface 610a of the enclosure 610, a light transmissive member 310A in Embodiment 12 is so disposed as not to cover an outer edge portion of the front surface 610a. The other configurations are the same as those of the projector 110 according to Embodiment 10.

Embodiment 13

A projector 113 according to Embodiment 13 will be described with reference to FIGS. 13A to 13H.

Figure 13A:
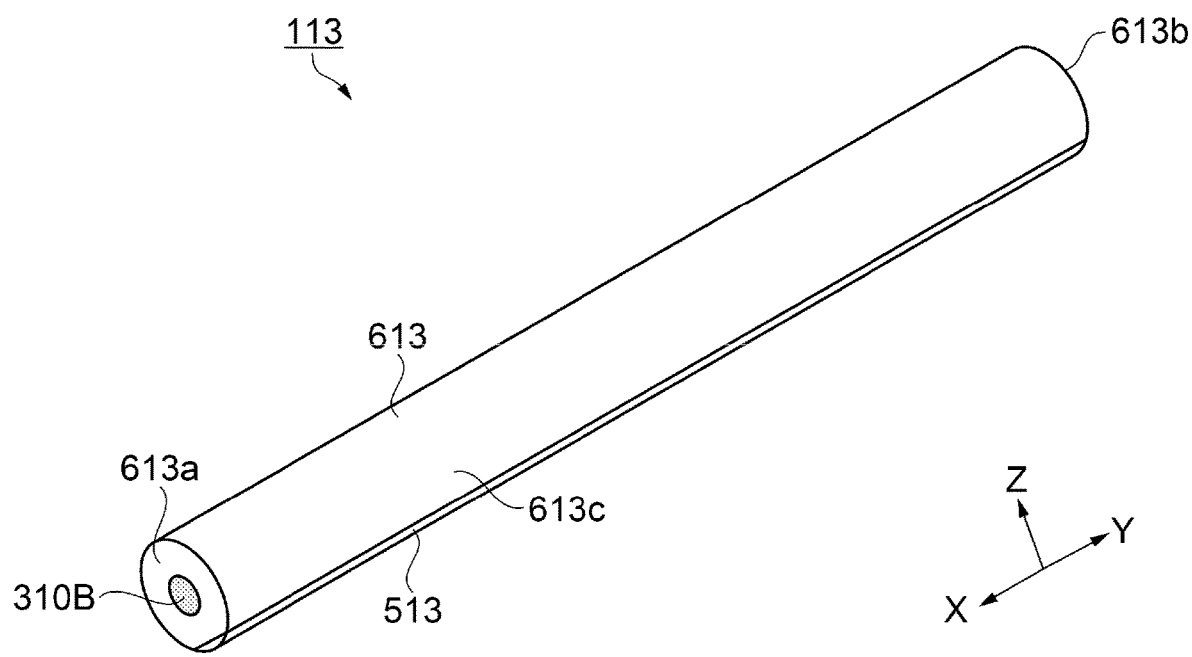
FIG. 13A is a perspective view showing a projector according to Embodiment 13.
Figure 13B:
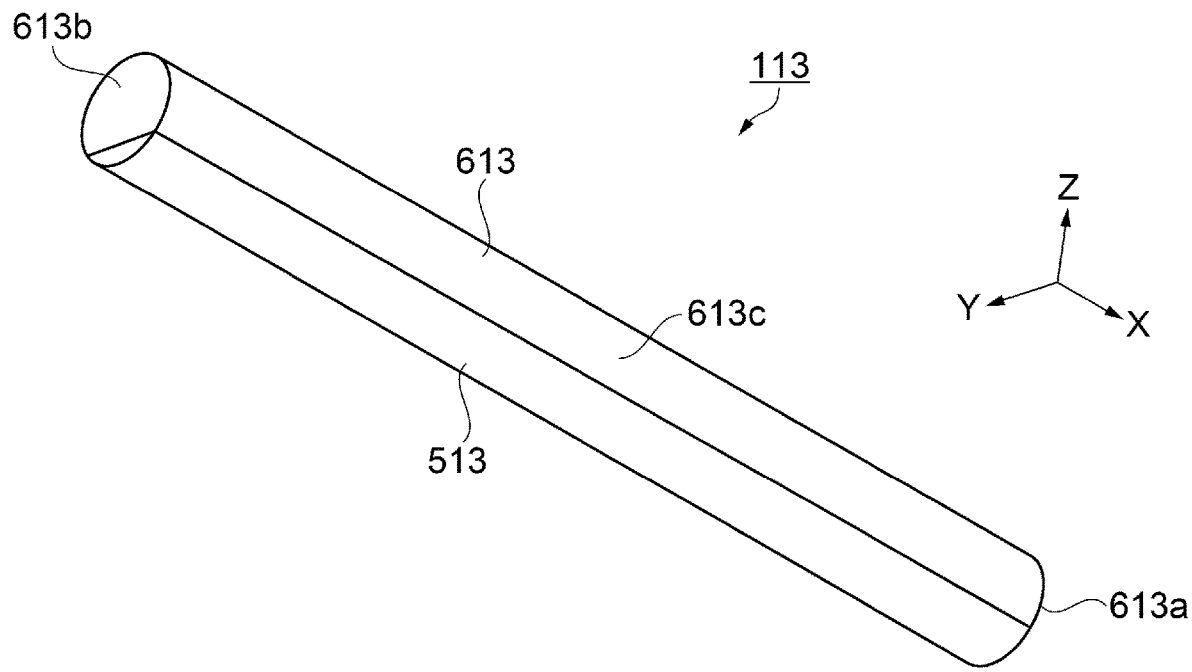
FIG. 13B is a perspective view showing the projector according to Embodiment 13.

FIGS. 13A and 13B are perspective views showing the projector 113 according to Embodiment 13. In detail, FIG. 13A is a perspective view of the projector 113 viewed obliquely downward from a position above, in front of, and on the right of the projector 113. FIG. 13B is a perspective view of the projector 113 viewed obliquely upward from a position below, behind, and on the left of the projector 113.

Figure 13C:
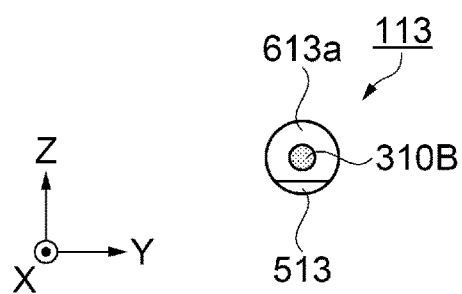
FIG. 13C shows the projector according to Embodiment 13 viewed along an axis.
Figure 13D:
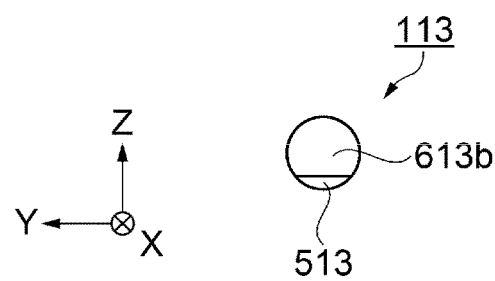
FIG. 13D shows the projector according to Embodiment 13 viewed along another axis.
Figure 13E:
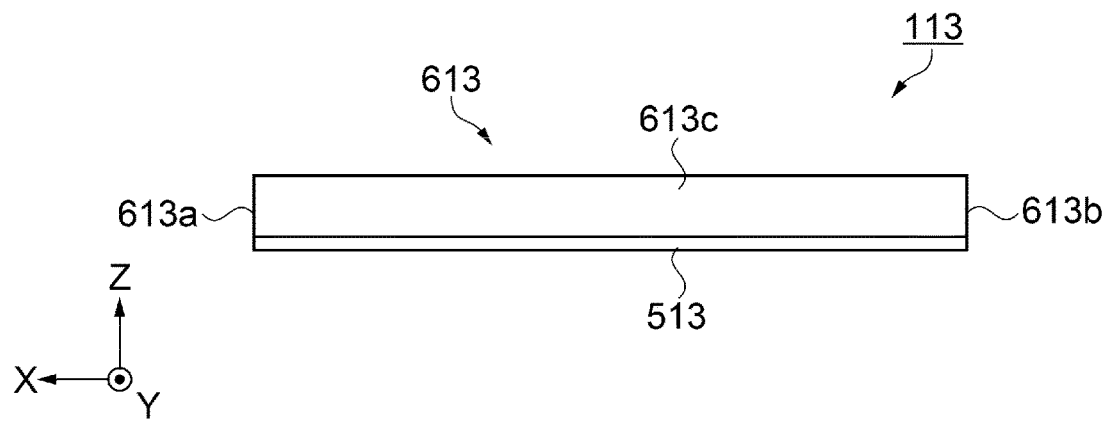
FIG. 13E shows the projector according to Embodiment 13 viewed along another axis.
Figure 13F:
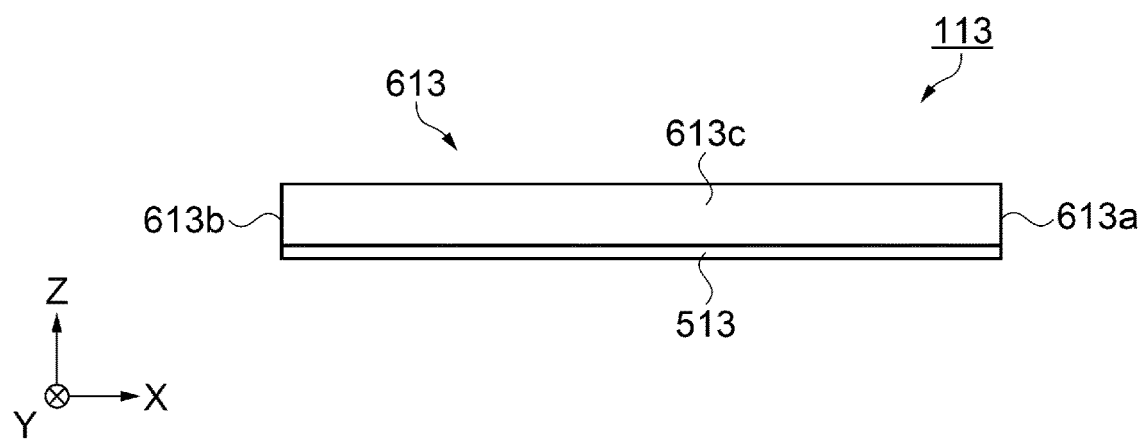
FIG. 13F shows the projector according to Embodiment 13 viewed along another axis.
Figure 13G:
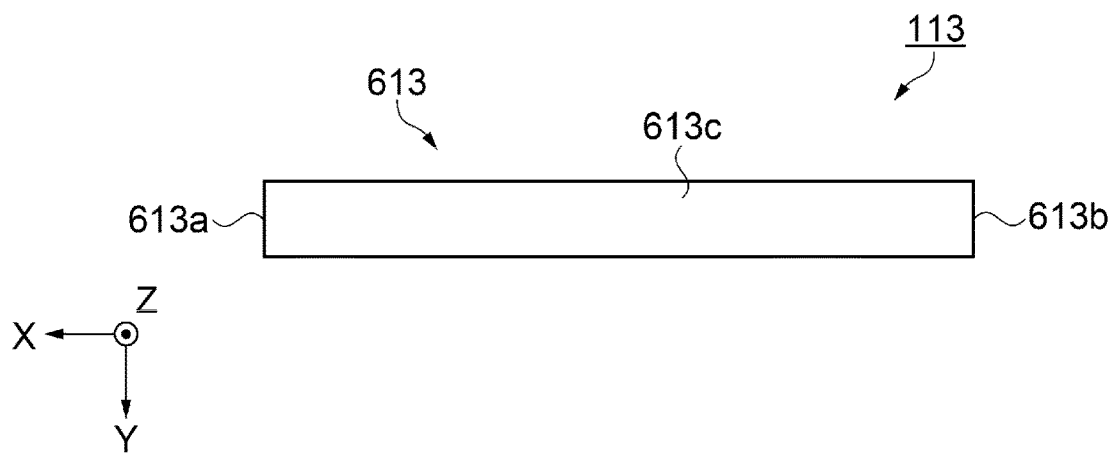
FIG. 13G shows the projector according to Embodiment 13 viewed along another axis.
Figure 13H:
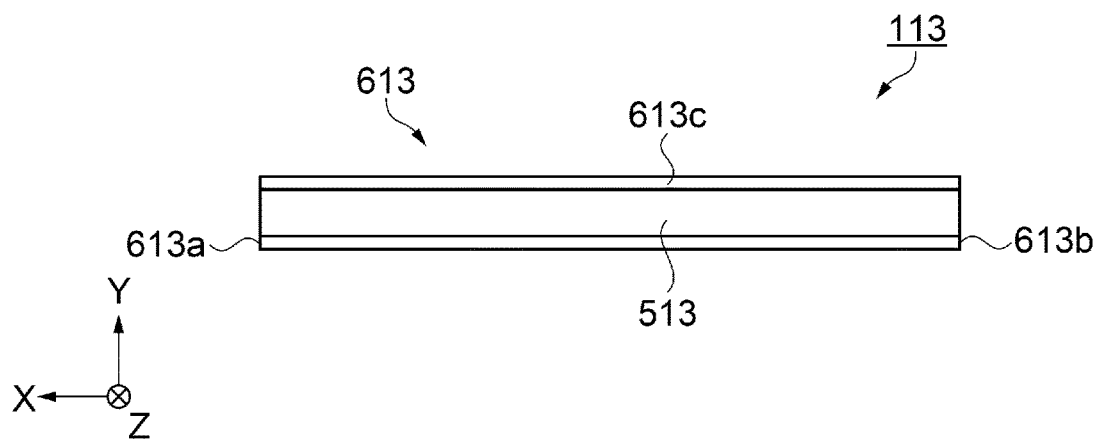
FIG. 13H shows the projector according to Embodiment 13 viewed along another axis.

FIGS. 13C to 13H show the projector 113 according to Embodiment 13 viewed along the three axes described above. In detail, FIG. 13C shows the projector 113 viewed along the axis-X(+) direction (front view). FIG. 13D shows the projector 113 viewed along the axis-X(−) direction (rearview). FIG. 13E shows the projector 113 viewed along the axis-Y(+) direction (right side view). FIG. 13F shows the projector 113 viewed along the axis-Y(−) direction (left side view). FIG. 13G shows the projector 113 viewed along the axis-Z(+) direction (top view). FIG. 13H shows the projector 113 viewed along the axis-Z(−) direction (bottom view).

An enclosure 613 in Embodiment 13 has end surfaces on opposite sides in the X-axis direction, which is the lengthwise direction in which the enclosure 613 having a circular cross section extends in the form of a column, and the two end surfaces are defied as follows: The X(+)-axis-side end surface is a front surface 613a; and the X(−)-axis-side end surface is a rear surface 613b. The side surface of the columnar shape having the circular cross section is called an outer circumferential surface 613c.

In the projector 113 according to Embodiment 13, as compared with Embodiment 12, in which the light transmissive member 310A is so disposed as not to cover the outer edge portion of the front surface 613a, a light transmissive member 310B in Embodiment 13 has a circular shape having an area smaller than that of the light transmissive member 310A and is disposed in a roughly central portion of the front surface 613a.

The diffusion member 510 in Embodiment 10 has a roughly track-like plan shape, is formed of a curved surface that follows the outer circumferential surface 610c, and is disposed in a lower portion of the outer circumferential surface 610c of the enclosure 610. In contrast, a diffusion member 513 in Embodiment 13 is so formed as to have a half-moon-like shape at the opposite end surfaces in the X-axis direction (front surface 613a and rear surface 613b) and have a curved surface that follows the outer circumferential surfaces 613c to form the lower outer surface of the outer circumferential surfaces 613c. The other configurations are the same as those of the projector 110 according to Embodiment 10.

Embodiment 14

A projector 114 according to Embodiment 14 will be described with reference to FIGS. 14A and 14B.

Figure 14A:
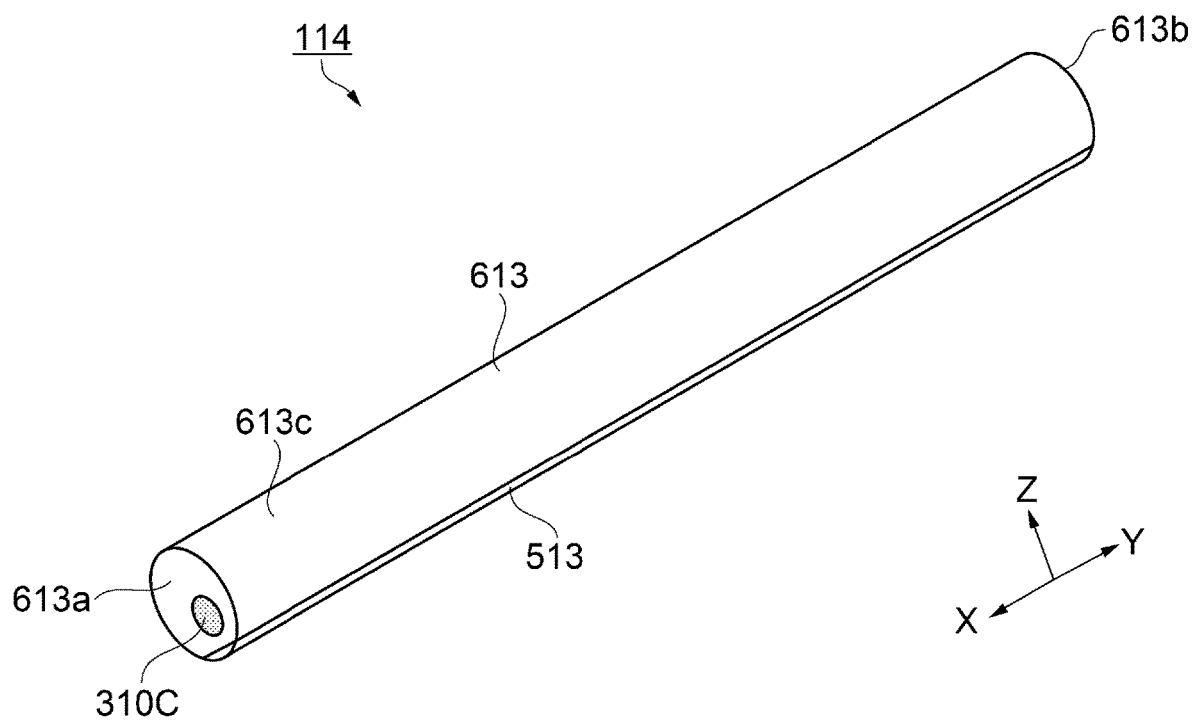
FIG. 14A is a perspective view showing a projector according to Embodiment 14.
Figure 14B:
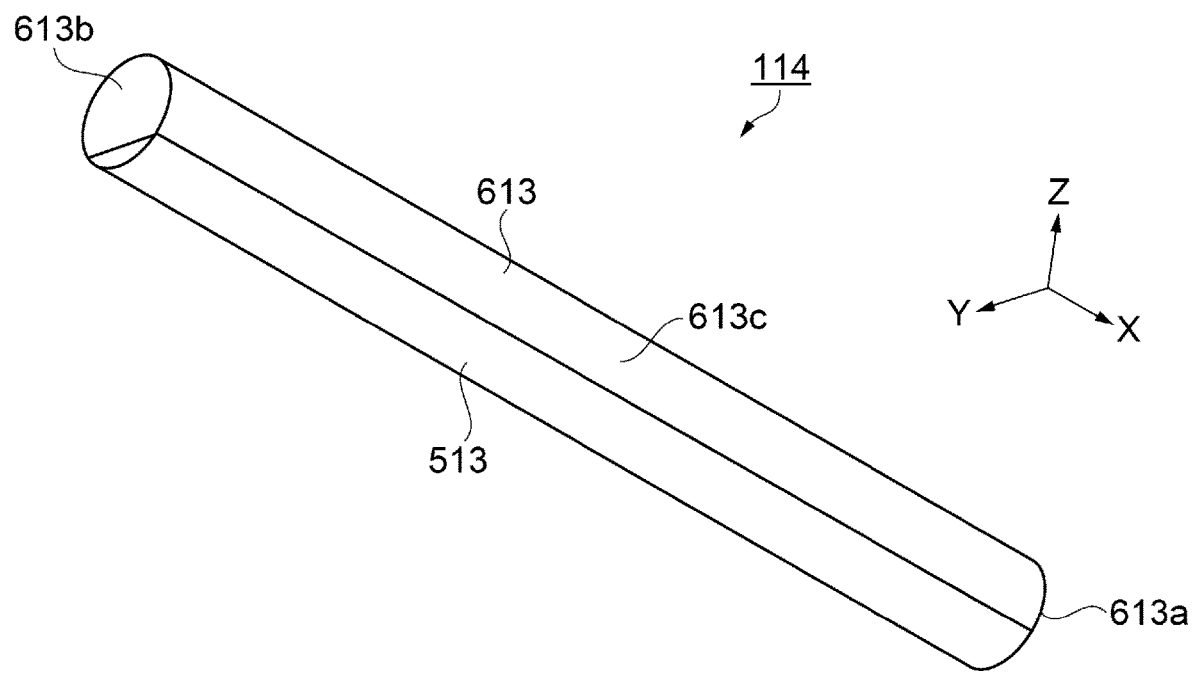
FIG. 14B is a perspective view showing the projector according to Embodiment 14.

FIGS. 14A and 14B are perspective views showing the projector 114 according to Embodiment 14. In detail, FIG. 14A is a perspective view of the projector 114 viewed obliquely downward from a position above, in front of, and on the right of the projector 114. FIG. 14B is a perspective view of the projector 114 viewed obliquely upward from a position below, behind, and on the left of the projector 114.

In the projector 114 according to Embodiment 14, as compared with Embodiment 13, in which the light transmissive member 310B is so disposed in the roughly central portion, a light transmissive member 310C in Embodiment 14 is disposed in a position shifted from the center of the front surface 613a. The other configurations are the same as those of the projector 113 according to Embodiment 13.

Embodiment 15

A projector 115 according to Embodiment 15 will be described with reference to FIGS. 15A, 15B, and 15C.

Figure 15A:
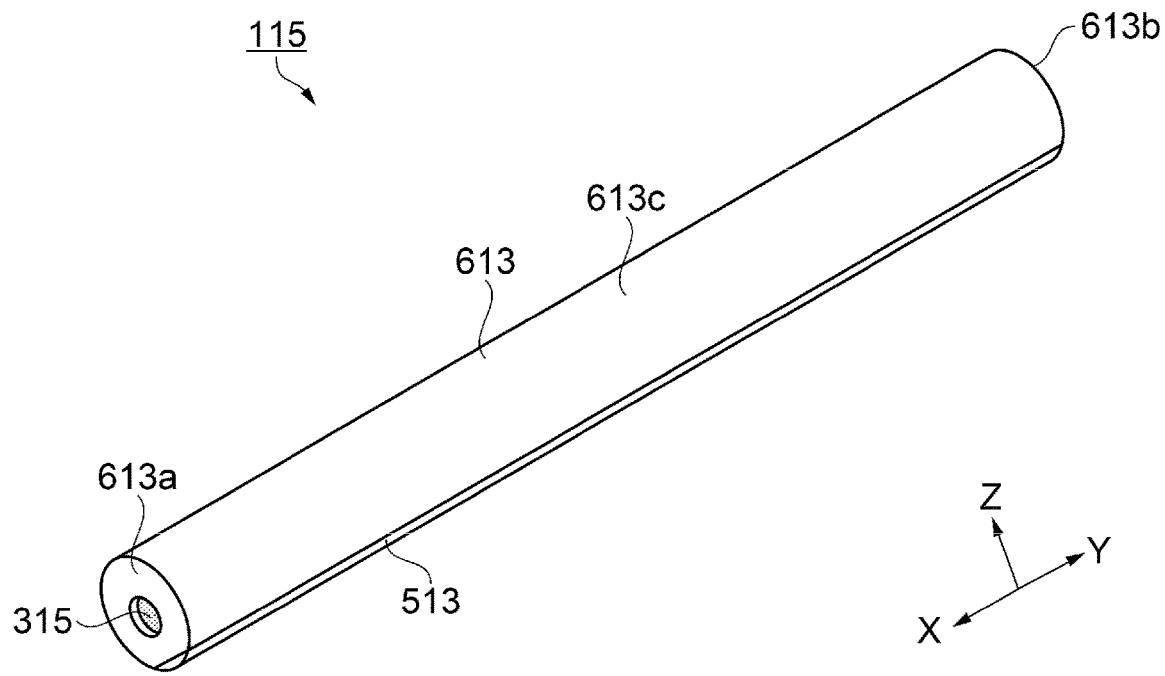
FIG. 15A is a perspective view showing a projector according to Embodiment 15.
Figure 15B:
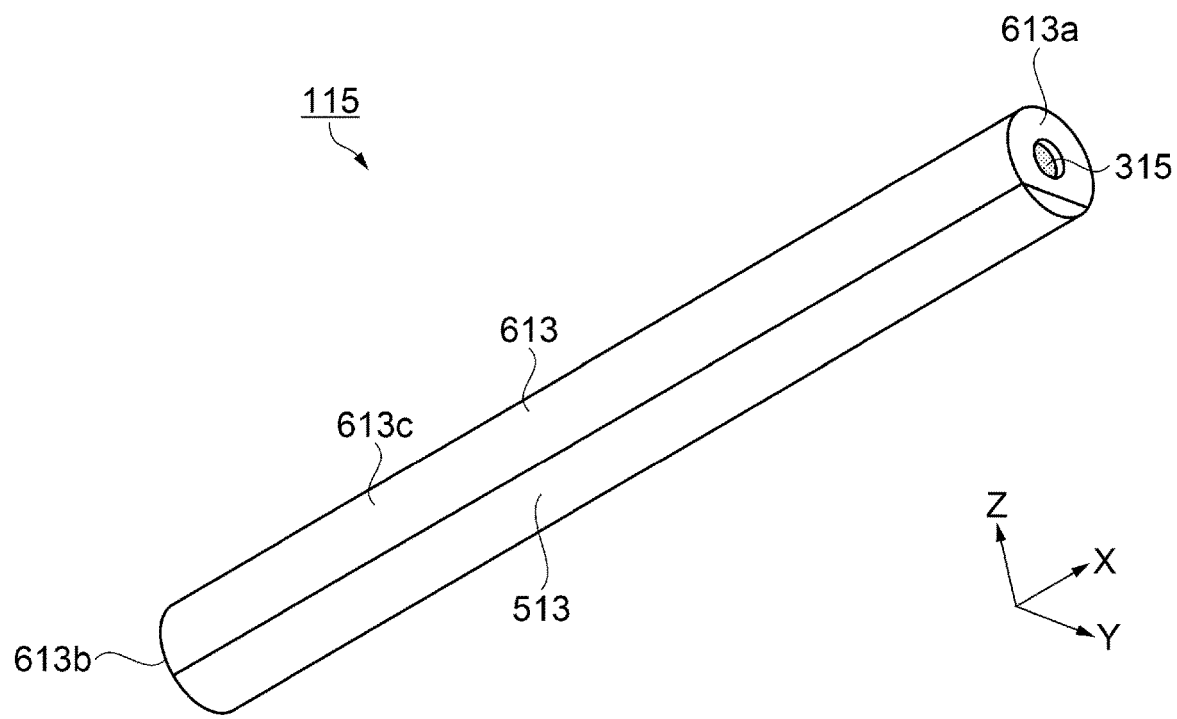
FIG. 15B is a perspective view showing the projector according to Embodiment 15.
Figure 15C:
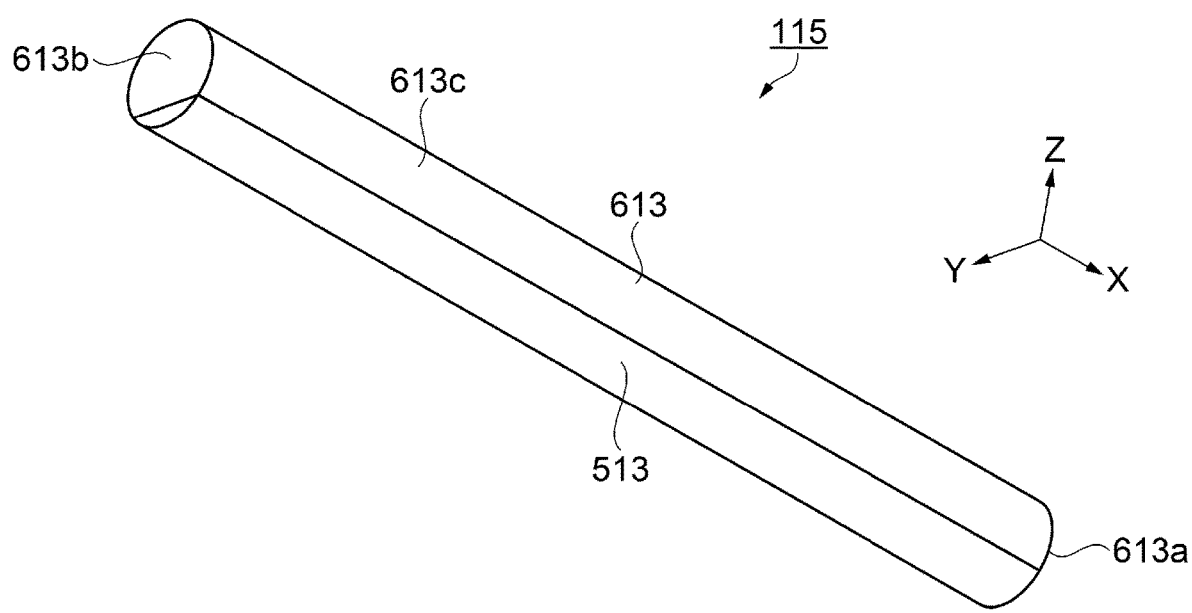
FIG. 15C is a perspective view showing the projector according to Embodiment 15.

FIGS. 15A, 15B, and 15C are perspective views showing the projector 115 according to Embodiment 15. In detail, FIG. 15A is a perspective view of the projector 115 viewed obliquely downward from a position above, in front of, and on the right of the projector 115. FIG. 15B is a perspective view of the projector 115 viewed obliquely upward from a position below, in front of, and on the left of the projector 115. FIG. 15C is a perspective view of the projector 115 viewed obliquely upward from a position below, behind, and on the left of the projector 115.

In the projector 115 according to Embodiment 15, as compared with Embodiment 13, in which the light transmissive member 310B is so disposed in the roughly central portion of the front surface 613a of the enclosure 613, a light transmissive member 315 in Embodiment 15 is disposed in a central portion or a peripheral portion of the front surface 613a and inside the front surface 613a. The other configurations are the same as those of the projector 113 according to Embodiment 13.

Embodiment 16

A projector 116 according to Embodiment 16 will be described with reference to FIGS. 16A and 16B.

Figure 16A:
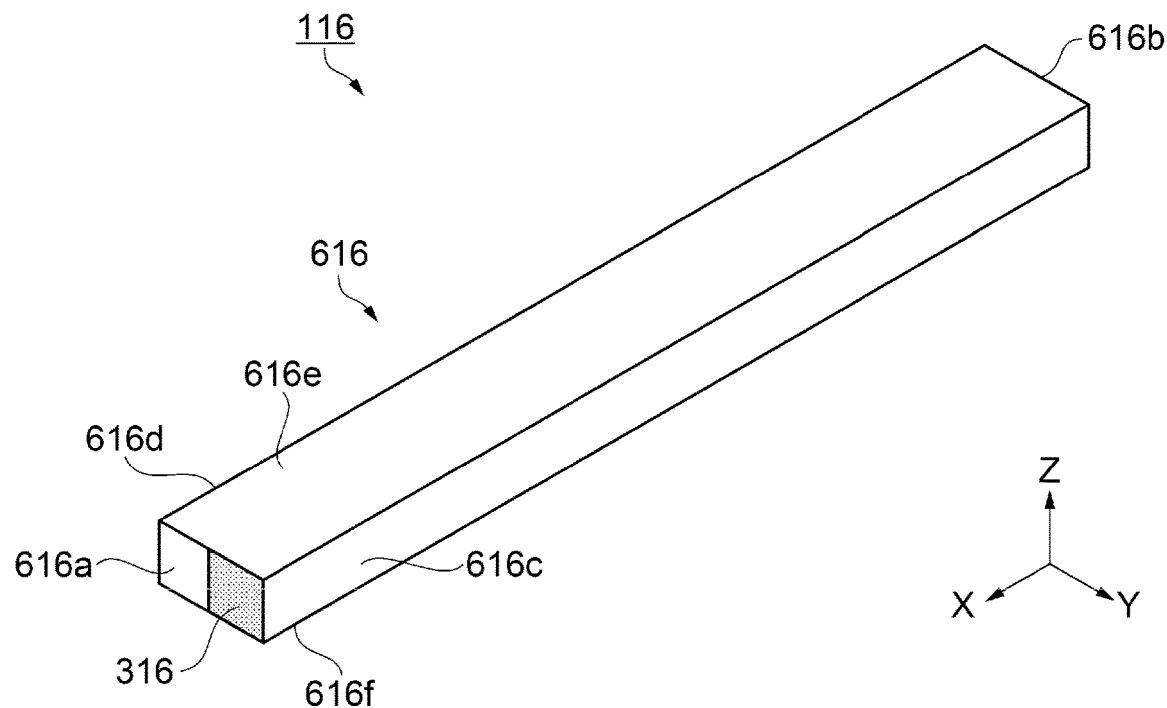
FIG. 16A is a perspective view showing a projector according to Embodiment 16.
Figure 16B:
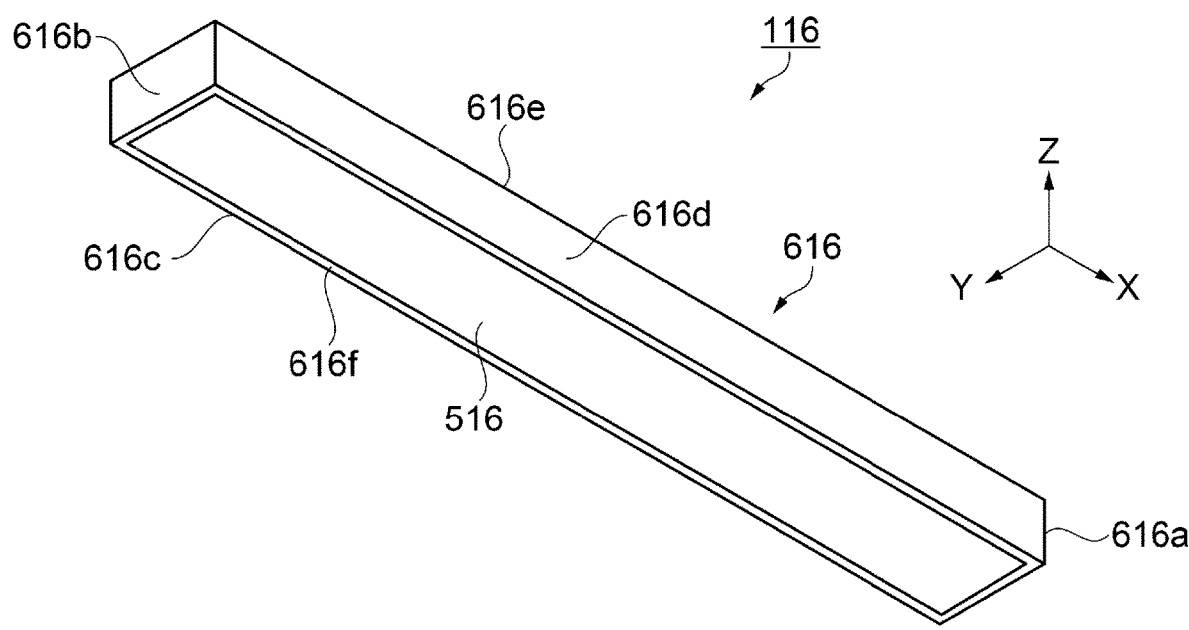
FIG. 16B is a perspective view showing the projector according to Embodiment 16.

FIGS. 16A and 16B are perspective views showing the projector 116 according to Embodiment 16. In detail, FIG. 16A is a perspective view of the projector 116 viewed obliquely downward from a position above, in front of, and on the right of the projector 116. FIG. 16B is a perspective view of the projector 116 viewed obliquely upward from a position below, behind, and on the left of the projector 116.

In Embodiment 16, the surfaces that form an enclosure 616 are formed of a front surface 616a, a rear surface 616b, a right side surface 616c, a left side surface 616d, a top surface 616e, and a bottom surface 616f, as in the way in which the surfaces of the enclosure in Embodiment 1 are viewed along the three axes described above.

The enclosure 616 in Embodiment 16, as compared with the enclosure 601 in Embodiment 1 that has a quadrangular (square) cross section (cross section taken along plane YZ) and is configured to extend in the form of a column, has a quadrangular (oblong) cross section (cross section taken along plane YZ) and is configured to extend in the form of a column, as shown in FIG. 16A. A quadrangular light transmissive member 316 is so disposed as to cover roughly the right half of the front surface 616a of the enclosure 616. Further, a quadrangular diffusion member 516 is disposed on the bottom surface 616f of the enclosure 616, as shown in FIG. 16B. The other configurations are the same as those of the projector 101 according to Embodiment 1. The light transmissive member 316 in Embodiment 16 is so disposed as to cover roughly the right half of the front surface 616a of the enclosure 616 and may instead be so disposed as to cover roughly the left half of the front surface 616a of the enclosure 616.

Embodiment 17

A projector 117 according to Embodiment 17 will be described with reference to FIGS. 17A and 17B.

Figure 17A:
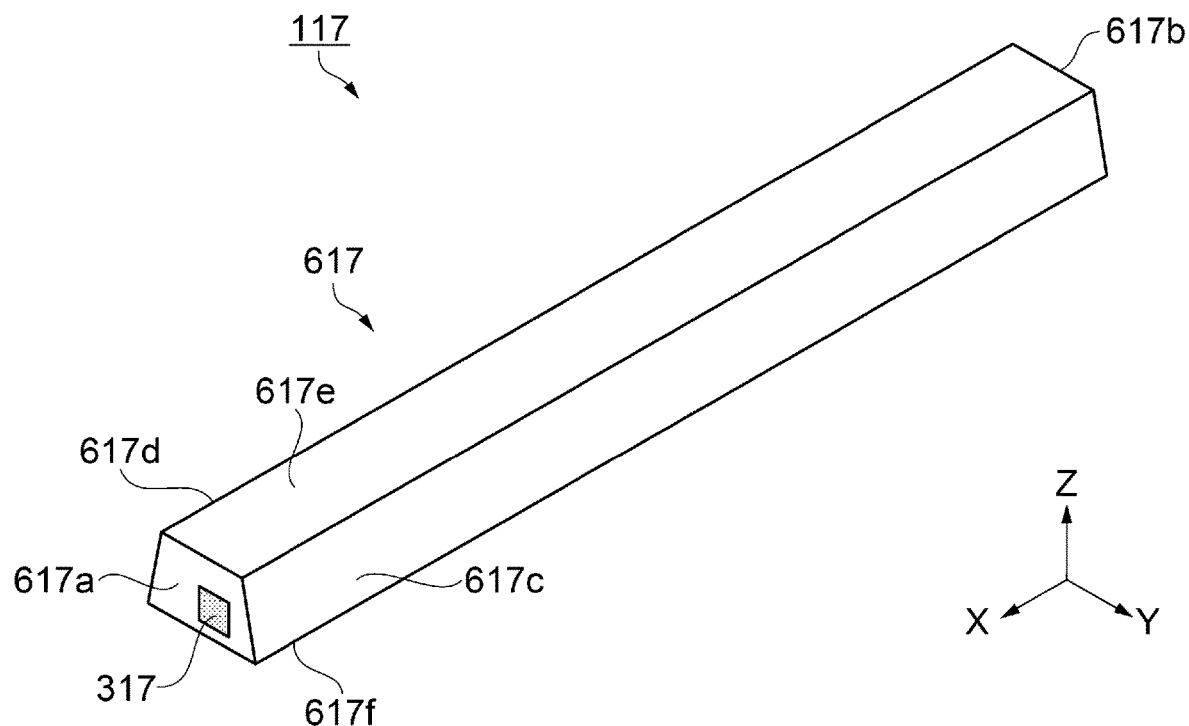
FIG. 17A is a perspective view showing a projector according to Embodiment 17.
Figure 17B:
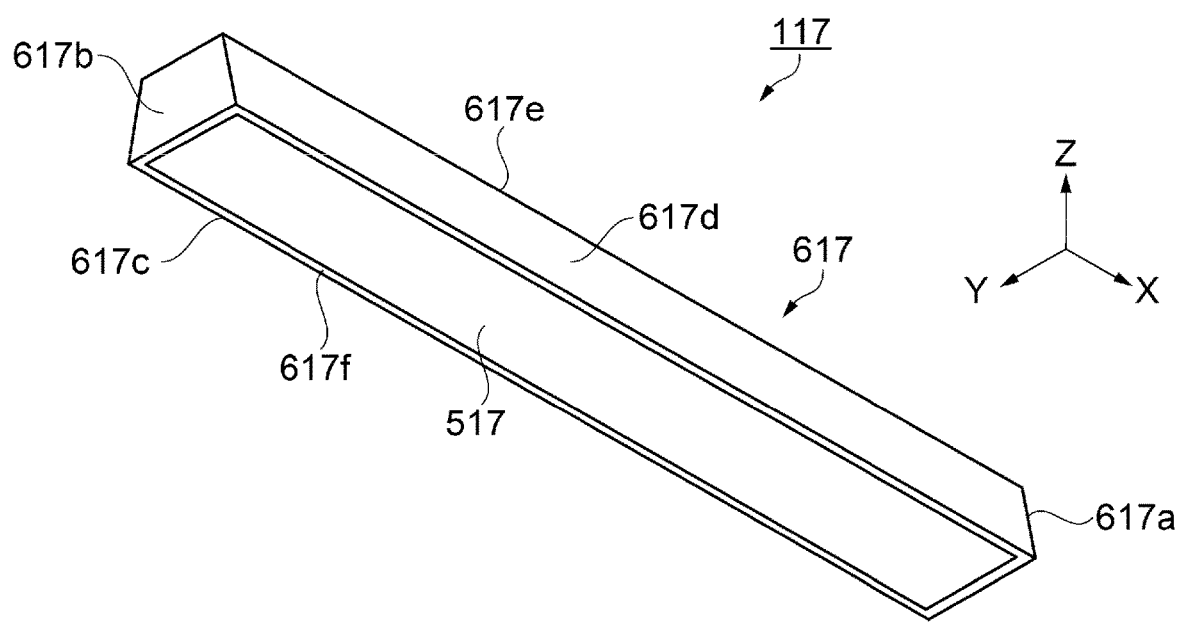
FIG. 17B is a perspective view showing the projector according to Embodiment 17.

FIGS. 17A and 17B are perspective views showing the projector 117 according to Embodiment 17. In detail, FIG. 17A is a perspective view of the projector 117 viewed obliquely downward from a position above, in front of, and on the right of the projector 117. FIG. 17B is a perspective view of the projector 117 viewed obliquely upward from a position below, behind, and on the left of the projector 117.

In Embodiment 17, the surfaces that form an enclosure 617 are formed of a front surface 617a, a rear surface 617b, a right side surface 617c, a left side surface 617d, a top surface 617e, and a bottom surface 617f, as in the way in which the surfaces of the enclosure in Embodiment 1 are viewed along the three axes described above.

The enclosure 617 in Embodiment 17, as compared with the enclosure 601 in Embodiment 1 that has a quadrangular cross section (cross section taken along plane YZ) and is configured to extend in the form of a column, has a trapezoidal cross section (cross section taken along plane YZ) and is configured to extend in the form of a column, as shown in FIG. 17A. A quadrangular light transmissive member 317 is disposed on the front surface 617a of the enclosure 617. Further, a quadrangular diffusion member 517 is disposed on the bottom surface 617f of the enclosure 617, as shown in FIG. 17B. The other configurations are the same as those of the projector 101 according to Embodiment 1.

Embodiment 18

A projector 118 according to Embodiment 18 will be described with reference to FIGS. 18A and 18B.

Figure 18A:
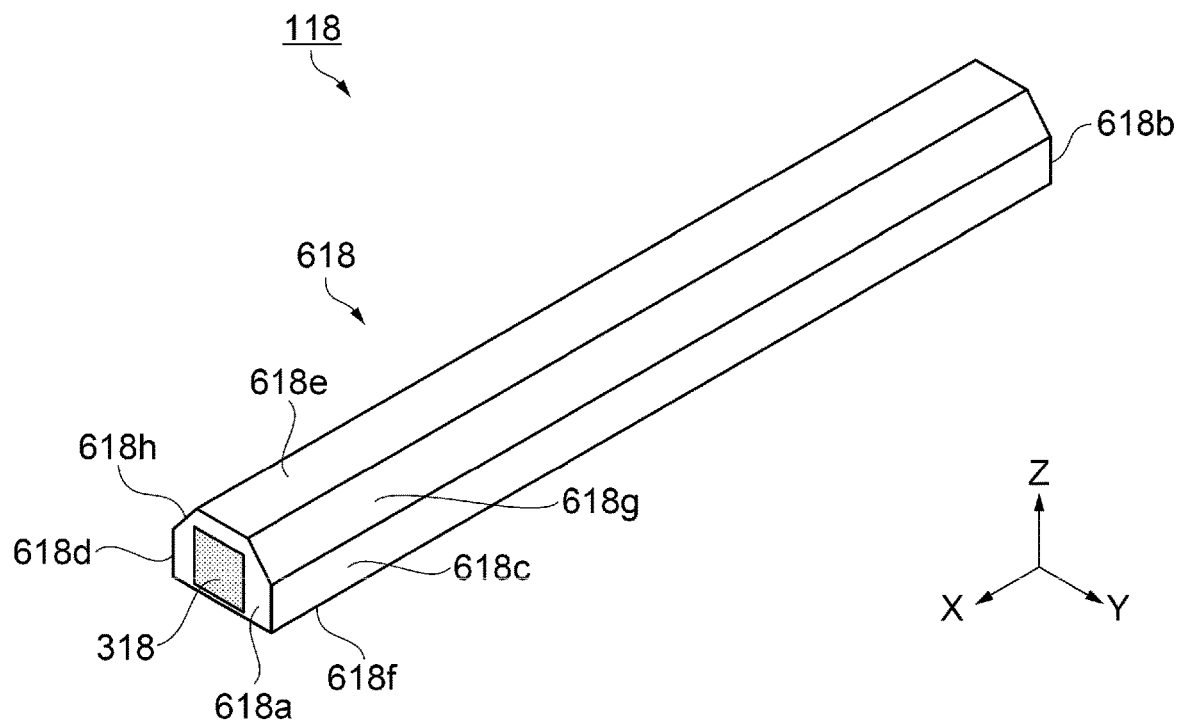
FIG. 18A is a perspective view showing a projector according to Embodiment 18.
Figure 18B:
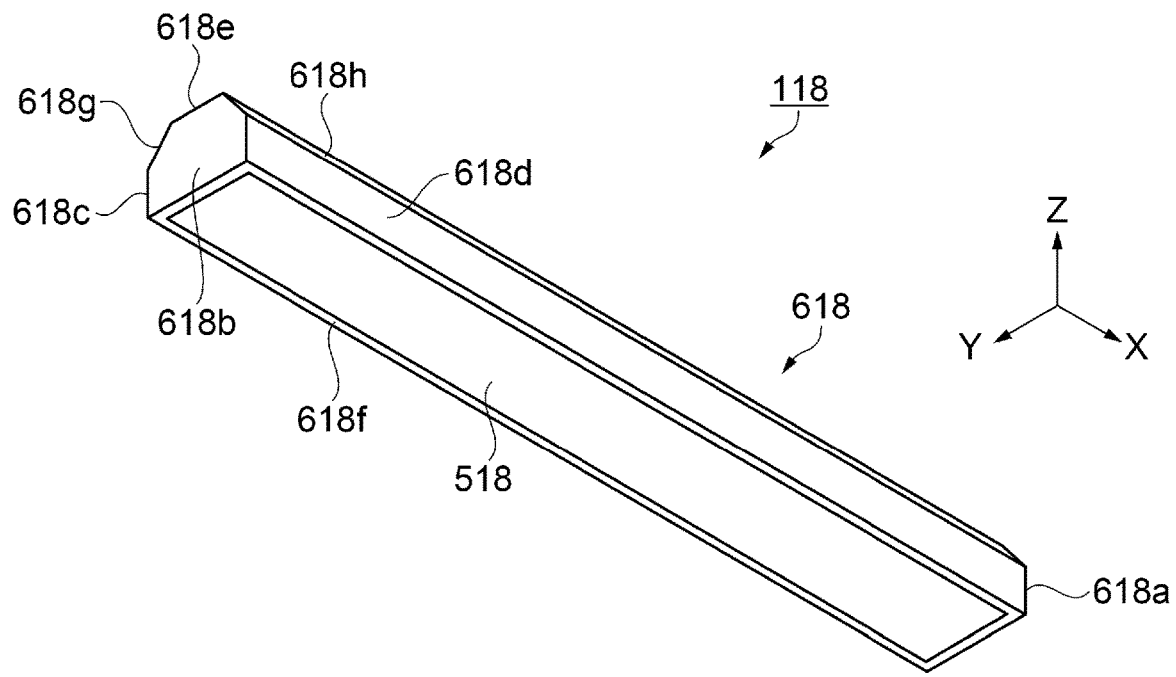
FIG. 18B is a perspective view showing the projector according to Embodiment 18.

FIGS. 18A and 18B are perspective views showing the projector 118 according to Embodiment 18. In detail, FIG. 18A is a perspective view of the projector 118 viewed obliquely downward from a position above, in front of, and on the right of the projector 118. FIG. 18B is a perspective view of the projector 118 viewed obliquely upward from a position below, behind, and on the left of the projector 118.

In Embodiment 18, the surfaces that form an enclosure 618 are formed of a front surface 618a, a rear surface 618b, a right side surface 618c, a left side surface 618d, a top surface 618e, and a bottom surface 618f, as in the way in which the surfaces of the enclosure in Embodiment 1 are viewed along the three axes described above. The front surface 618a has a hexagonal shape. The surface sandwiched between the top surface 618e and the right side surface 618c is called a right inclining surface 618g, and the surface sandwiched between the top surface 618e and the left side surface 618d is called a left inclining surface 618h.

The enclosure 618 in Embodiment 18, as compared with the enclosure 601 in Embodiment 1 that has a quadrangular cross section (cross section taken along plane YZ) and is configured to extend in the form of a column, has a hexagonal cross section (cross section taken along plane YZ) and is configured to extend in the form of a column, as shown in FIG. 18A. A quadrangular light transmissive member 318 is disposed on the front surface 618a of the enclosure 618. Further, a quadrangular diffusion member 518 is disposed on the bottom surface 618f of the enclosure 618, as shown in FIG. 18B. The other configurations are the same as those of the projector 101 according to Embodiment 1.

Embodiment 19

A projector 119 according to Embodiment 19 will be described with reference to FIGS. 19A and 19B.

Figure 19A:
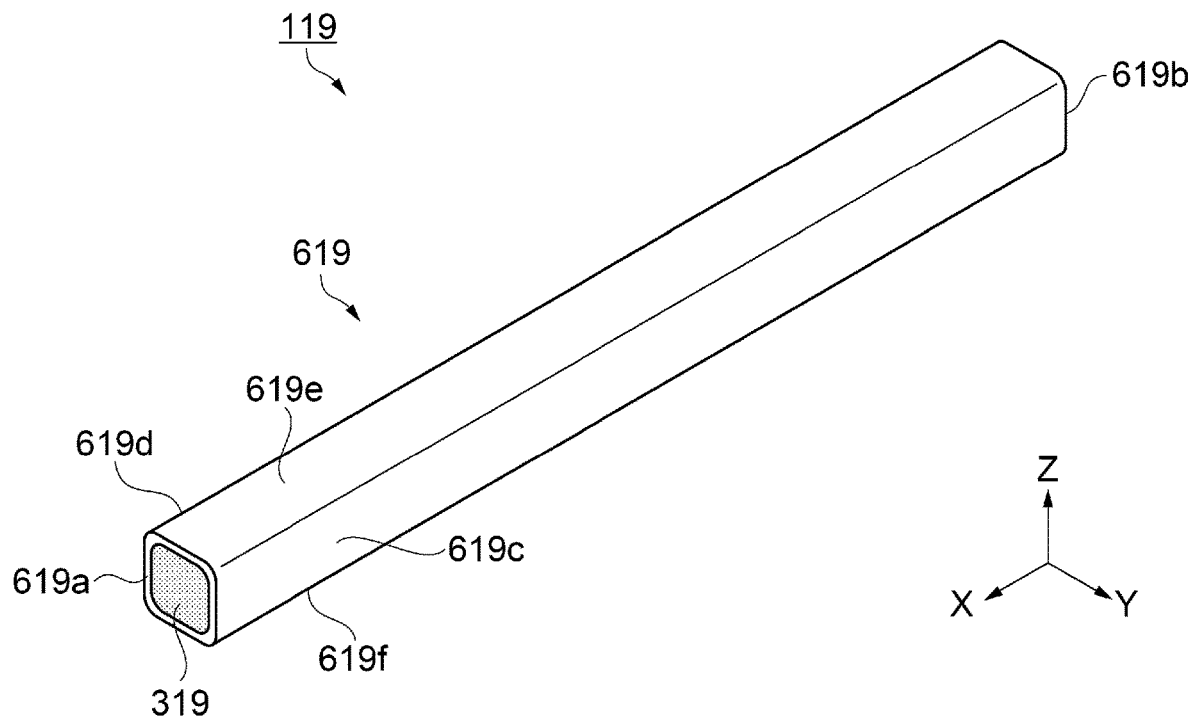
FIG. 19A is a perspective view showing a projector according to Embodiment 19.
Figure 19B:
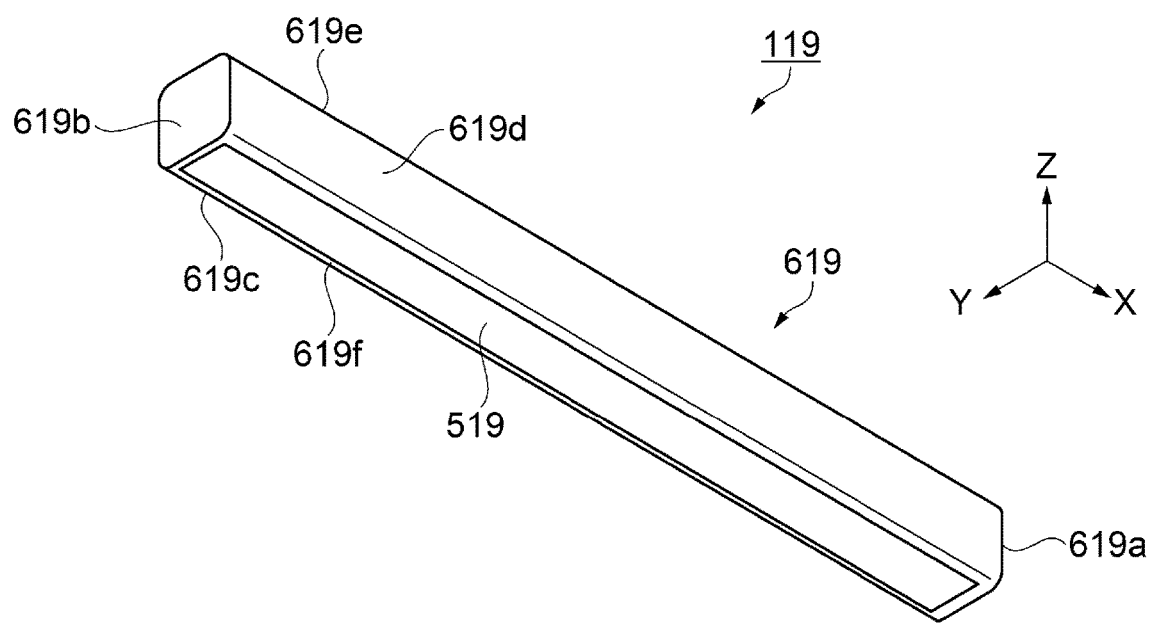
FIG. 19B is a perspective view showing the projector according to Embodiment 19.

FIGS. 19A and 19B are perspective views showing the projector 119 according to Embodiment 19. In detail, FIG. 19A is a perspective view of the projector 119 viewed obliquely downward from a position above, in front of, and on the right of the projector 119. FIG. 19B is a perspective view of the projector 119 viewed obliquely upward from a position below, behind, and on the left of the projector 119.

In Embodiment 19, the surfaces that form an enclosure 619 are formed of a front surface 619a, a rear surface 619b, a right side surface 619c, a left side surface 619d, a top surface 619e, and a bottom surface 619f, as in the way in which the surfaces of the enclosure in Embodiment 1 are viewed along the three axes described above.

In the projector 119 according to Embodiment 19, the enclosure 619 has a quadrangular cross section with rounded corners (cross section taken along plane YZ) and is configured to extend in the form of a column, as shown in FIG. 19A. A light transmissive member 319 in Embodiment 19 has a quadrangular shape having rounded corners and is so disposed as not to cover an outer edge portion of the front surface 619a. Further, a quadrangular diffusion member 519 is disposed on the bottom surface 619f of the enclosure 619, as shown in FIG. 19B. The other configurations are the same as those of the projector 101 according to Embodiment 1.

Embodiment 20

A projector 120 according to Embodiment 20 will be described with reference to FIGS. 20A and 20B.

Figure 20A:
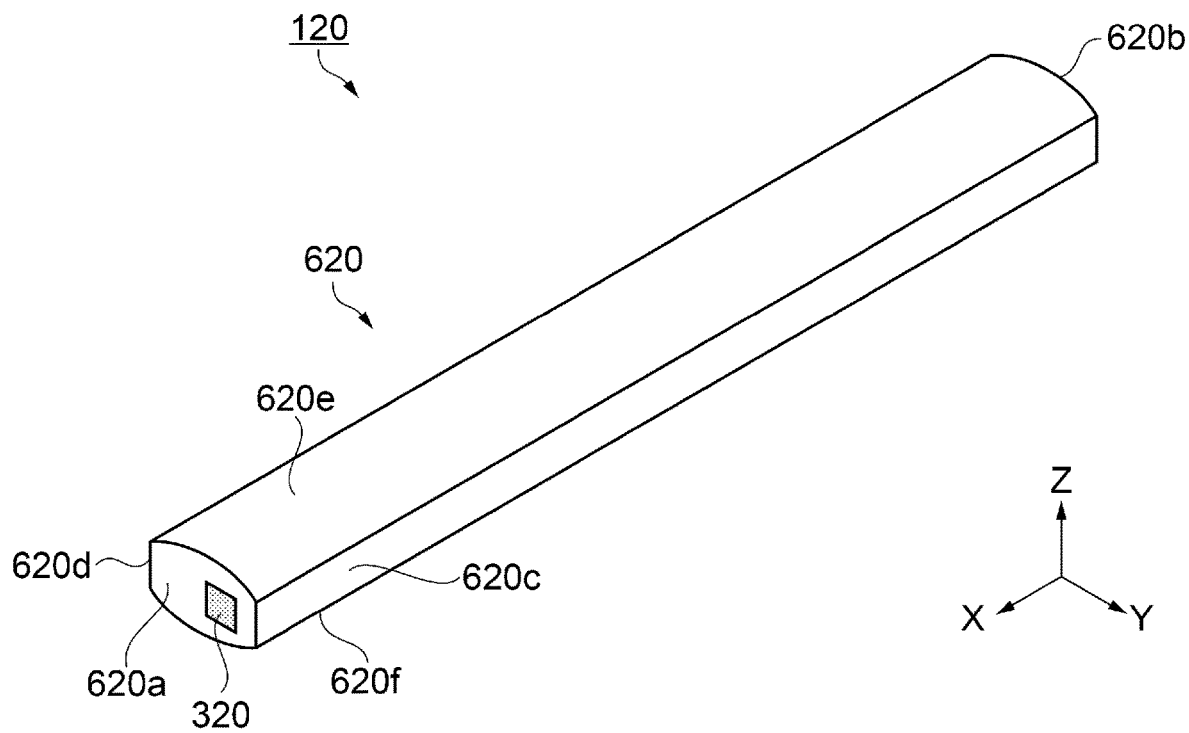
FIG. 20A is a perspective view showing a projector according to Embodiment 20.
Figure 20B:
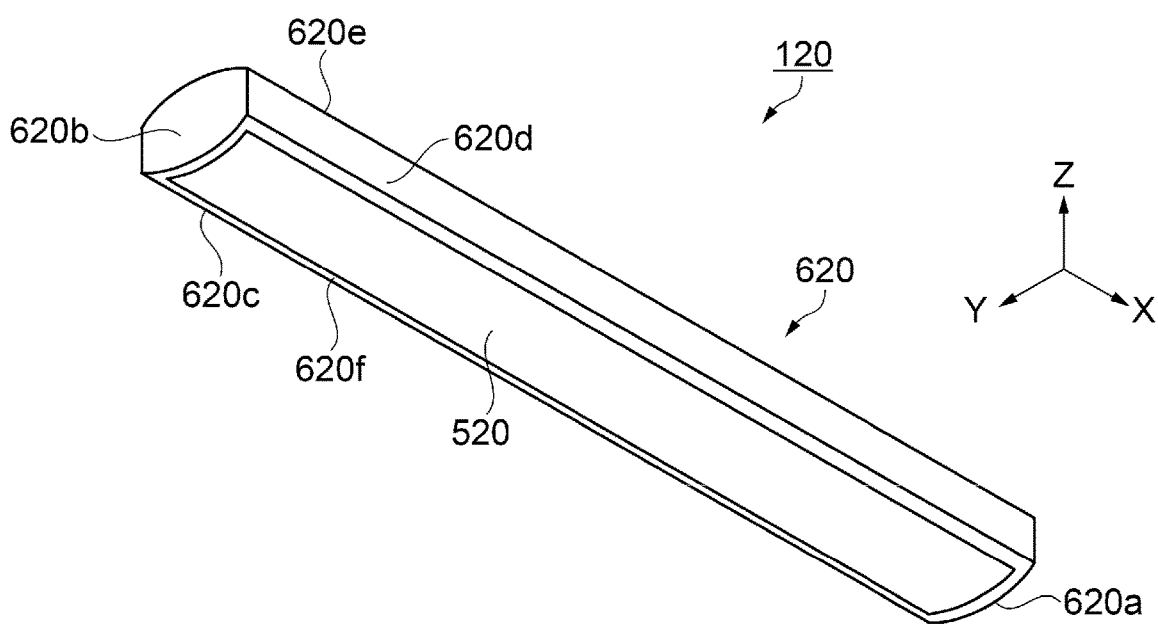
FIG. 20B is a perspective view showing the projector according to Embodiment 20.

FIGS. 20A and 20B are perspective views showing the projector 120 according to Embodiment 20. In detail, FIG. 20A is a perspective view of the projector 120 viewed obliquely downward from a position above, in front of, and on the right of the projector 120. FIG. 20B is a perspective view of the projector 120 viewed obliquely upward from a position below, behind, and on the left of the projector 120.

In Embodiment 20, the surfaces that form an enclosure 620 are formed of a front surface 620a, a rear surface 620b, a right side surface 620c, a left side surface 620d, a top surface 620e, and a bottom surface 620f, as in the way in which the surfaces of the enclosure in Embodiment 1 are viewed along the three axes described above.

In the projector 120 according to Embodiment 20, the enclosure 620 has a quadrangular cross section (cross section taken along plane YZ) with curved upper and lower sides and is configured to extend in the form of a column, as shown in FIG. 20A. The top surface 620e and the bottom surface 620f each therefore have a curved shape. A light transmissive member 320 in Embodiment 20 has a quadrangular shape and is disposed in a position shifted from the center of the front surface 620a.

A quadrangular diffusion member 520 is disposed on the bottom surface 620f of the enclosure 620, as shown in FIG. 20B. The diffusion member 520 is so formed as to follow the curved bottom surface 620f. The other configurations are the same as those of the projector 101 according to Embodiment 1.

Embodiment 21

A projector 121 according to Embodiment 21 will be described with reference to FIGS. 21A and 21B.

Figure 21A:
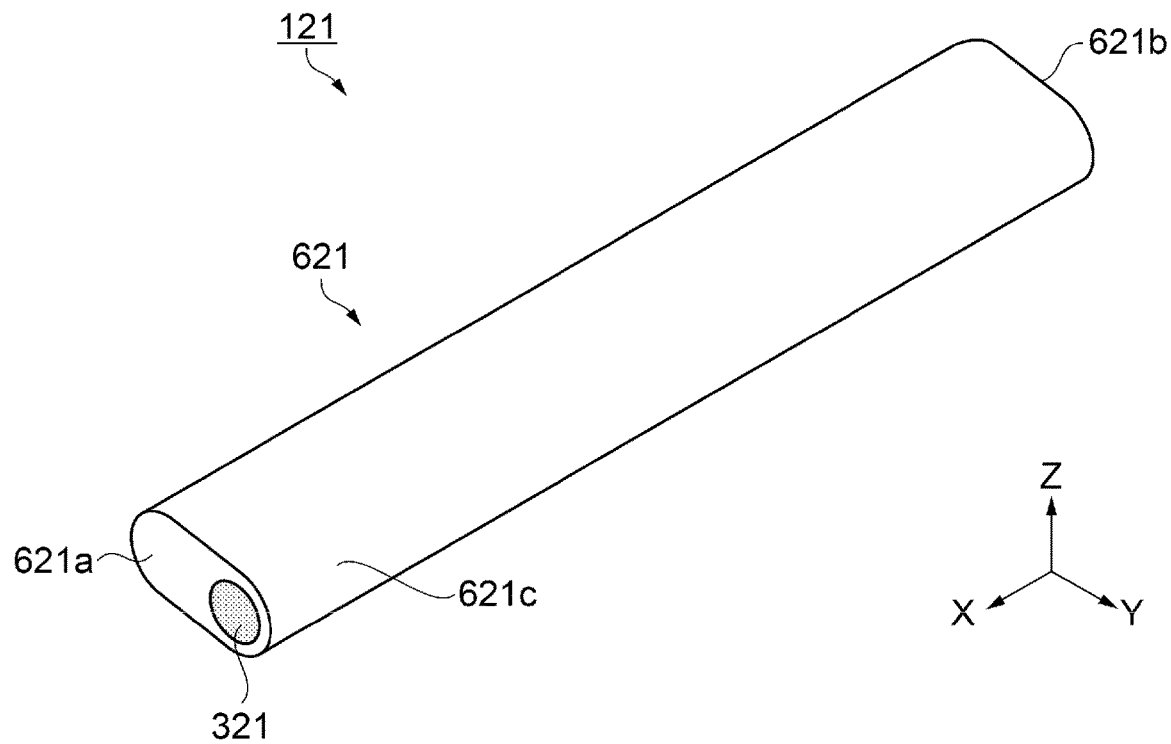
FIG. 21A is a perspective view showing a projector according to Embodiment 21.
Figure 21B:
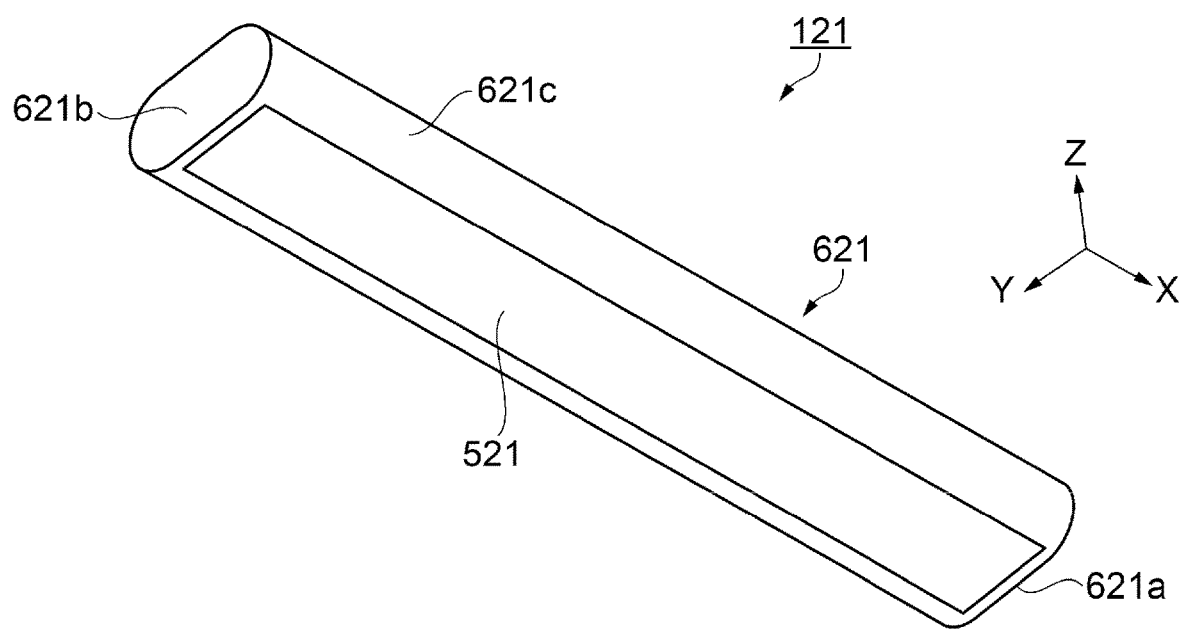
FIG. 21B is a perspective view showing the projector according to Embodiment 21.

FIGS. 21A and 21B are perspective views showing the projector 121 according to Embodiment 21. In detail, FIG. 21A is a perspective view of the projector 121 viewed obliquely downward from a position above, in front of, and on the right of the projector 121. FIG. 21B is a perspective view of the projector 121 viewed obliquely upward from a position below, behind, and on the left of the projector 121.

In the projector 121 according to Embodiment 21, an enclosure 621 has a track-shaped cross section (cross section in plane YZ) and is configured to extend in the form of a column, as shown in FIG. 21A. The enclosure 621 in Embodiment 21 has end surfaces on opposite sides in the X-axis direction, which is the lengthwise direction in which the enclosure 621 having the track-shaped cross section extends in the form of a column, and the two end surfaces are defied as follows: The X(+)-axis-side end surface is a front surface 621a; and the X(−)-axis-side end surface is a rear surface 621b. The side surface of the columnar shape having the track-shaped cross section is called an outer circumferential surface 621c.

A light transmissive member 321 in Embodiment 21 has a circular shape and is disposed in a position shifted from the center of the front surface 621a. A quadrangular diffusion member 521 is disposed on a Z(−)-axis-side lower flat surface portion of the outer circumferential surface 621c of the enclosure 621, as shown in FIG. 21B. The other configurations are the same as those of the projector 101 according to Embodiment 1.

Embodiment 22

A projector 122 according to Embodiment 22 will be described with reference to FIGS. 22A and 22B.

Figure 22A:
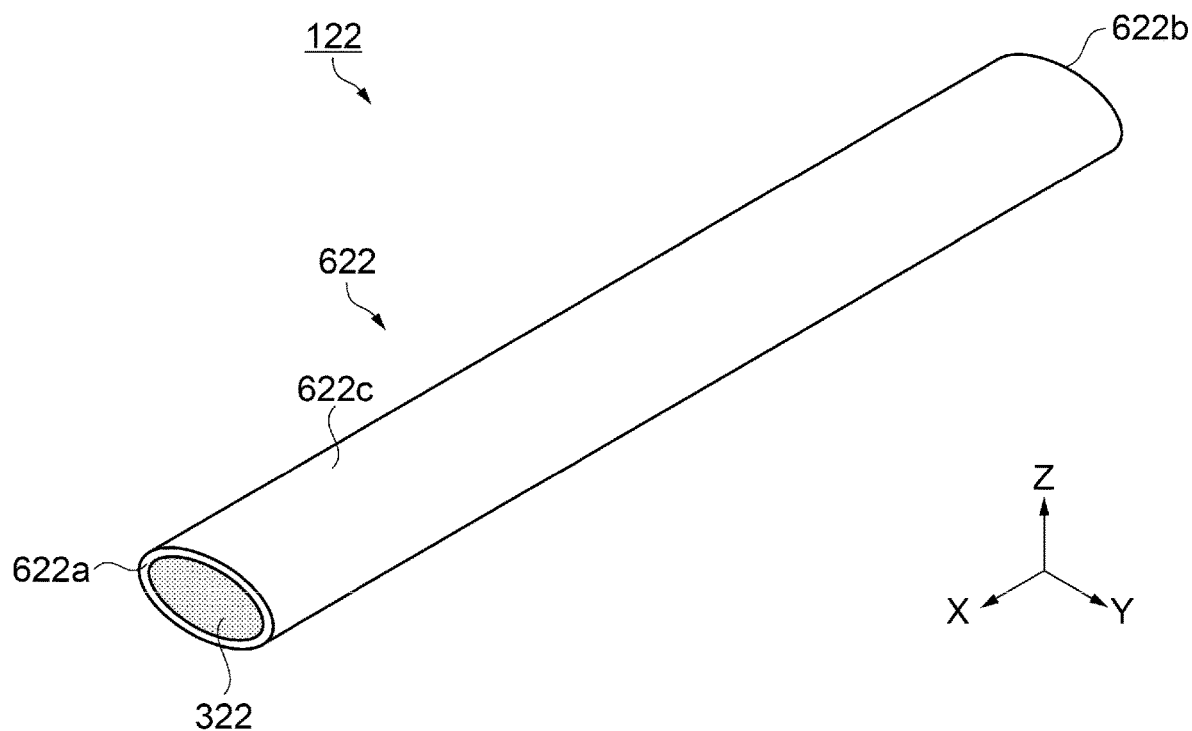
FIG. 22A is a perspective view showing a projector according to Embodiment 22.
Figure 22B:
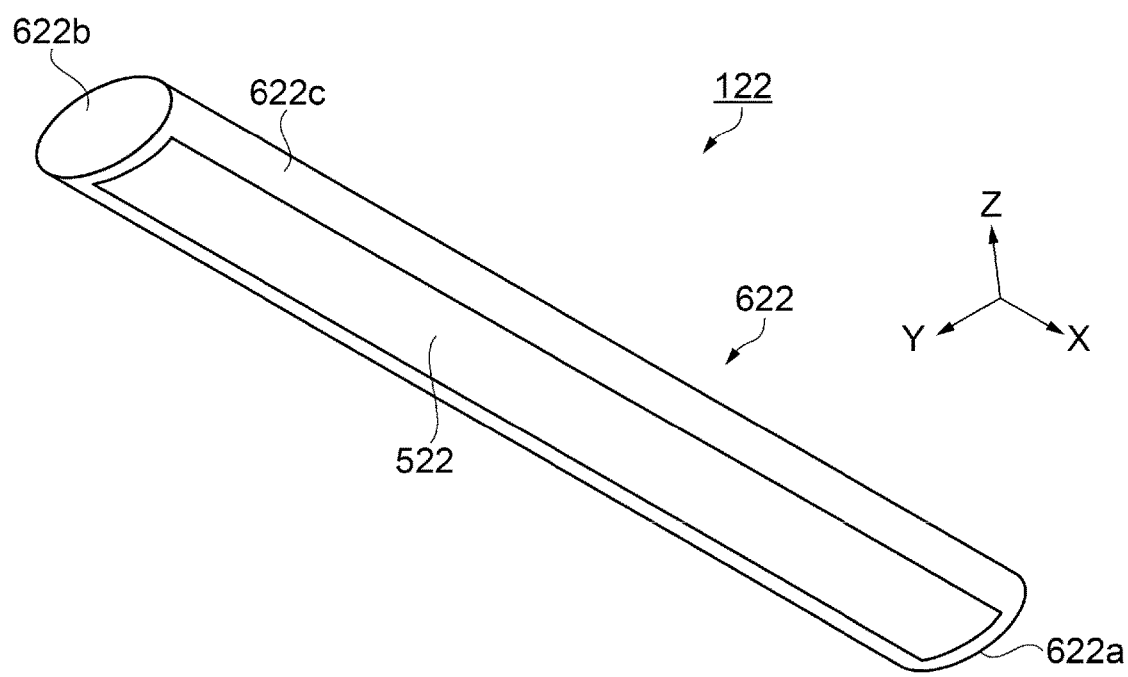
FIG. 22B is a perspective view showing the projector according to Embodiment 22.

FIGS. 22A and 22B are perspective views showing the projector 122 according to Embodiment 22. In detail, FIG. 22A is a perspective view of the projector 122 viewed obliquely downward from a position above, in front of, and on the right of the projector 122. FIG. 22B is a perspective view of the projector 122 viewed obliquely upward from a position below, behind, and on the left of the projector 122.

In the projector 122 according to Embodiment 22, an enclosure 622 has an elliptical cross section (cross section in plane YZ) and is configured to extend in the form of a column, as shown in FIG. 22A. The enclosure 622 in Embodiment 22 has end surfaces on opposite sides in the X-axis direction, which is the lengthwise direction in which the enclosure 622 having the elliptical cross section extends in the form of a column, and the two end surfaces are defied as follows: The X(+)-axis-side end surface is a front surface 622a; and the X(−)-axis-side end surface is a rear surface 622b. The side surface of the columnar shape having the elliptical cross section is called an outer circumferential surface 622c.

A light transmissive member 322 in Embodiment 22 has an elliptical shape and is so disposed as not to cover an outer edge portion of the front surface 622a. Further, a quadrangular diffusion member 522 is disposed on the outer circumferential surface 622c of the enclosure 622, as shown in FIG. 22B. The diffusion member 522 is so formed as to follow the curved outer circumferential surface 622c. The other configurations are the same as those of the projector 101 according to Embodiment 1.

Embodiment 23

A projector 123 according to Embodiment 23 will be described with reference to FIGS. 23A to 23D.

Figure 23A:
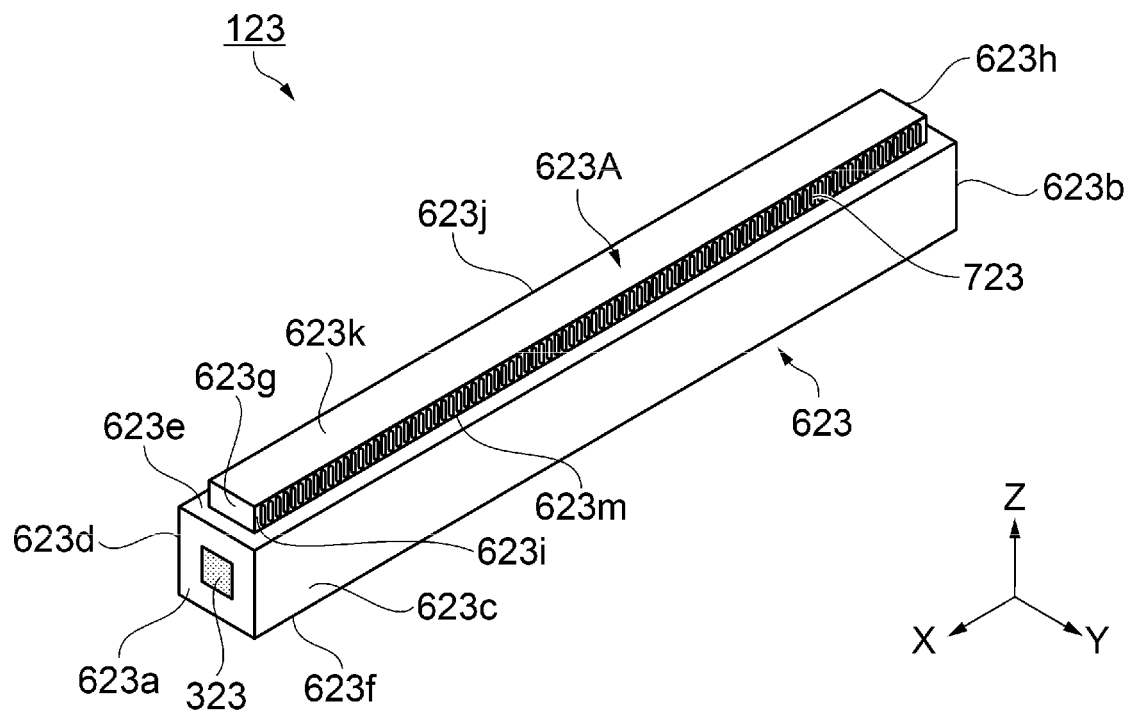
FIG. 23A is a perspective view showing a projector according to Embodiment 23.
Figure 23B:
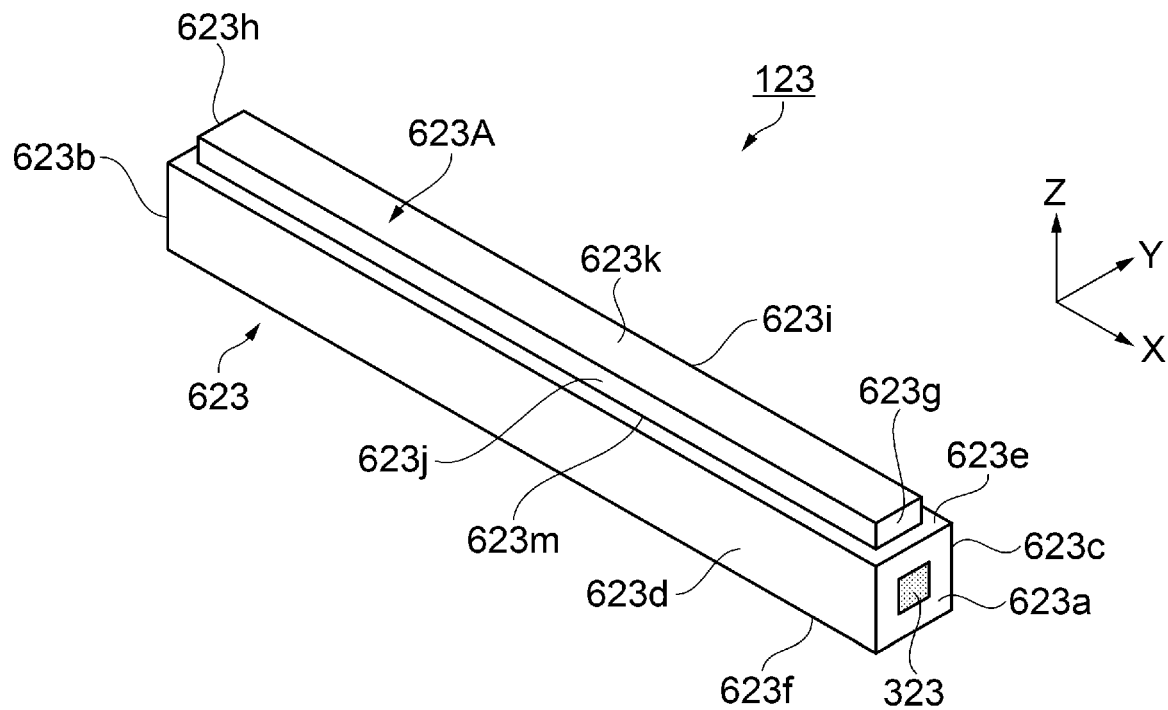
FIG. 23B is a perspective view showing the projector according to Embodiment 23.
Figure 23C:
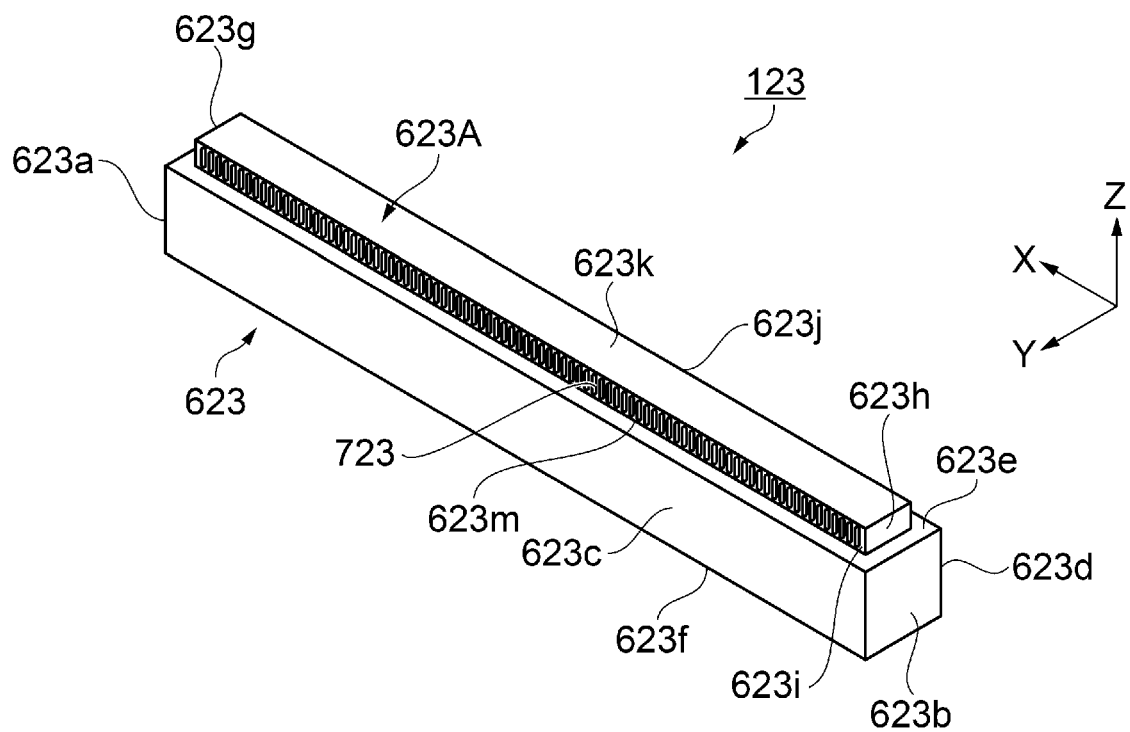
FIG. 23C is a perspective view showing the projector according to Embodiment 23.
Figure 23D:
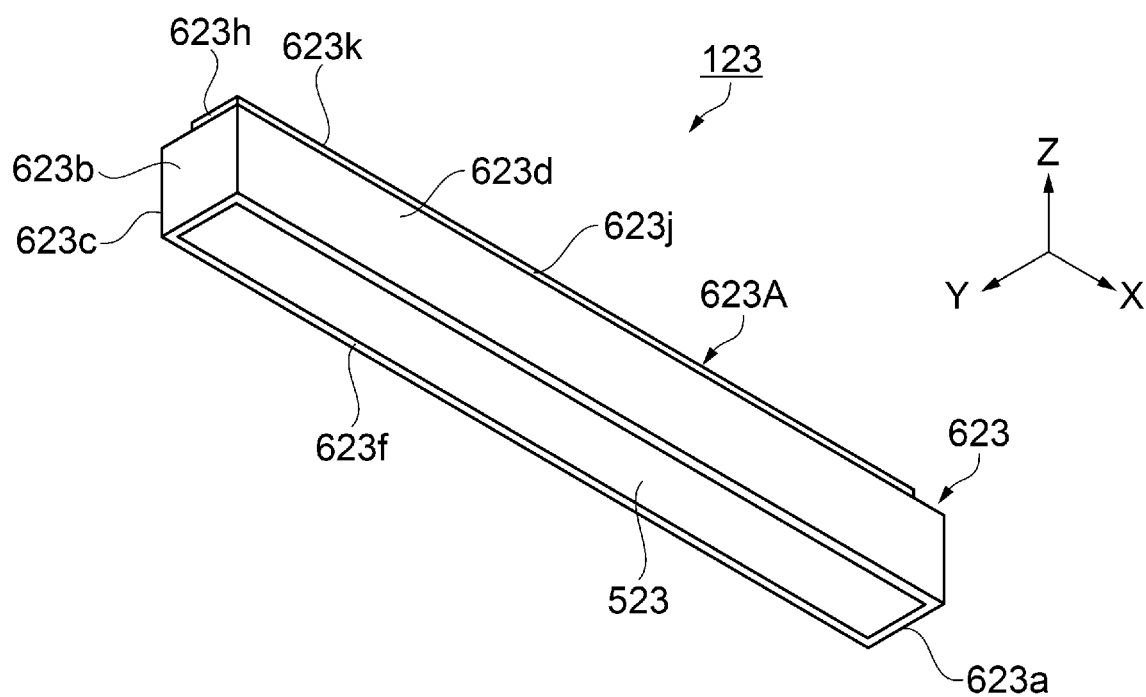
FIG. 23D is a perspective view showing the projector according to Embodiment 23.

FIGS. 23A to 23D are perspective views showing the projector 123 according to Embodiment 23. In detail, FIG. 23A is a perspective view of the projector 123 viewed obliquely downward from a position above, in front of, and on the right of the projector 123. FIG. 23B is a perspective view of the projector 123 viewed obliquely downward from a position above, in front of, and on the left of the projector 123. FIG. 23C is a perspective view of the projector 123 viewed obliquely downward from a position above, behind, and on the right of the projector 123. FIG. 23D is a perspective view of the projector 123 viewed obliquely upward from a position below, behind, and on the left of the projector 123.

In the projector 123 according to Embodiment 23, an enclosure 623 has a quadrangular cross section (cross section in plane YZ) and is configured to extend in the form of a column, as shown in FIG. 23A. In Embodiment 23, the surfaces that form the enclosure 623 are formed of a front surface 623a, a rear surface 623b, a right side surface 623c, a left side surface 623d, a top surface 623e, and a bottom surface 623f, as in the way in which the surfaces of the enclosure in Embodiment 1 are viewed along the three axes described above.

In Embodiment 23, another enclosure 623A, which has a quadrangular cross section (cross section in plane YZ) and is configured to extend in the form of a column, is connected to the top surface 623e of the enclosure 623 and integrated with the enclosure 623, as shown in FIGS. 23A to 23D. The surfaces that form the enclosure 623A are formed of a front surface 623g, a rear surface 623h, a right side surface 623i, a left side surface 623j, a top surface 623k, and a bottom surface 623m, as in the case of the enclosure 623.

In Embodiment 23, the top surface 623e of the enclosure 623 coincides with the bottom surface 623m of the enclosure 623A. The area of the bottom surface 623m is configured to be smaller than the area of the top surface 623e, and the volume of the enclosure 623A is configured to be smaller than the volume of the enclosure 623.

A quadrangular light transmissive member 323 is disposed in a roughly central portion of the front surface 623a of the enclosure 623, as shown in FIGS. 23A and 23B. To dissipate heat generated in the projection section 250, which is accommodated in the enclosure 623, the right side surface 623i of the enclosure 623A has openings 723, which function as an intake port through which outside air is taken into the enclosure 623 and a discharge port through which the taken-in outside air heated in the process of the dissipation of the generated heat is discharged out of the enclosure 623, as shown in FIGS. 23A and 23C. Further, a quadrangular diffusion member 523 is disposed on the bottom surface 623f of the enclosure 623, as shown in FIG. 23D. The other configurations are the same as those of the projector 101 according to Embodiment 1.

Embodiment 24

A projector 124 according to Embodiment 24 will be described with reference to FIGS. 24A to 24D.

Figure 24A:
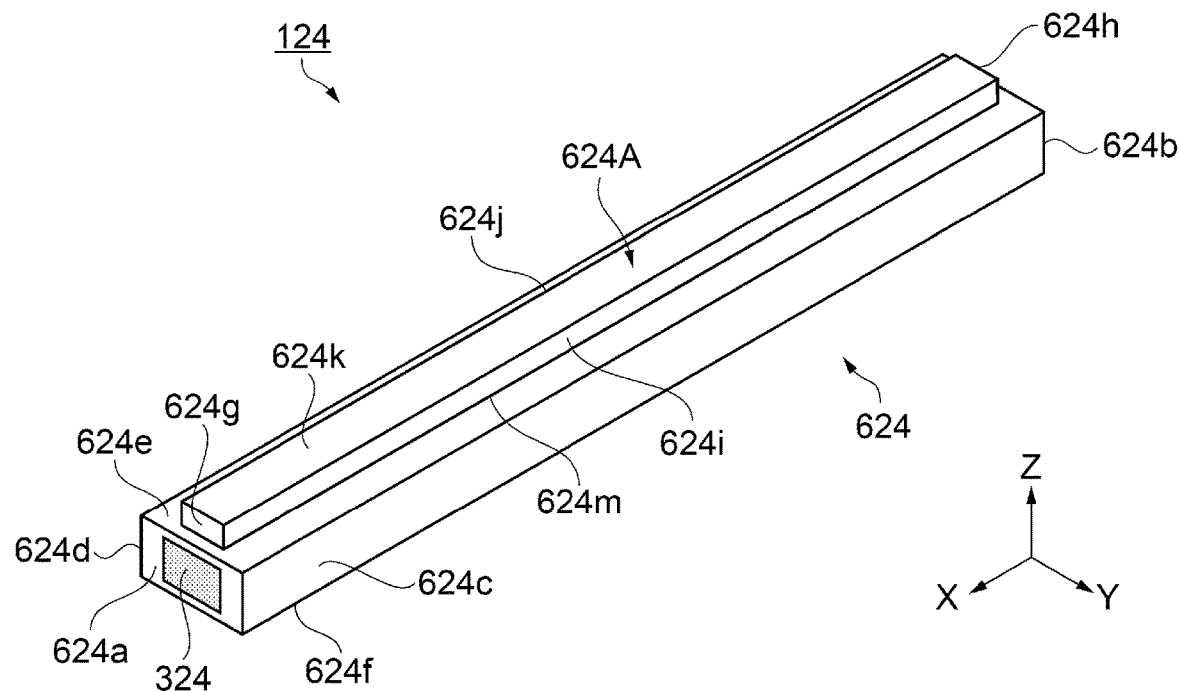
FIG. 24A is a perspective view showing a projector according to Embodiment 24.
Figure 24B:
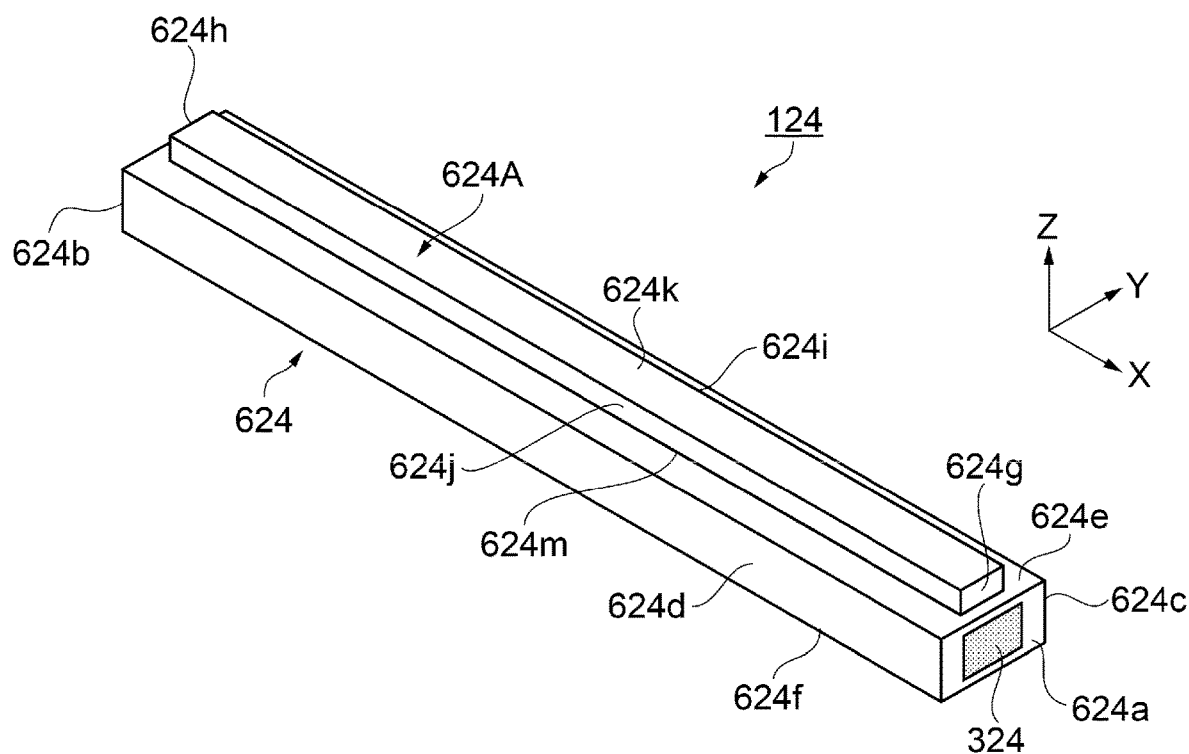
FIG. 24B is a perspective view showing the projector according to Embodiment 24.
Figure 24C:
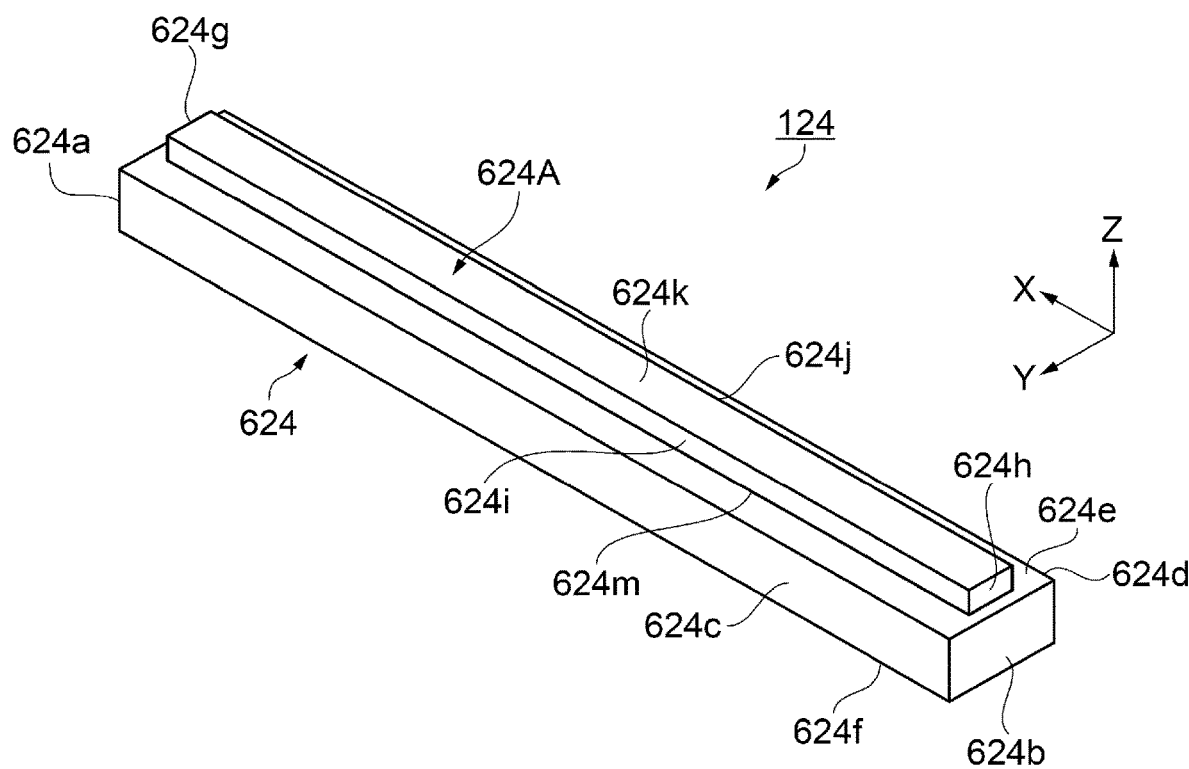
FIG. 24C is a perspective view showing the projector according to Embodiment 24.
Figure 24D:
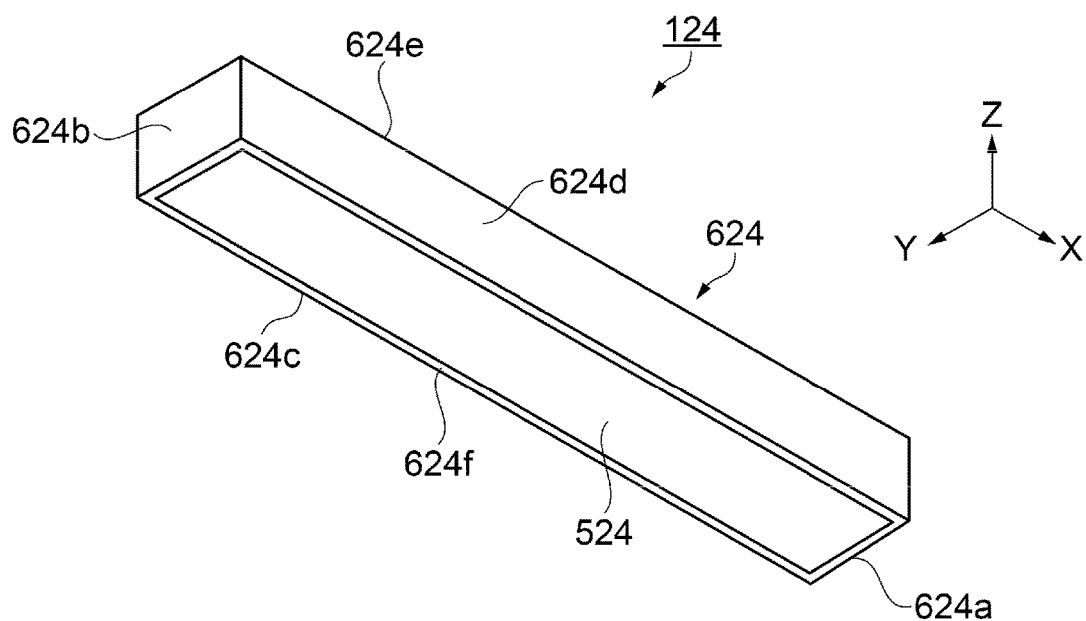
FIG. 24D is a perspective view showing the projector according to Embodiment 24.

FIGS. 24A to 24D are perspective views showing the projector 124 according to Embodiment 24. In detail, FIG. 24A is a perspective view of the projector 124 viewed obliquely downward from a position above, in front of, and on the right of the projector 124. FIG. 24B is a perspective view of the projector 124 viewed obliquely downward from a position above, in front of, and on the left of the projector 124. FIG. 24C is a perspective view of the projector 124 viewed obliquely downward from a position above, behind, and on the right of the projector 124. FIG. 24D is a perspective view of the projector 124 viewed obliquely upward from a position below, behind, and on the left of the projector 124.

In the projector 124 according to Embodiment 24, an enclosure 624 has a quadrangular (oblong elongated in Y-axis direction) cross section (cross section in plane YZ) and is configured to extend in the form of a column, as shown in FIGS. 24A to 24D. In Embodiment 24, the surfaces that form the enclosure 624 are formed of a front surface 624a, a rear surface 624b, a right side surface 624c, a left side surface 624d, a top surface 624e, and a bottom surface 624f, as in the way in which the surfaces of the enclosure in Embodiment 1 are viewed along the three axes described above.

In Embodiment 24, another enclosure 624A, which has a quadrangular cross section (cross section in plane YZ) and is configured to extend in the form of a column, is connected to the top surface 624e of the enclosure 624 and integrated with the enclosure 624, as shown in FIGS. 24A to 24D. The surfaces that form the enclosure 624A are formed of a front surface 624g, a rear surface 624h, a right side surface 624i, a left side surface 624j, a top surface 624k, and a bottom surface 624m, as in the case of the enclosure 624.

In Embodiment 24, the top surface 624e of the enclosure 624 coincides with the bottom surface 624m of the enclosure 624A. The area of the bottom surface 624m is configured to be smaller than the area of the top surface 624e, and the volume of the enclosure 624A is configured to be smaller than the volume of the enclosure 624.

A quadrangular light transmissive member 324 is disposed in a roughly central portion of the front surface 624a of the enclosure 624, as shown in FIGS. 24A and 24B. Further, a quadrangular diffusion member 524 is disposed on the bottom surface 624f of the enclosure 624, as shown in FIG. 24D. The openings 723 are formed in the right side surface 623i in Embodiment 23, and openings may or may not be formed in the right side surface 624i or the left side surface 624j in Embodiment 24. The other configurations are the same as those of the projector 101 according to Embodiment 1.

Embodiment 25

A projector 125 according to Embodiment 25 will be described with reference to FIGS. 25A, 25B, and 25C.

Figure 25A:
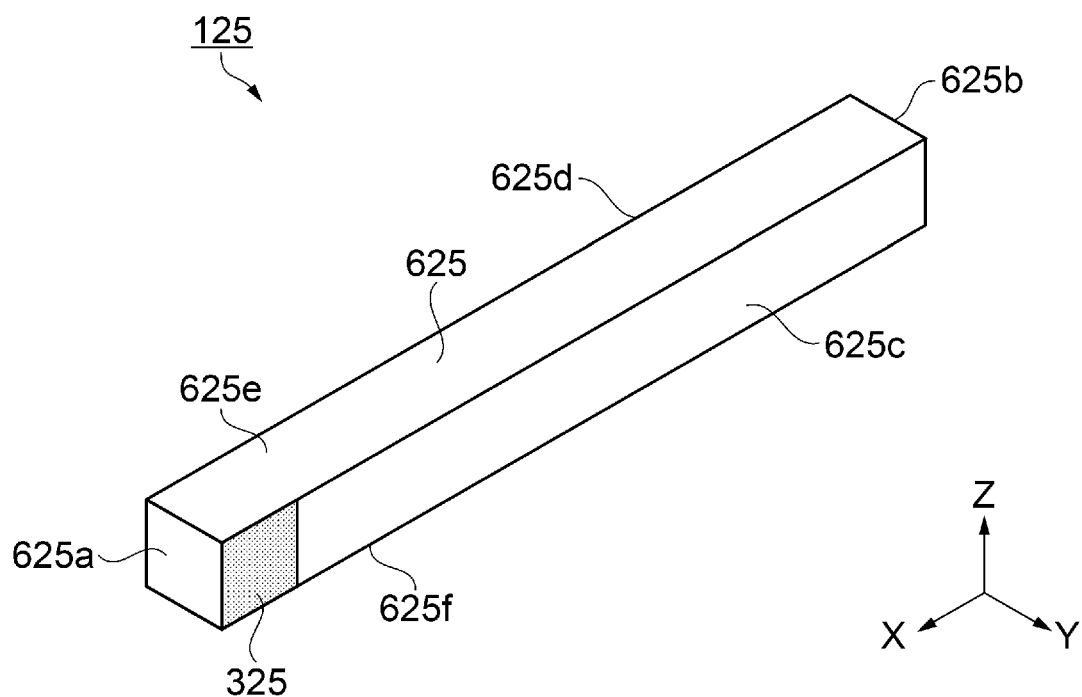
FIG. 25A is a perspective view showing a projector according to Embodiment 25.
Figure 25B:
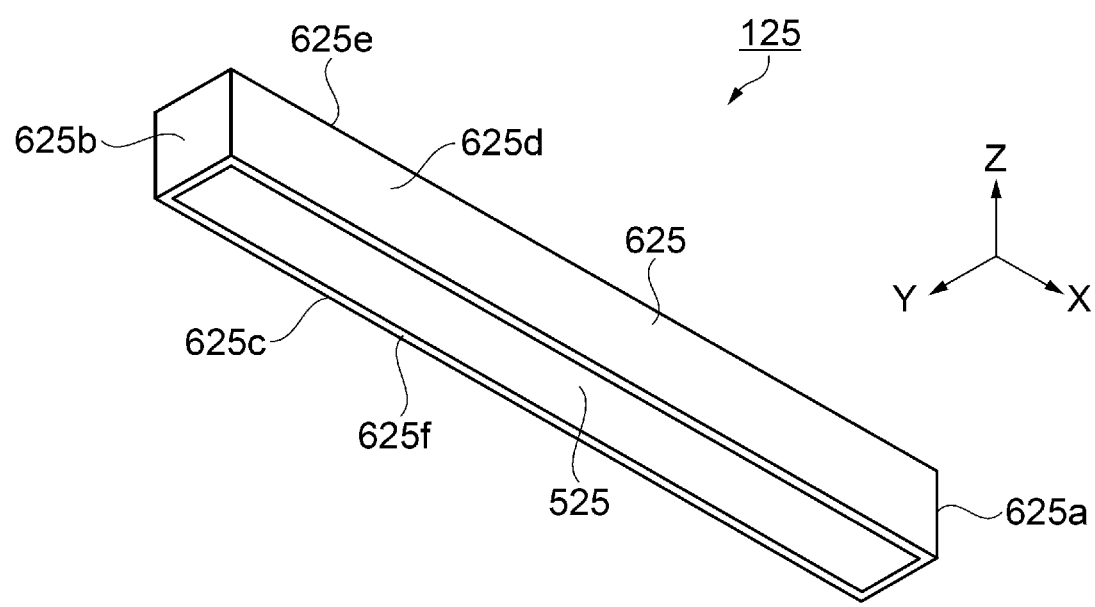
FIG. 25B is a perspective view showing the projector according to Embodiment 25.

FIGS. 25A and 25B are perspective views showing the projector 125 according to Embodiment 25. In detail, FIG. 25A is a perspective view of the projector 125 viewed obliquely downward from a position above, in front of, and on the right of the projector 125. FIG. 25B is a perspective view of the projector 125 viewed obliquely upward from a position below, behind, and on the left of the projector 125. FIG. 25C is a schematic horizontal cross-sectional view showing the configuration of the projector 125.

Figure 25C:
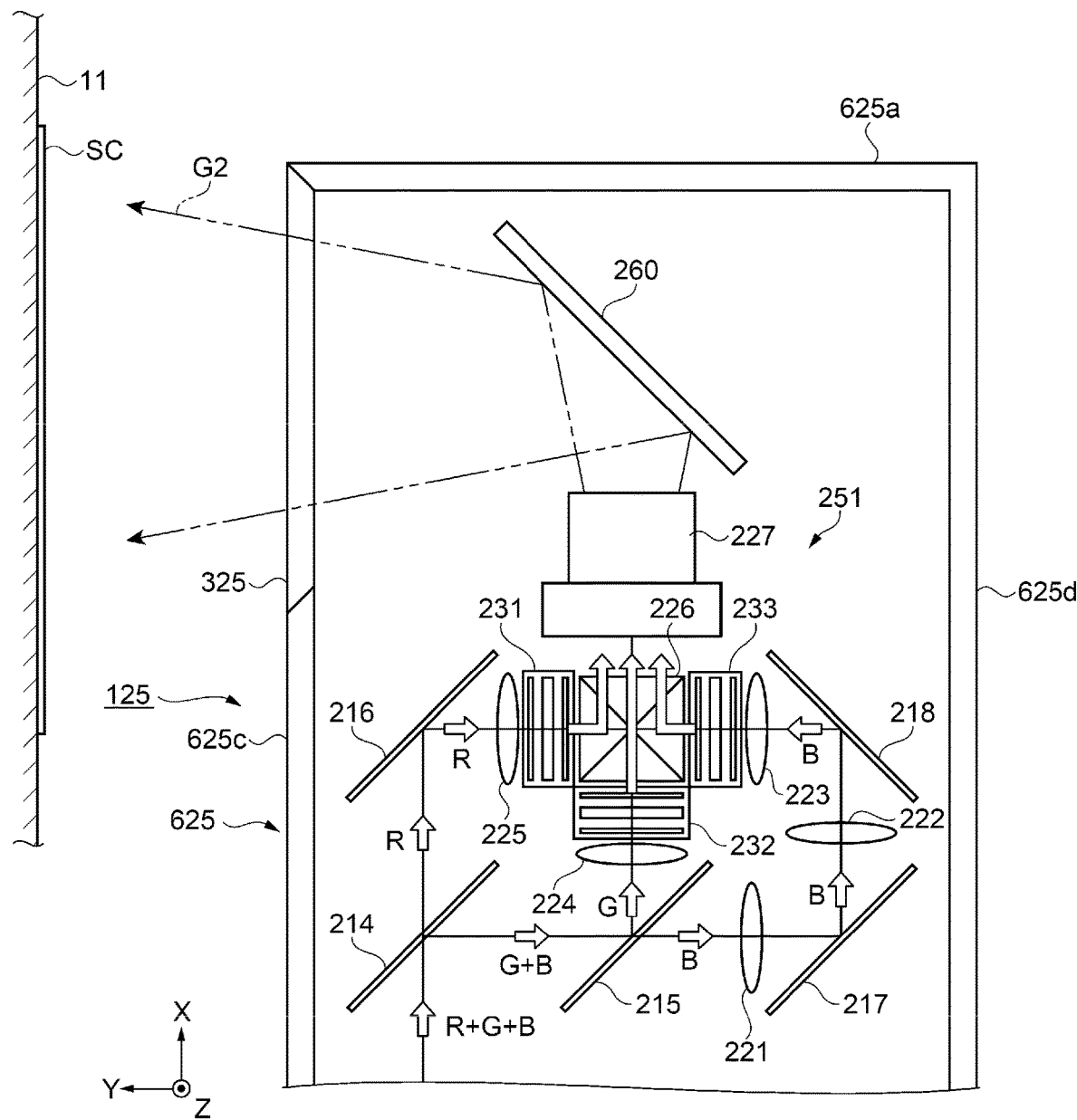
FIG. 25C is a schematic horizontal cross-sectional view showing the configuration of the projector.

In the projector 125 according to Embodiment 25, an enclosure 625 has a quadrangular cross section (cross section in plane YZ) and is configured to extend in the form of a column, as shown in FIGS. 25A to 25C. In Embodiment 25, the surfaces that form the enclosure 625 are formed of a front surface 625a, a rear surface 625b, a right side surface 625c, a left side surface 625d, a top surface 625e, and a bottom surface 625f, as in the way in which the surfaces of the enclosure in Embodiment 1 are viewed along the three axes described above.

In Embodiment 25, a quadrangular light transmissive member 325 is disposed in an X(+)-direction-side end portion of the right side surface 625c of the enclosure 625. The light transmissive member 325 is so disposed that the width thereof coincides with the width of the right side surface 625c in the upward/downward direction. In Embodiments 1 to 24 described above, the image light G1 exits in the X(+)-axis direction, whereas in Embodiment 25, the image light exits in the Y(+)-axis direction through the light transmissive member 325. The image light that exits in the Y(+)-axis direction is called image light G2. The image light G2, which exits in the Y(+)-axis direction through the light transmissive member 325, is projected as an image, for example, on the screen SC installed on the wall surface 11 located in a position away in the Y(+)-axis direction.

A projection section 251 forms the optical system that causes the image light G2 to exit in the Y(+)-axis direction, as shown in FIG. 25C. The projection section 251 is configured in the same manner in which the projection section 250 described above is configured but differs therefrom in that the projection section 251 includes a reflection mirror 260.

The reflection mirror 260 provided in the projection section 251 is disposed on the downstream side of the projection lens 227 and reflects the image light G2 having exited out of the projection lens 227 in the Y(+)-axis direction, as shown in FIG. 25C. The image light G2 reflected off the reflection mirror 260 enters the light transmissive member 325, passes therethrough, and exits in the Y(+)-axis direction. The actions of the other optical systems that form the projection section 251 are the same as those of the optical systems that form the projection section 250 and will therefore be not described.

A quadrangular diffusion member 525 is disposed on the bottom surface 625f of the enclosure 625, as shown in FIG. 25B.

Embodiment 26

A projector 126 according to Embodiment 26 will be described with reference to FIGS. 26A and 26B.

Figure 26A:
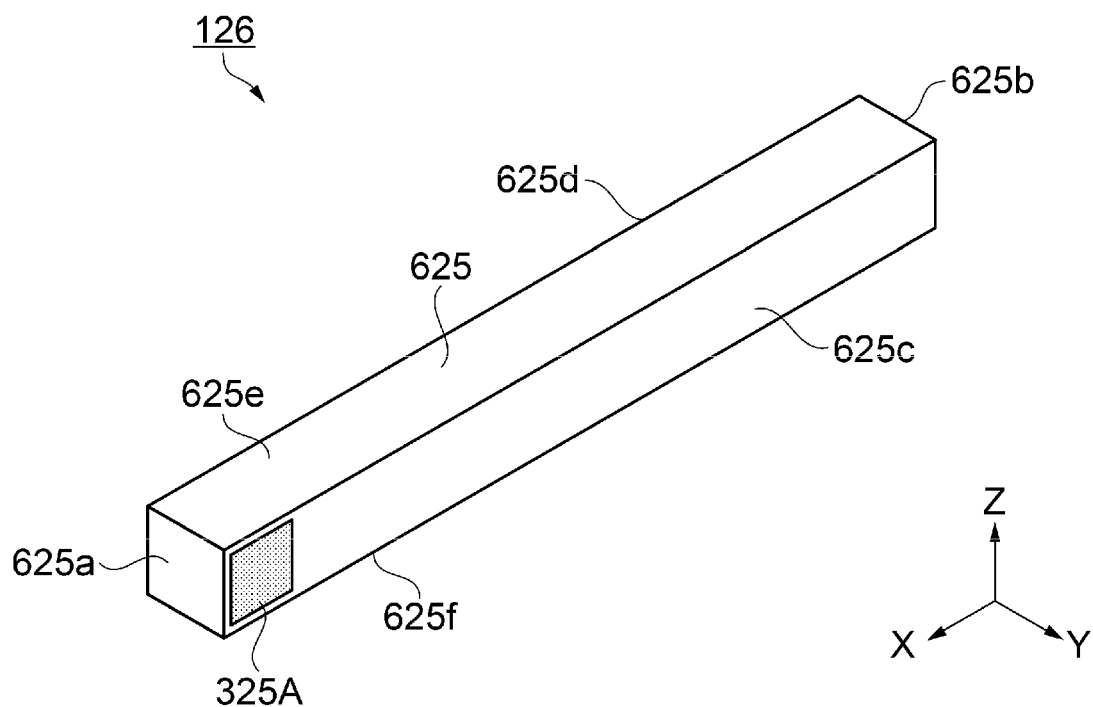
FIG. 26A is a perspective view showing a projector according to Embodiment 26.
Figure 26B:
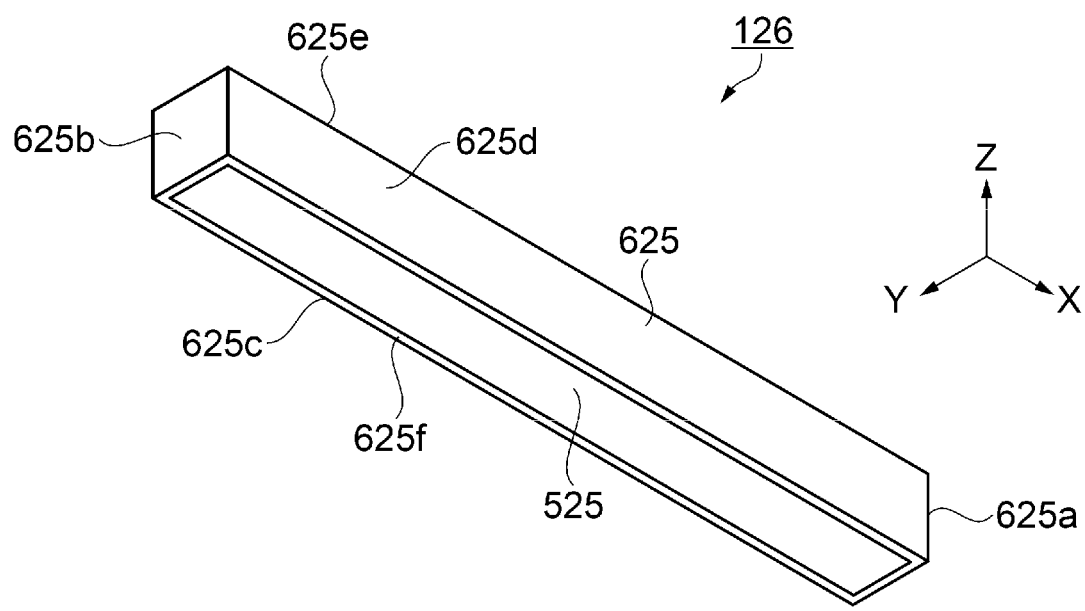
FIG. 26B is a perspective view showing the projector according to Embodiment 26.

FIGS. 26A and 26B are perspective views showing the projector 126 according to Embodiment 26. In detail, FIG. 26A is a perspective view of the projector 126 viewed obliquely downward from a position above, in front of, and on the right of the projector 126. FIG. 26B is a perspective view of the projector 126 viewed obliquely upward from a position below, behind, and on the left of the projector 126.

In the projector 126 according to Embodiment 26, a light transmissive member 325A is disposed in an X(+)-direction-side end portion of the right side surface 625c of the enclosure 625, as is the light transmissive member 325 in Embodiment 25. Embodiment 26 differs from Embodiment 25 in that the light transmissive member 325 in Embodiment 25 is so disposed that the width thereof coincides with the width of the right side surface 625c in the upward/downward direction whereas the light transmissive member 325A is so disposed as not to cover an outer edge portion of the right side surface 625c. The other configurations are the same as those of the projector 125 according to Embodiment 25.

Embodiment 27

A projector 127 according to Embodiment 27 will be described with reference to FIGS. 27A, 27B, and 27C.

Figure 27A:
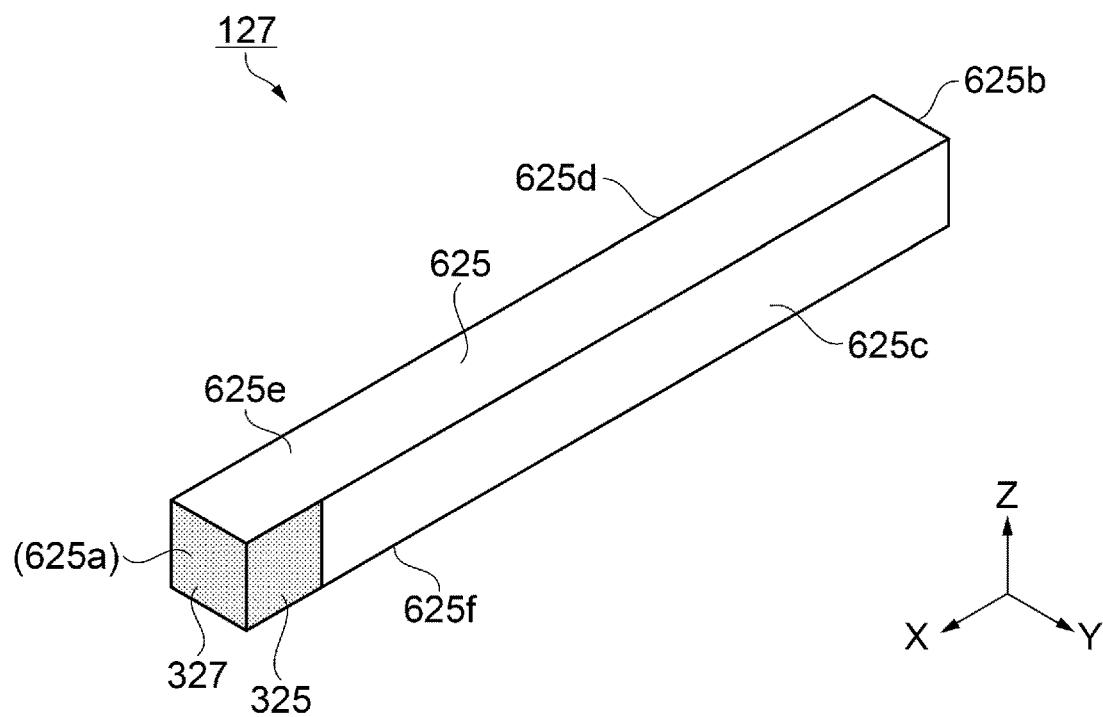
FIG. 27A is a perspective view showing a projector according to Embodiment 27.
Figure 27B:
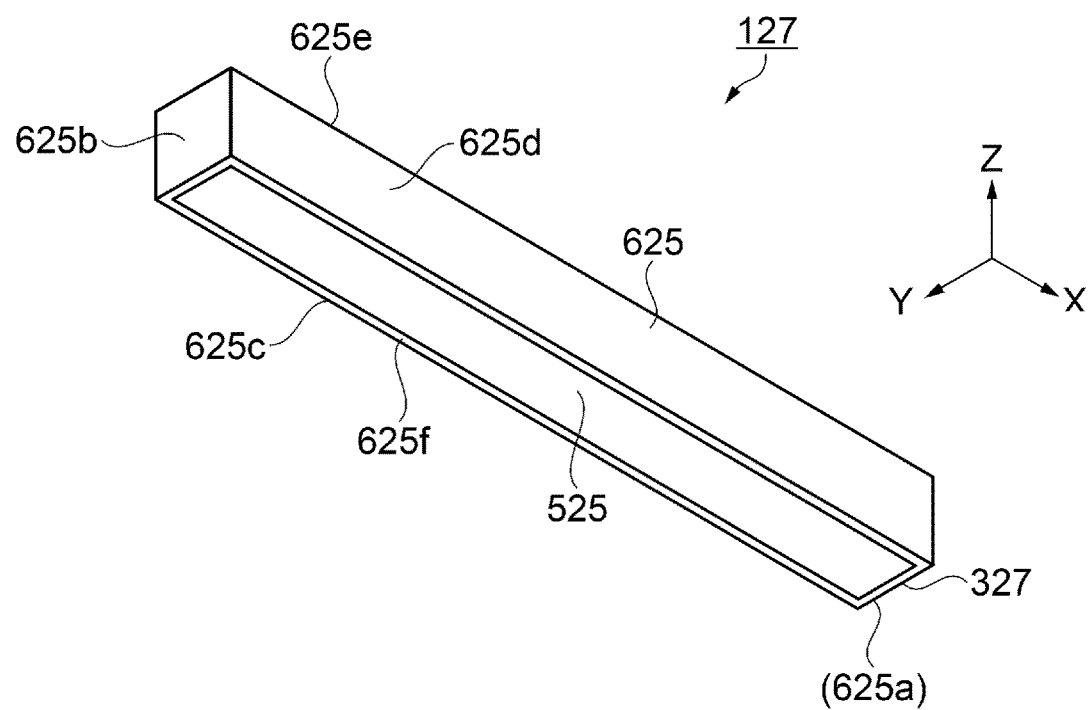
FIG. 27B is a perspective view showing the projector according to Embodiment 27.

FIGS. 27A and 27B are perspective views showing the projector 127 according to Embodiment 27. In detail, FIG. 27A is a perspective view of the projector 127 viewed obliquely downward from a position above, in front of, and on the right of the projector 127. FIG. 27B is a perspective view of the projector 127 viewed obliquely upward from a position below, behind, and on the left of the projector 127. FIG. 27C is a schematic horizontal cross-sectional view showing the configuration of the projector 127.

In the projector 127 according to Embodiment 27, the light transmissive member 325 is so disposed in the X(+)-direction-side end portion of the right side surface 625c of the enclosure 625 that the width of the light transmissive member 325 coincides with the width of the right side surface 625c in the upward/downward direction, as is the light transmissive member 325 in Embodiment 25. Embodiment 27 differs from Embodiment 25 in that a light transmissive member 327 is so disposed as to cover the entire front surface 625a of the enclosure 625. The projector 127 according to Embodiment 27 is therefore installed with the two light transmissive members 325 and 327 integrated with each other.

In Embodiment 27, the image light G2 exits in the Y(+)-axis direction through the light transmissive member 325, as in Embodiment 25. Further, in Embodiment 27, the image light G1 exits in the X(+)-axis direction through the light transmissive member 327, as in Embodiments 1 to 24 described above.

Figure 27C:
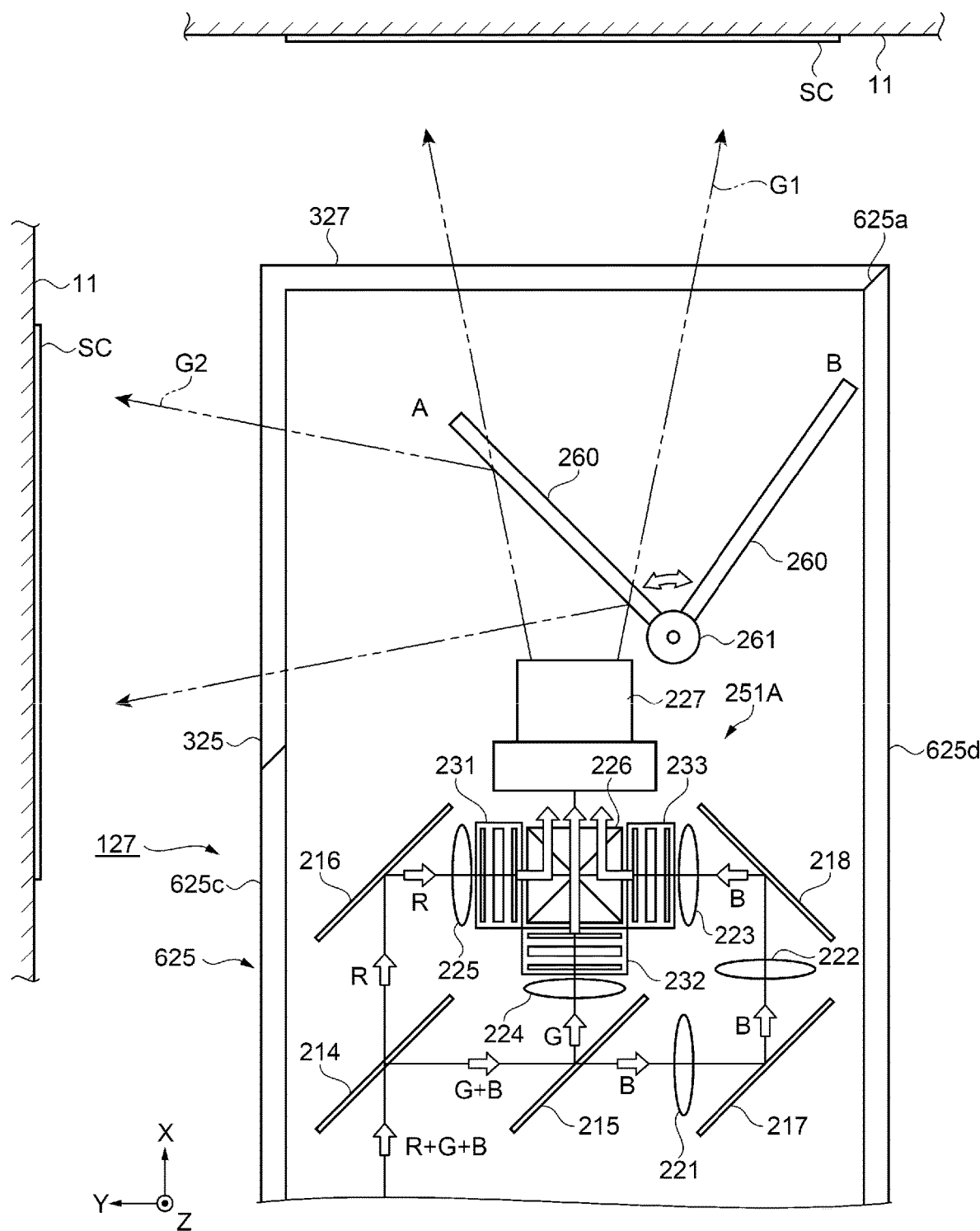
FIG. 27C is a schematic horizontal cross-sectional view showing the configuration of the projector.

A projection section 251A forms the optical system that causes the image light G1 to exit in the X(+)-axis direction and the image light G2 to exit in the Y(+)-axis direction, as shown in FIG. 27C. The projection section 251A is configured in the same manner in which the projection section 251 described above is configured but differs therefrom in that the projection section 251A includes a reflection mirror driver 261, which changes the position of the reflection mirror 260.

The reflection mirror 260 provided in the projection section 251A is disposed on the downstream side of the projection lens 227, as shown in FIG. 27C, as is the reflection mirror 260 provided in the projection section 251. In Embodiment 27, the reflection mirror driver 261 changes the position of the reflection mirror 60.

In detail, to cause the image light G2 to exit in the Y(+)-axis direction, the reflection mirror driver 261 drives the reflection mirror 260 in such a way that the reflection mirror 260 is located in a position A, as shown in FIG. 27C. To cause the image light G1 to exit in the X(+)-axis direction, the reflection mirror driver 261 drives the reflection mirror 260 in such a way that the reflection mirror 260 is located in a position B.

In the case where the reflection mirror 260 is located in the position A, the image light having exited out of the projection lens 227 is reflected off the reflection mirror 260 in the Y(+)-axis direction. In the case where the reflection mirror 260 is located in the position B, the image light having exited out of the projection lens 227 travels straight in the X(+)-axis direction.

The image light G2 reflected off the reflection mirror 260 enters the light transmissive member 325, passes therethrough, exits in the Y(+)-axis direction, and is projected as an image, for example, on the screen SC installed on the wall surface 11 located in a position away in the Y(+)-axis direction. On the other hand, the image light G1 having exited out of the projection lens 227 and traveled straight enters the light transmissive member 327, passes therethrough, exits in the X(+)-axis direction, and is projected as an image, for example, on the screen SC installed on the wall surface 11 located in a position away in the X(+)-axis direction.

The actions of the other optical systems that form the projection section 251A are the same as those of the optical systems that form the projection section 250 and will therefore be not described. The other configurations of the projector 127 are the same as those of the projector 125 according to Embodiment 25.

Embodiment 28

A projector 128 according to Embodiment 28 will be described with reference to FIGS. 28A and 28B.

Figure 28A:
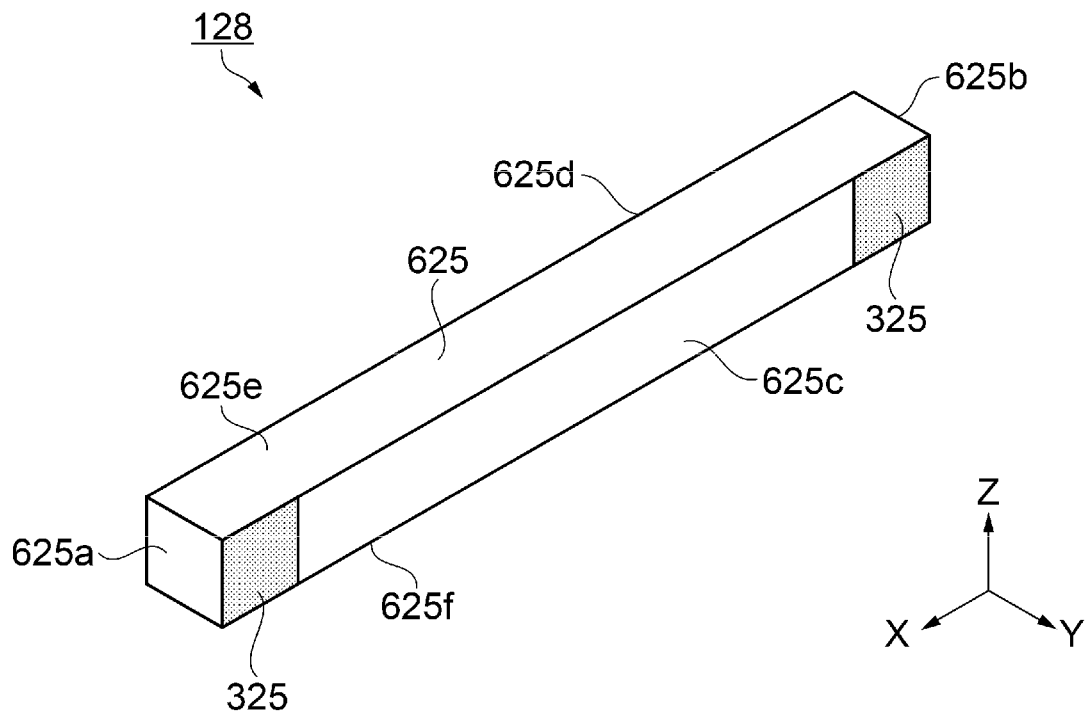
FIG. 28A is a perspective view showing a projector according to Embodiment 28.
Figure 28B:
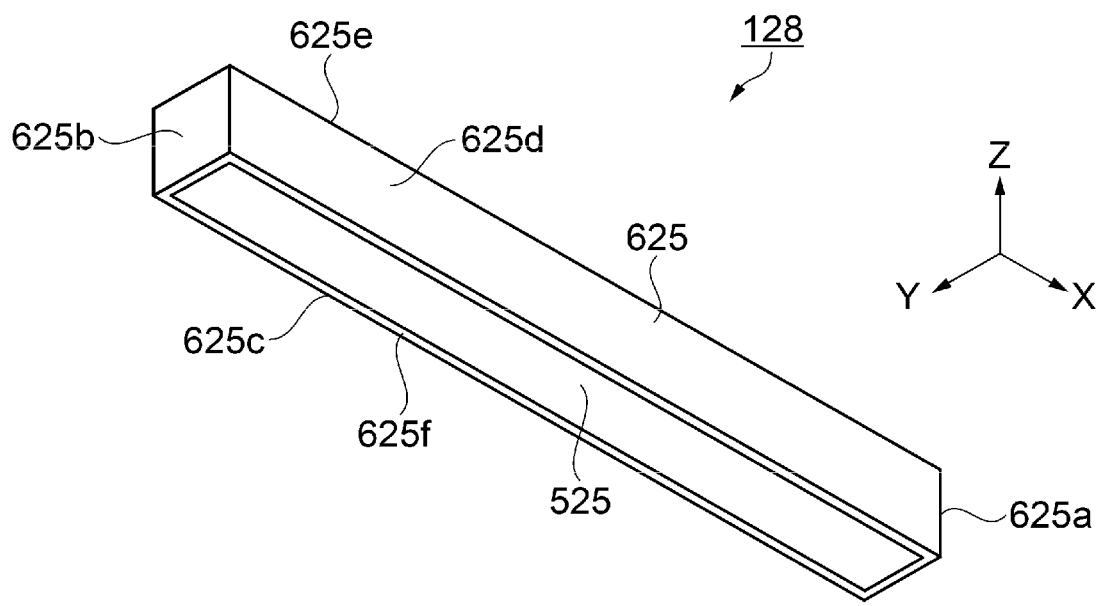
FIG. 28B is a perspective view showing the projector according to Embodiment 28.

FIGS. 28A and 28B are perspective views showing the projector 128 according to Embodiment 28. In detail, FIG. 28A is a perspective view of the projector 128 viewed obliquely downward from a position above, in front of, and on the right of the projector 128. FIG. 28B is a perspective view of the projector 128 viewed obliquely upward from a position below, behind, and on the left of the projector 128.

In the projector 128 according to Embodiment 28, the light transmissive member 325 is so disposed in the X(+)-direction-side end portion of the right side surface 625c of the enclosure 625 that the width of the light transmissive member 325 coincides with the width of the right side surface 625c in the upward/downward direction, as is the light transmissive member 325 in Embodiment 25. Embodiment 28 differs from. Embodiment 25 in that another light transmissive member 325 is disposed in an X(−)-direction-side end portion of the right side surface 625c of the enclosure 625 so that the width of the light transmissive member 325 coincides with the width of the right side surface 625c in the upward/downward direction. In the projector 128 according to Embodiment 28, the two light transmissive members 325 are disposed in X-axis-direction opposite end portions of the right side surface 625c.

In Embodiment 28, the image light G2 exits in the Y(+)-axis direction through the two light transmissive members 325, as in Embodiment 25. The optical system uses two projection sections 251. The other configurations of the projector 128 are the same as those of the projector 125 according to Embodiment 25.

Embodiment 29

A projector 129 according to Embodiment 29 will be described with reference to FIGS. 29A to 29H.

Figure 29A:
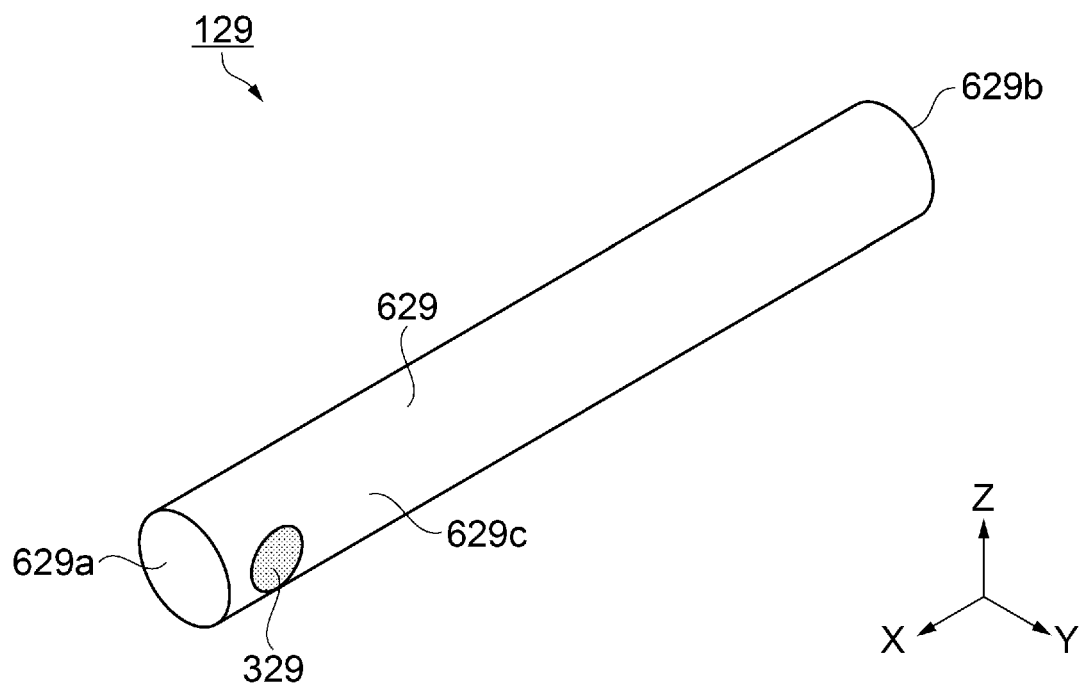
FIG. 29A is a perspective view showing a projector according to Embodiment 29.
Figure 29B:
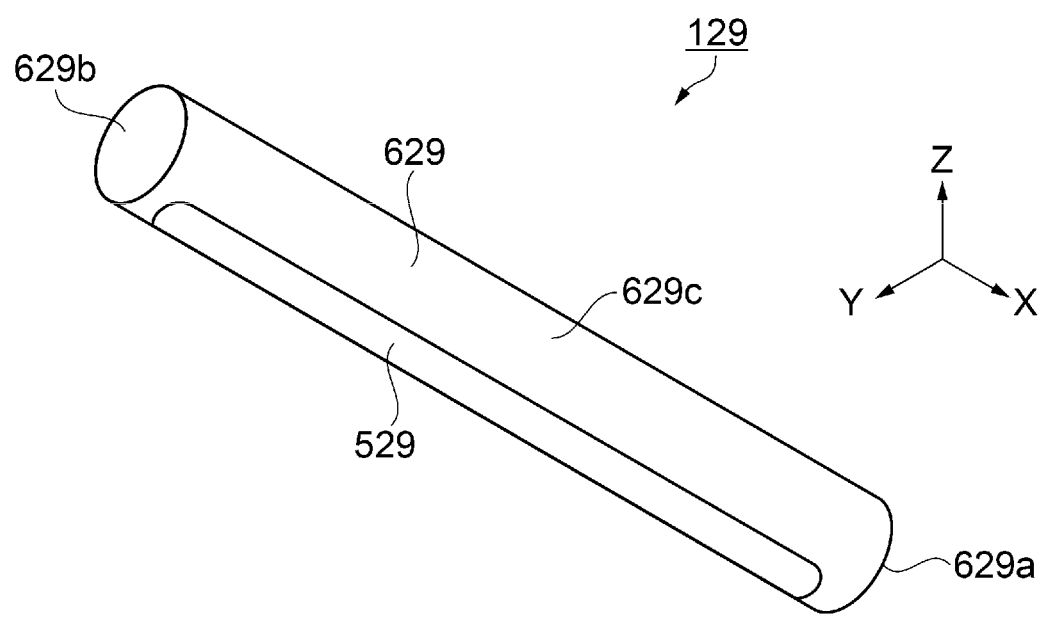
FIG. 29B is a perspective view showing the projector according to Embodiment 29.

FIGS. 29A and 29B are perspective views showing the projector 129 according to Embodiment 29. In detail, FIG. 29A is a perspective view of the projector 129 viewed obliquely downward from a position above, in front of, and on the right of the projector 129. FIG. 29B is a perspective view of the projector 129 viewed obliquely upward from a position below, behind, and on the left of the projector 129.

Figure 29C:
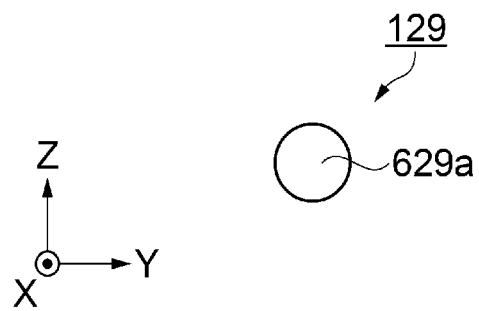
FIG. 29C shows the projector according to Embodiment 29 viewed along an axis.
Figure 29D:
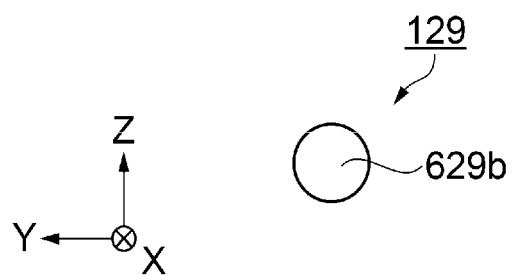
FIG. 29D shows the projector according to Embodiment 29 viewed along another axis.
Figure 29E:
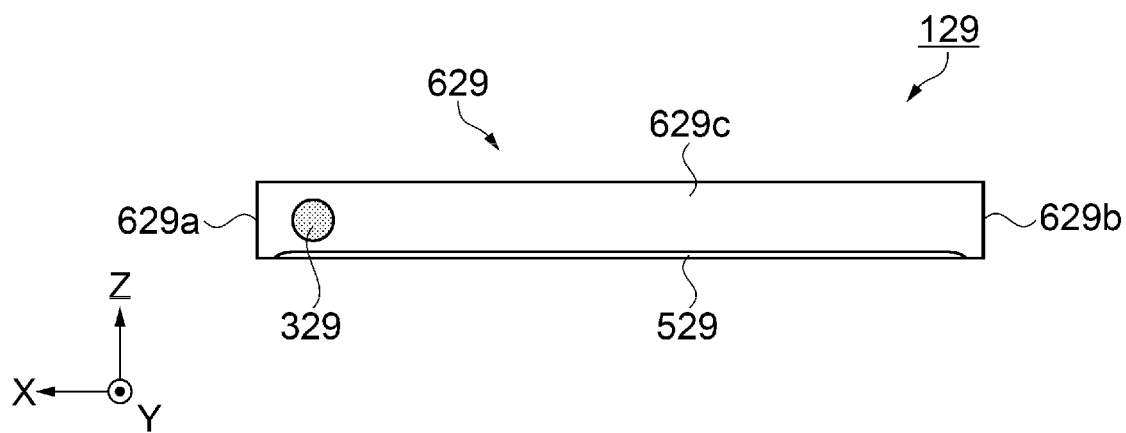
FIG. 29E shows the projector according to Embodiment 29 viewed along another axis.
Figure 29F:
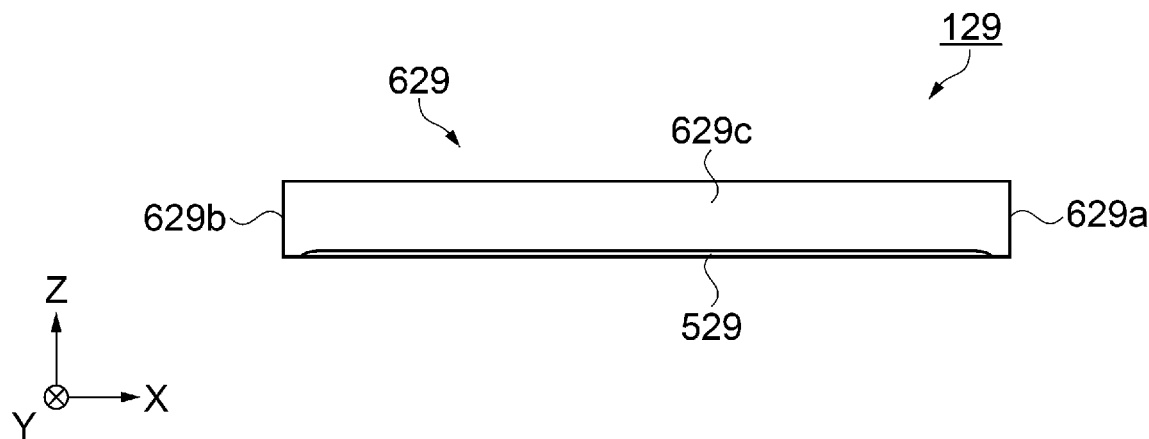
FIG. 29F shows the projector according to Embodiment 29 viewed along another axis.
Figure 29G:
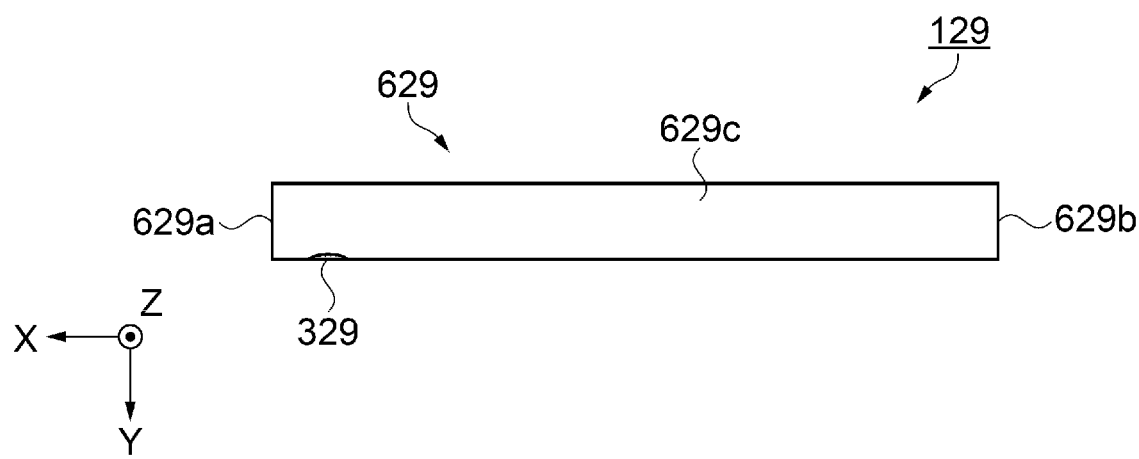
FIG. 29G shows the projector according to Embodiment 29 viewed along another axis.
Figure 29H:
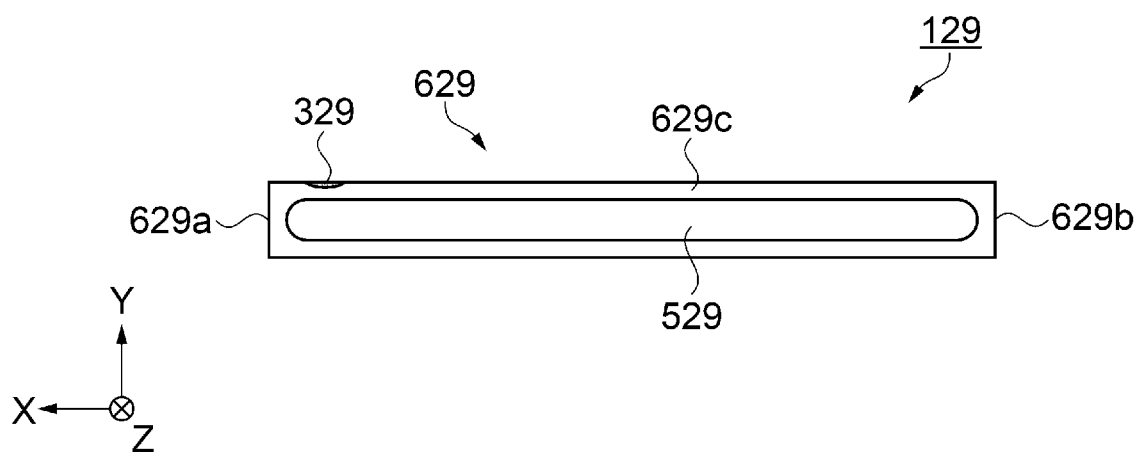
FIG. 29H shows the projector according to Embodiment 29 viewed along another axis.

FIGS. 29C to 29H show the projector 129 according to Embodiment 29 viewed along the three axes described above. In detail, FIG. 29C shows the projector 129 viewed along the axis-X(+) direction (front view). FIG. 29D shows the projector 129 viewed along the axis-X(−) direction (rearview). FIG. 29E shows the projector 129 viewed along the axis-Y(+) direction (right side view). FIG. 29F shows the projector 129 viewed along the axis-Y(−) direction (left side view). FIG. 29G shows the projector 129 viewed along the axis-Z(+) direction (top view). FIG. 29H shows the projector 129 viewed along the axis-Z(−) direction (bottom view).

In the projector 129 according to Embodiment 29, an enclosure 629 has a circular cross section (cross section taken along plane YZ) and is configured to extend in the form of a column. The enclosure 629 in Embodiment 29 has end surfaces on opposite sides in the X-axis direction, which is the lengthwise direction in which the enclosure 629 having the circular cross section extends in the form of a column, and the two end surfaces are defied as follows: The X(+)-axis-side end surface is a front surface 629a; and the X(−)-axis-side end surface is a rear surface 629b. The side surface of the columnar shape having the circular cross section is called an outer circumferential surface 629c.

A circular light transmissive member 329 is disposed in the vicinity of the X(+)-axis-side end of the outer circumferential surface 629c. The light transmissive member 329 is so formed as to follow the curved outer circumferential surface 629c. The image light G2 exits in the Y(+)-axis direction through the light transmissive member 329. A diffusion member 529 is disposed in a lower portion of the outer circumferential surface 629c of the enclosure 629, as shown in FIGS. 29B and 29H. The diffusion member 529 has a roughly track-like plan shape and is formed of a curved surface that follows the outer circumferential surface 629c. The other configurations are the same as those of the projector 125 according to Embodiment 25.

Contents derived from Embodiments described above will be described below.

A projector includes a projection section that outputs image light, a light transmissive member that transmits the image light outputted from the projection section, an illuminator that outputs illumination light, a diffusion member that diffuses the illumination light outputted from the illuminator, and an enclosure that accommodates the projection section and the illuminator, is provided with the light transmissive member and the diffusion member, and is so formed as to extend in the form of a column, and the enclosure is hung via a support member that supports the enclosure in a plurality of directions.

According to the configuration described above, in the case where the projector is hung from a ceiling surface, the support members, which support the enclosure in a plurality of directions, are attached to the projector. Therefore, even in the case where the projector swings due, for example, to wind, the amount of swing motion can be suppressed to a small amount, and the period required to stop the swing motion can be shortened. The swing motion of a projected image can therefore be suppressed, whereby a situation in which the image is difficult to look at can be avoided.

In the projector described above, the light transmissive member is preferably disposed on a lengthwise end surface and/or a widthwise side surface of the enclosure.

The entire disclosure of Japanese Patent Application No. 2018-061416, filed Mar. 28, 2018 is expressly incorporated by reference herein.

What is claimed is:

1. A projector comprising:
   a projection section that outputs image light;
   a light transmissive member that transmits the image light outputted from the projection section;
   an illuminator that outputs illumination light;
   a diffusion member that diffuses the illumination light outputted from the illuminator; and
   an enclosure that accommodates the projection section and the illuminator, is provided with the light transmissive member and the diffusion member, and is so formed as to extend in the form of a column, the diffusion member being part of a bottom surface of the enclosure,
   wherein the enclosure is hung via a support member that supports the enclosure in a plurality of directions, the support member having a support surface and including a first support member and a second support member that is located at a distance from the first support member, each of the first support member and the second support member having a V-shape configured to be fixed at four different locations on the supporting surface, and
   the light transmissive member is disposed on a lengthwise end surface and/or a widthwise side surface of the enclosure, the lengthwise end surface and the widthwise side surface are vertical surfaces.

2. The projector according to claim 1,
   wherein the end surface has a quadrangular shape.

3. The projector according to claim 1,
   wherein the end surface has a circular shape.

4. The projector according to claim 1,
   wherein the enclosure has a bottom surface and a top surface opposite the bottom surface, and
   the diffusion member is disposed on the bottom surface, and the top surface is supported by the support member.

5. The projector according to claim 1,
   wherein the enclosure has a bottom surface and a top surface opposite the bottom surface, and
   the diffusion member is disposed on the bottom surface, and an opening that functions as a discharge port is formed in the top surface.

6. The projector according to claim 1,
   wherein the enclosure includes another enclosure having a volume smaller than a volume of the enclosure, and an opening is provided in a side surface of the other enclosure.

\* \* \* \* \*